(12) United States Patent
Johns et al.

(10) Patent No.: US 11,288,194 B2
(45) Date of Patent: Mar. 29, 2022

(54) GLOBAL VIRTUAL ADDRESS SPACE CONSISTENCY MODEL

(71) Applicant: International Business Machines Corporation, Armonk, NY (US)

(72) Inventors: Charles R. Johns, Austin, TX (US); James A. Kahle, Austin, TX (US); Martin Ohmacht, Yorktown Heights, NY (US); Changhoan Kim, Westchester, NY (US); Jose R. Brunheroto, Mohegan Lake, NY (US); Constantinos Evangelinos, Cambridge, MA (US); Abdullah Kayi, Westchester, NY (US); Alessandro Morari, New York, NY (US); James C. Sexton, Yorktown Heights, NY (US); Patrick D. Siegl, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/217,257

(22) Filed: Dec. 12, 2018

(65) Prior Publication Data
US 2020/0192799 A1    Jun. 18, 2020

(51) Int. Cl.
G06F 12/0815    (2016.01)

(52) U.S. Cl.
CPC .. *G06F 12/0815* (2013.01); *G06F 2212/1008* (2013.01); *G06F 2212/1048* (2013.01); *G06F 2212/657* (2013.01)

(58) Field of Classification Search
CPC .................................................. G06F 3/067
See application file for complete search history.

(56) References Cited

U.S. PATENT DOCUMENTS

| 7,587,431 | B1 | 9/2009 | Rao et al. |
| 7,702,743 | B1 | 4/2010 | Wong |
| 7,890,633 | B2 | 2/2011 | St. Pierre |
| 8,150,805 | B1 | 4/2012 | Tawri et al. |
| 8,204,860 | B1 | 6/2012 | Ferguson et al. |
| 8,539,164 | B2 | 9/2013 | Warner |

(Continued)

FOREIGN PATENT DOCUMENTS

EP    3252617    12/2017

OTHER PUBLICATIONS

Schlesinger et al., "Consistency Based Snapshot Management in Data Grids," VLDB PhD Workshop 2003, 5 pages.

(Continued)

*Primary Examiner* — Henry Tsai
*Assistant Examiner* — Juanito Borromeo
(74) *Attorney, Agent, or Firm* — VanLeeuwen & VanLeeuwen; Brian D. Welle

(57) ABSTRACT

An approach is disclosed that maintains a consistent view of a virtual address by a local node which writes a first value to the virtual address and, after writing the first value, establishes a snapshot consistency state of the virtual address. The virtual address is shared amongst any number of processes and the processes includes a writing process and other processes that read from the virtual address. After writing the first value, the writing process writes a second value to the virtual address. Even after writing the second value, the first value is still visible to the other processes.

25 Claims, 57 Drawing Sheets

(56) References Cited

U.S. PATENT DOCUMENTS

| | | | |
|---|---|---|---|
| 8,732,386 B2* | 5/2014 | O'Krafka | G06F 12/0284 |
| | | | 711/103 |
| 9,183,148 B2 | 11/2015 | Fried | |
| 9,612,757 B2 | 4/2017 | Chakrabarti | |
| 9,645,943 B2 | 5/2017 | Kopylovitz et al. | |
| 9,705,974 B2 | 7/2017 | Reddy et al. | |
| 2002/0042868 A1* | 4/2002 | Godtland | G06F 12/1036 |
| | | | 711/209 |
| 2005/0071625 A1 | 3/2005 | Almeida | |
| 2013/0103836 A1 | 4/2013 | Baniqued | |
| 2016/0306709 A1 | 10/2016 | Shaull | |
| 2019/0012762 A1 | 1/2019 | Koker et al. | |

OTHER PUBLICATIONS

Quinn et al., "Network Based Coherency: Extending a Processor's Coherency Domain over a Standard Network," 3LeafSystems, presentation at Hot Chips 20: A Symposium on on High Performance Chips, Aug. 2008, 22 pages.

Morgan, "3Leaf makes big SMPs out of x64 clusters," The Register, Nov. 2009, 7 pages.

Li et al., "Memory Coherence in Shared Virtual Memory Systems," ACM Transactions on Computer Systems, vol. 7, No. 4, Nov. 1989, pp. 321-359.

Fleisch et al., "Mirage: A Coherent Distributed Shared Memory Design," In 12th SOSP Proceedings of the twelfth ACM symposium on Operating systems principles, Litchfield Pk., AZ, USA, 1989, pp. 211-223.

Bennett et al., "Munin: Distributed Shared Memory Based on Type-Specific Memory Coherence," In PPOPP Proceedings of the second ACM SIGPLAN symposium on Principles & practice of parallel programming, Seattle, Washington, USA, Mar. 1990, pp. 168-176.

Bershad et al., "Midway: Shared Memory Parallel Programming with Entry Consistency for Distributed Memory Multiprocessors," Technical Report CMU-CS-91-170, Carnegie Mellon University, Pittsburgh, Pennsylvania, USA, Sep. 1991, 20 pages.

"List of IBM Patents or Patent Applications Treated as Related," Jun. 19, 2020, 1 page.

Anonymously, "A Novel Data Prefetch Method Under Heterogeneous Architecture," ip.com, No. IPCOM000224167D, Dec. 2012, 14 pages.

Anonymously, "An Apparatus for Leveraging General Purpose Graphics Processing Units for JSON Accelerating in Front-End Cache," ip.com, No. IPCOM000234730D, Jan. 2014, 6 pages.

Anonymously, "Efficient Resource Identification Management Scheme Across Independent But Related Resource Pools in a Hierarchical Resource Scenario of a Switch Assembly System," ip.com, No. IPCOM000245533D, Mar. 2016, 26 pages.

Litz, "Improving the Scalability of High Performance Computer Systems," Diplom-Informatiker der Technischen Informatik, Mannheim, Germany, 2010, 196 pages.

Tu et al., "Memory-Based Rack Area Networking," Stony Brook University, Stony Brook, NY, May 2014, 113 pages.

Tu et al., "Secure I/O Device Sharing among Virtual Machines on Multiple Hosts," the 40th Annual International Symposium on Computer Architecture, ISCA '13, Tel-Aviv, Israel, Jun. 23-27, 2013, 12 pages.

Kahle et al., "Disaggregated System Domain," U.S. Appl. No. 16/899,828, filed Jun. 12, 2020, 186 pages.

* cited by examiner

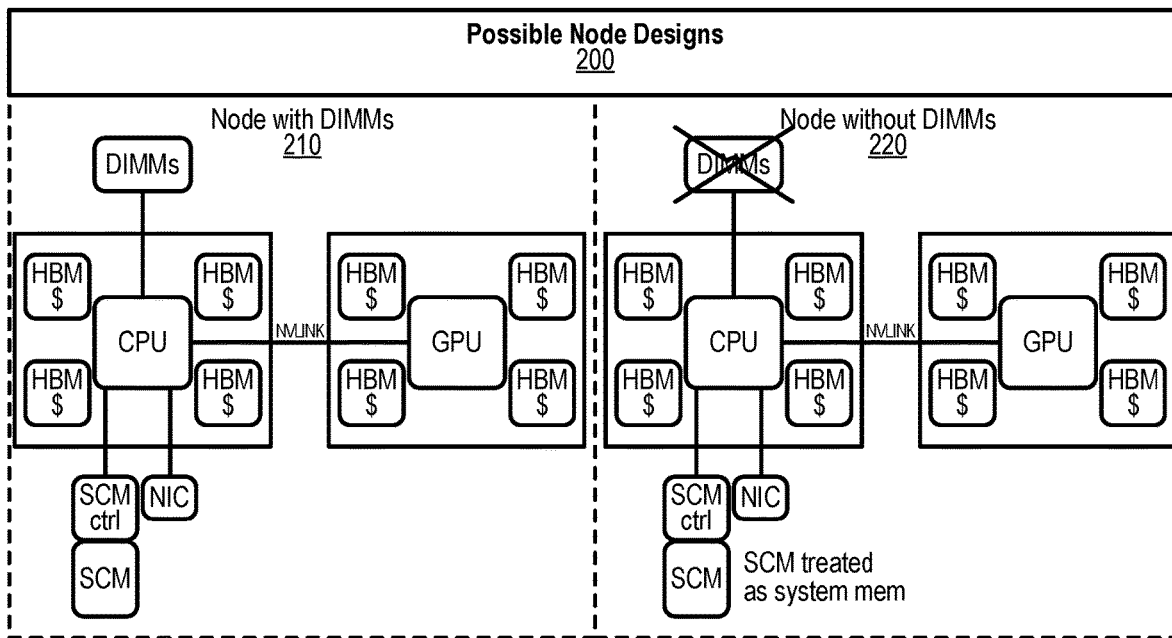
FIG. 2
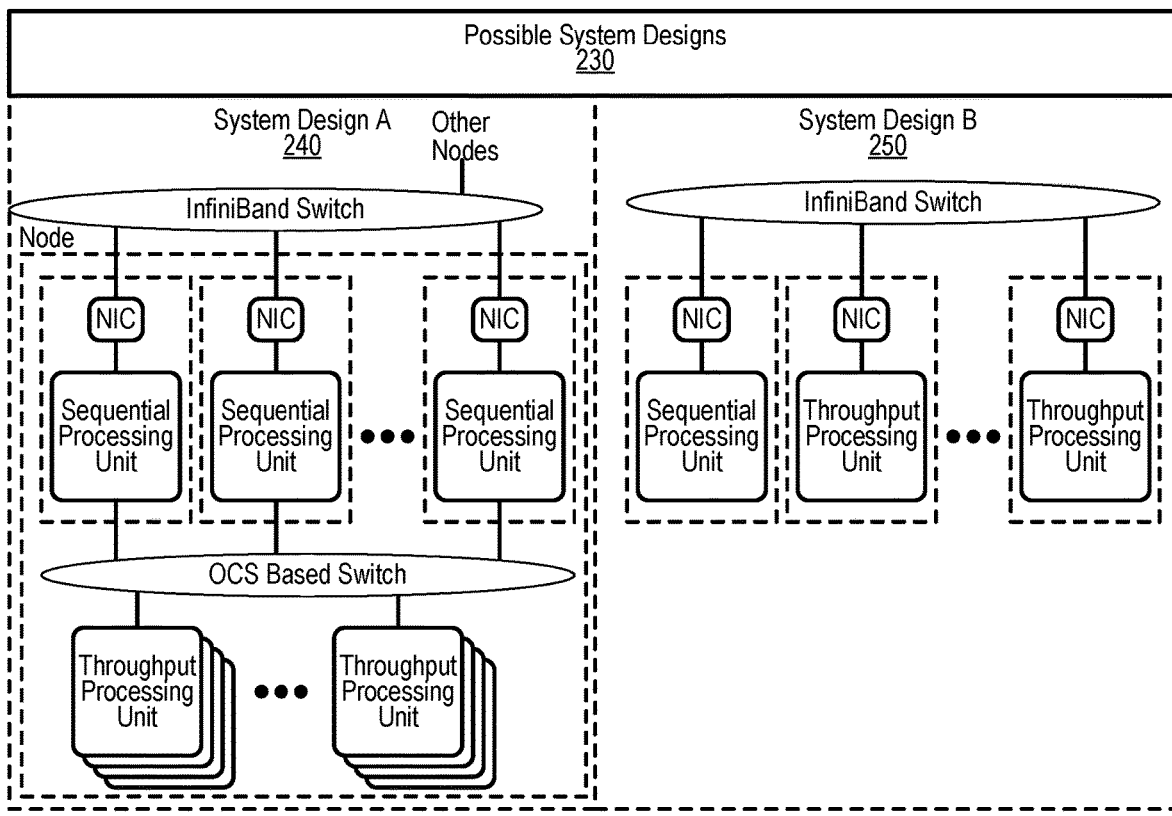

| Home Node 2500 |||| 
|---|---|---|---|
| Type 2520 | Description 2540 | Auxiliary Information 2560 | Notes 2580 |
| 0x0 | Directory Entry Not Valid | | |
| 0x1 | Pointer to next level of page table | pointer | Points to the next level of page table representing a finer division of virtual address space |
| 0x2 | Multi-node Home | List of blocks Home nodes | Area is homed by more than two nodes |
| 0x3 | Blocked across all nodes | Block Size | Single entry represents full object. Starting location of NDE used to look up directory. |
| 0x4 | Cyclic across all nodes | | Single entry represents full NDE. Starting location of NDE used to look up directory. |
| 0x5 | Block Cyclic across all nodes | Block Size | Single entry represents full NDE. Starting location of NDE used to look up directory. |
| 0x7 | Block Cyclic across specified nodes | Block Size Num. of Nodes List of Nodes | Single entry represents full NDE. Starting location of NDE used to look up directory. List of nodes may be a pointer to another level of directory containing virtual nodes |
| 0x8 | Single Node Home | Node | Area is homed by a single node |
| 0x9 | Two Node Home Split | Split point Nodes | Area is split between two nodes |

*FIG. 25*

Recovery After Node Failure

FIG. 52

Global Virtual Address Space (GVAS) APIs  5200

GVAS Management  5210

| API | Description |
|---|---|
| gsOpen() | Open a GVAS |
| gsClose() | Close a GVAS |
| gsQuery() | Query information about a GVAS |
| gsMap() | Allocate VA space to a GVAS |
| gsMapAll() | Allocate VA space to a GVAS |
| gsFree() | Free VA space from a GVAS |
| gsChngVA() | Change properties of a GVAS' VA space |
| gsSetHome() | Set backing store for a GVAS' VA space |

GVAS Snapshot Consistency  5220

| API | Description |
|---|---|
| gsExpose() | Make VA range remotely accessible |
| gsPrivate() | Make VA range private to node |
| gsSnap() | Take a new snapshot of memory |
| gsUnite() | Create consistent view of global VA |

GVAS Access  5230

| API | Description |
|---|---|
| gsGet() | Read from a global VA |
| gsPut() | Write to a global VA |
| gsAtomic() | Perform atomic op on a global VA |
| gsTouch() | Touch a global VA into cache |
| gsTouchForStore() | Touch a global VA into cache for modification |
| gsFlush() | Flush a global VA from cache |
| gsSync() | Set order of remote operations |

Coordination Namespace APIs 5300

| API | Description |
|---|---|
| csCreate() | Create new coordination namespace |
| csAttach() | Attach to an existing coordination namespace |
| csDetach() | Detach from a coordination namespace |
| csQuery() | Query info about a coordination namespace |
| csAddGroups() | Add groups to a coordination namespace |
| csRemoveGroups() | Remove groups from a coordination namespace |
| csDelete() | Delete a coordination namespace |

Coordination Namespace Access 5320

| API | Description |
|---|---|
| csOut() | Create a NDE |
| csEval() | Create a NDE with a function |
| csIn() | Retrieve a NDE, blocking |
| csRetrievea() | Retrieve a NDE, non-blocking |
| csRd() | Read a NDE, blocking |
| csRda() | Read a NDE, non-blocking |
| csTest() | Test for non-blocking operations |
| csCancel() | Cancel a previous NDE request |
| csRemove() | Remove a NDE, blocking |
| csMove() | Move a NDE to a different coordination namespace |

FIG. 53

GLOBAL VIRTUAL ADDRESS SPACE CONSISTENCY MODEL

STATEMENT REGARDING FEDERALLY SPONSORED RESEARCH OR DEVELOPMENT

This invention was made with Government support under contract number 7216497 awarded by the United States Department of Energy. The Government has certain rights in the invention.

BACKGROUND

The emerging non-volatile memory (NVM) technologies, such as Phase Change Memory (PCM), Spin-transfer Torque Magnetic Memory (STT-MRAM) and Resistive Random Access Memory (RRAM) greatly improve the reliability, latency, and bandwidth relative to flash memory. These new Non-Volatile Memory (NVM) technologies, referred to as Storage Class Memory (SCM) can potentially improve the performance and reliability of local storage and could eventually replace the flash-based NVM devices. Dynamic Random Access Memory (DRAM) technology on the other hand is facing scaling challenges that will significantly affect the cost and power of a traditional memory sub-system in the future. Advanced DRAM architectures, such as 3D stacks of memory referred to as High Bandwidth Memory (HBM) will continue to increase in density with a lower power than traditional DRAMs. In addition, the use of HBMs in systems continues to grow, which will drive down the cost relative to traditional DRAMs on Dual In-Line Memory Modules (DIMMs). Combining the new NVM technologies with advances in DRAM based memory stacks has a very high probability of significantly changing the traditional DIMM based memory sub-system architecture.

With the ever-increasing demand from applications for addressable memory, there is a desire to make the new NVM technologies (SCM) appear as normal system memory instead of through a file system. In addition, there is a desire to allow memory on remote nodes also appear as normal system memory to the local node. However, the bandwidth and latency characteristics of SCM and remote memories usually prevent direct access using processor load and store instructions. While there are caches in the system, they are typically designed to cover only the latency of system memory and are not effective for SCM or memory on remote nodes. In addition, many workloads are supported by heterogeneous off-load programming which results in gaps between sustained performance and peak performance as data is transferred to other systems to be processed.

Current systems implementing a global address space typically maintain a coherent and consistent view of memory. These prior art techniques do not scale to a large number of nodes due to the communication overhead required for coherency. In many cases, applications only require a means for providing a consistent view of shared memory, not full coherency. In general, most parallel applications sharing memory employ some form of mutex operations, locks, or semaphores for controlling access to data structure. These locking mechanisms ensure only one process or thread is updating a data structure at a given point in time. In this case, software can flush any caches before releasing the lock to maintain a consistent view of memory, removing the need for coherency. However, when multiple processes need to simultaneously update the same data structure, the locking mechanism can impact performance, so there is a need for a means to maintain a consistent view of memory when multiple processes or threads are updating the same data structure.

SUMMARY

An approach is disclosed that maintains a consistent view of a plurality of virtual addresses by a local node which writes a first value to a selected virtual address and, after writing the value, establishes a snapshot consistency state of the selected virtual address. The selected virtual address is shared amongst any number of processes and the processes includes a writing process and other processes that read the first value. After writing the first value, the writing process writes a second value to the virtual address. Even after writing the second value, the first value is still visible to the other processes. In one embodiment, the virtual address is a global data object maintained by the system in a global virtual address space.

In one embodiment, the writing process runs on the local node and the other processes run on any number of different nodes including a plurality of remote nodes. In a further embodiment, the snapshot consistency state is established after writing the first value and before the writing of the second value. In a still further embodiment, the approach prevents other processes from reading the second value. When the consistency state of the virtual address is exited, the approach allows the other nodes to read the second value from the virtual address.

In one embodiment, a different writing node writes the first value to the virtual address. In a further embodiment, subsequent to writing the second value, the second value is visible to the writing node. In a still further embodiment, a number of values are written to the virtual address and these values are consolidated using a resolution function (e.g., average, min, max, etc.). In one embodiment, the resolution function is a user defined function and resolves updates to a memory location that were made by at least two processes.

In one embodiment, a consistent view a virtual address is maintained by a plurality of processes, including a writing process running on a local node and one or more other processes running on one or more remote nodes. The local node and the remote nodes are included in a plurality of nodes that share a memory area where the virtual address is stored. A first value to the virtual address and a second value is written by the writing process to the virtual address. Subsequent to writing the second value, the first value is visible to the other processes and the second value is hidden from the other processes. In a further embodiment, a plurality of subsequent values including the second value to the virtual address is written by the one or more of the processes. The subsequent values are hidden from each of the processes that did not write the respective subsequent value. The plurality of subsequent values are resolved utilizing a user defined function to resolve the updates to the virtual address.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 2 shows a diagram depicting example extended memory node and system designs;

FIG. 25 an example of possible entries in the multi-level directory for describing where Global Virtual Address are physically located;

FIG. 52 shows a table depicting Global Virtual Address Space (GVAS) APIs;

FIG. 53 shows a table depicting Coordination Namespace APIs;

DETAILED DESCRIPTION

Figure 1:
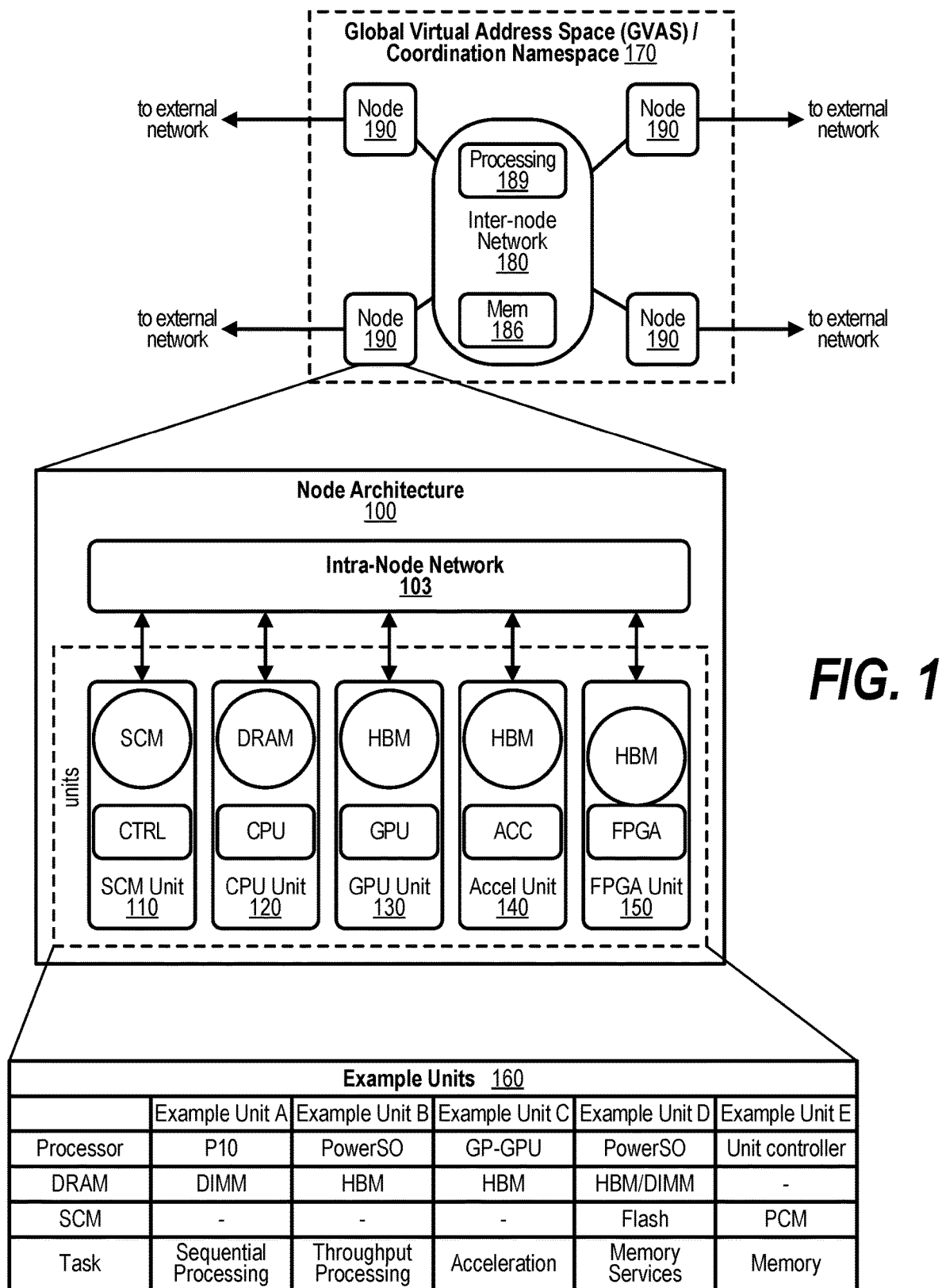
FIG. 1 shows a diagram depicting an extended memory system overview.
Figure 57:
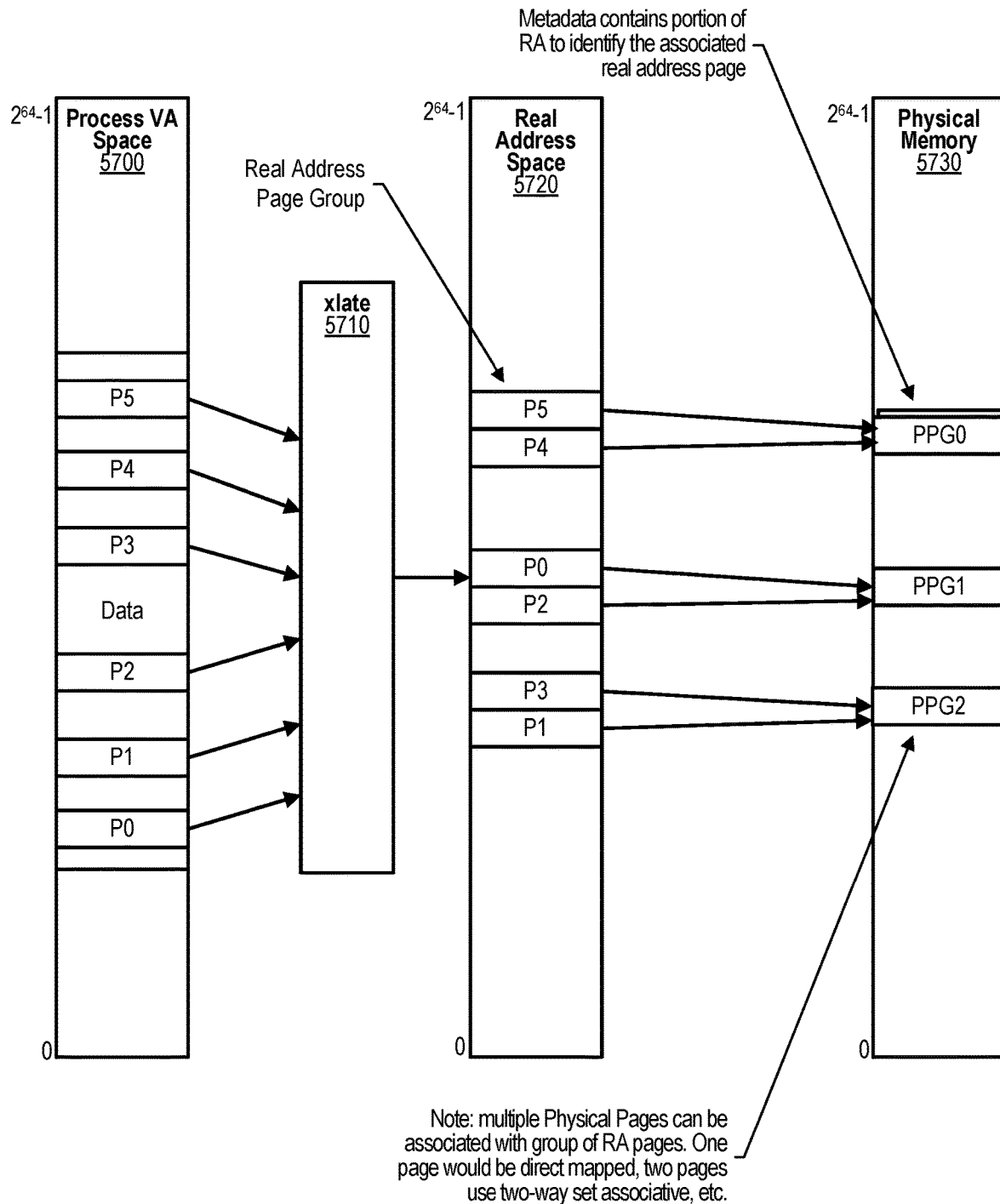
FIG. 57 shows an example usage of a real address tag in the metadata.

FIGS. 1-57 describe an approach that addresses the issue of scalability by providing a relaxed form of memory consistency. There are many different consistency models in published literature, but none address the flexibility needed to provide software with defining the consistency model based on the data structure type. In addition, previous approaches do not provide a means to consolidate updates to the same virtual address made independently.

The disclosed relaxed consistency model provides software with a means for relaxed consistency for performance while also allowing for more strict consistency when needed for control information. In addition, the disclosed method allows for multiple processes and thread to simultaneously update a data structure while maintaining a consistent view of memory for all processes and threads.

FIG. 1 depicts a schematic diagram illustrative of a Data Centric System (DCS) architecture constructed using a Node Architecture 100. At the conceptual level, this architecture enables constructing a system from "units" that combine memory pools and processing capability. As shown in the FIG. 1, multiple types of units are possible. A node may contain a single unit or multiple units. Examples of units 160 in a node, may include a memory service unit (SCM Unit) 110, a Sequential Processing unit (DRAM+CPU) 120, a Throughput Processing unit (HBM+Graphic Processing Unit (GPU)) 130, and acceleration unit 140 or Field field-programmable gate array (FPGA) unit 150. Unlike previous architectures where GPUs and accelerators are dependent on the host processor, units are independent and treated as peers under the DCS architecture. These units may be optimized for specific computational and memory task. The architecture depicts a collection of units where intra-node network 103 provides an efficient coherent interconnect between the units within a single node and Inter-node network 180 interconnecting the nodes 190 within the system. Similar to a unit, the Inter-node Network 180 may also contain memory (Mem) 186 and associated processing 189. The External networks identifies access beyond the system.

In some embodiments, a system is constructed from Nodes 190 connected using an Inter-node Network 180. Logically, the Inter-node Network is an extension of the Intra-Node Network 103. The networks differ in latency, bandwidth, and other physical characteristics. The latency optimized intra-node network allows for coherent load/store access between units. The inter-node network has characteristics that enable scaling to an exascale system while also enabling non-coherent load/store accesses between nodes.

The Data Centric System (DCS) architecture includes an Extended Memory (EM) architecture for accessing memory beyond a node 190. The Extended Memory (EM) architecture includes two methods for accessing memory: the Global Virtual Address Space (GVAS) and the Coordination Namespace methods 170 distributed over the full system. Nodes within the DCS architecture have four major characteristics: (1) Capable of being managed by a single operating system. (2) Efficient coherent load/store access to all memory pools within the node. (3) Global Virtual Address Space for referencing memory pools inside and outside the node. (4) Access to a system wide Coordination Namespace.

In prior systems, each node typically has a fixed topology and limited number of configurations. For example, a node may have two (2) general-purpose processors, 256 GB of DRAM, zero (0) to six (6) Graphical Processing Units (GPUs), and one (1) or two (2) network devices. When constructing large systems, this fixed topology may cause an imbalance in resources. For example, if the targeted application requires a GPU to CPU ratio of 12 to 1, the system would end up with 50% of the general-purpose processors not being used. If the ratio was equal to or lower than 6 to 1, a heterogeneous combination of nodes (some with fewer than 6 GPUs) could meet the ratio, but the node would be over designed and GPU resources are not used. For optimal flexibility in large system design, there needs to be a set of units individually connected to a network and the means for dynamically configuring these units into a node. Therefore, there is a need to dynamically create a logical grouping of units to perform the functions of the targeted application.

The DCS architecture views the system as a collection of memory pools with attached processing rather than a collection of computational engines and associated memory. The subtle reordering places focus on memory allowing programmers to define the data organization, layout, and distribution across the various memory pools in the system. The approaches described herein simplifies managing the multiple memory pools and the extended memory architecture provides a consistent view of memory across all units in the system or a subset of units in the system. From a conceptual point-of-view, the plurality of Nodes 190, may be viewed as a single flat network connecting all units together as peers with equal access to all memory pools and compute resources in a consistent manner. The independent nature of the units enables constructing a system with the proper balance of Sequential Processing units and Throughput Processing units at the system level to meet the needs of a variety of applications and workflows. The approach is to present each memory pool and associated computational capability as independent units to software. A method for dynamically creating a logical grouping of units from one or more Nodes 190 to perform an application is disclosed, wherein at least one of these units can run an operating system. The units may be, for example, a combination of processors, programmable logic, controllers, or memory. Example Units 160 contains a list of example units and does not imply any specific limitations on the types of units within a system with many other types possible, the units and devices are, but not limited to, general-purpose processors, special purpose processors, programmable logic devices, controllers, memory, and the like. To dynamically configure a logical group, these units need to appear to software, especially the operating system and device drivers, as if these are all part of a physically connected system within the shared memory space. To support the connected view, a system manager or management software may assign each unit within a Node 190 to an application and its corresponding Global Virtual Address Space. The system manager may schedule jobs that run over the full set of nodes in the system, start jobs (applications or workflows), and assign the resources at job launch when the required resources are available.

This is like how the cores and GPUs of a traditional node are assigned by the OS, but at a system wide level. The extended memory architecture extends the shared memory space (a Global Virtual Address Space) to other nodes 190 and provides an efficient means for storing data, communications, and coordination within applications and workflows through a separate, system-wide Coordination Namespace. Units are the fundamental building blocks for a system. In an embodiment, these units may run a specialized kernel for local management in addition to an operating system. This structure allows for combining both traditional and specialized units in various ratios to create a system tailored to the needs of a specific application or workflow. The intra-node network connects units within a node while an inter-node network connects a plurality of nodes to create an exascale system. The intra-node network is optimized for coherently connecting units which are physically close. The inter-node network may be a network such as, but not limited to, Ethernet or InfiniBand with optimizations for enabling a Global Virtual Address Space across the connected Nodes. As depicted in FIG. 1, the node architecture may include external network connections providing access outside of the system. These external network connections are networks, such as, but not limited to, Ethernet or InfiniBand attached to each node. One or more units within each node acts as a bridge from the intra-node network to the industry standard networks.

From a physical point of view, the term memory traditionally refers to the DRAM associated with a system. Thus, an operating system in such a system associates real addresses with DRAM locations. A virtual address translation mechanism converts virtual addresses in a user application to these real addresses. During application execution, the operating system may relocate the physical contents pointed to by a virtual address to some other medium like non-volatile memory or disk. In this case, the application's operation stalls when accessing the associated virtual address until the physical contents are moved back into DRAM and address translation is re-established by the operating system. The extended memory architecture extends this concept of memory in two directions. First, the term memory refers both to DRAM and to SCM associated with the node and to DRAM and SCM on remote nodes. This provides the operating system with a larger range of physical memory to which a virtual address can be associated. The second extension is a complementary method, provided to the programmer, to facilitate access to Named Data Elements (NDEs) anywhere in the system, at any time. In contrast to the byte-level virtual address used to reference data, these NDEs exist in a new namespace and are referenced by a name or a combination of name and datum within the NDE's contents. The combination of these two techniques provides new and innovative mechanisms for accessing memory within a node as well as across nodes. In addition, the Coordination Namespace allows for accessing address spaces corresponding to different applications within a workflow independent of time. The extended memory architecture defines the memory models and provides example access methods for extending memory beyond a single unit within the system. Embodiments disclosed herein include two memory models and three main access methods for extended memory. Using the base facilities provided by the extended memory architecture, many different memory abstractions are possible through software libraries.

In an example embodiment, two memory models provided by the extended memory architecture are a Global Virtual Address Space and a Coordination Namespace. The Global Virtual Address Space model provides an application with a shared virtual address view for memory distributed across units in the system. This model provides byte addressability of local physical memory as well as physical memory located on remote nodes and allows the sharing of virtual address pointers between processes running on different nodes. The Coordination Namespace model, hereafter referred to as the Coordination Namespace or CNS, provides an alternate view of extended memory that is separate from a processes' virtual address space. In the Coordination Namespace, references to extended memory use a "name" for accessing a finite, ordered list of immutable values referred to as a Named Data Element (NDE). In an exemplary embodiment, the first field associated with every NDE is its name, a character string with an implementation dependent maximum length. The "name" references a NDE located in the Coordination Namespace. The "name" can simply be the first field, the name, a search template for any set of the fields in the NDE, and the like and may be referenced herein as a "name," a "key," or as a "NDE-name." The Coordination Namespace allows access to NDEs contained within a distributed object store.

While it is possible for both these memory models to concurrently exist in a system, a given physical memory location is only accessible using one of the models. In an example embodiment, three example access methods are provided by the extended memory architecture: (1) Direct load/store access to memory located within a node. (2) An asynchronous copy method. (3) A NDE access method. The load/store method provides direct access to memory distributed across the nodes (extended memory). In this case, data moves directly between a memory location and the registers of processor or device. Since most processors and devices are sensitive to access latencies, in an exemplary embodiment, this method would be limited to storage with acceptable latencies or cached to mitigate the latency effects. The asynchronous copy method provides a set of get and put commands for efficiently copying memory blocks between units and nodes. These commands use the same addressing mechanism as loads and stores but move larger blocks of data and can scatter or gather multiple blocks during the copy operation. The NDE access method may provide a set of commands to create, read, retrieve, and destroy NDEs in the Coordination Namespace.

The set of commands described herein are for illustrative purposes only where changes, variations, new, and differences are expected in various embodiments of the concepts described herein. In an example embodiment, each unit contains a pool of memory. Each unit divides its memory into one or more regions each having one of three designations: (1) Globally accessible. (2) NDE storage. (3) Local. An embodiment of the extended memory architecture may aggregate memory regions designated as globally accessible into a Global Virtual Address Space and allocate memory regions designated as NDE storage to a distributed Coordination Namespace. Memory regions designated as local are only accessible by components within the unit and are not visible to other units within the system using a Global Virtual Address. In an embodiment, each node contains an extended memory network controller that provides the network interface for accessing both the Global Virtual Address Space and a CNS controller that provides access to the Coordination Namespace. For the direct load/store and asynchronous copy methods, the extended memory network controller uses a virtual address to locate the remote data and perform the data movement. When accessing the Coordination Namespace, the CNS controller [Client or Server] may perform a distributed hash function on the NDE-name to locate the data and perform the data movement. The CNS Server allows access to NDEs in a distributed system in a similar way as load-store instructions in a typical instruction set allows access to locations in a virtual address space. Furthermore, these NDEs are located beyond an application's virtual address space. NDEs and data in the Global Virtual Address Space may persist beyond the tenure of the application.

FIG. 2 depicts possible node designs. A first design, Node with DIMMs 210 incorporates HBMs and SCM along with DIMMs. A second node design, Node without DIMMs 220 eliminates the DIMMs tier of memory. FIG. 2 also depicts example embodiments of an integrated memory sub-systems. In Node with DIMMs 210, the DIMMs and HBM are treated as system memory while the main purpose of SCM is to serve as the persistent storage. In the Node without DIMMs 220, the SCM is the main system memory and also serves as the persistent storage while the main purpose of the HBM is to act as a very large cache improving the latency as seen by the CPU. In addition, the HBM serves as the SCM buffer, which can be required for reliable operation. The "$" indicates the memory may be used as a cache. These node designs are examples for illustrative purposes and do not imply any limitations on the possible node designs or integrated memory sub-systems. For example, a node design can contain only DIMMs and SCM. The SCM in the Node with DIMMs 210 can also be treated as part of system memory.

Using memory near the processor as a cache for memory more distant than the near memory may provide for increased performance. Treating memory as a cache differs from processor caches in the way a cache line is fetched or written back to memory. Typically, the processor hardware is responsible for management of the cache. When using memory as a cache, there is a separate memory controller for SCM or a Network Interface Card (NIC) and firmware that fetches content from distant memory (SCM) or memories from a different node (remote memory) to be stored in a memory closer to the processor. By using SCM as the main memory, there is a potential to increase the amount of memory while maintaining or even improving the cost, power, and performance of the system. Advances in the performance and functionality of memory and networks may also affect future system architectures. For example, as the bandwidth and latencies of networks improve, remote systems will appear much closer (lower communication latency) than in past systems. In addition, Optical Circuit Switches (OCS) may also lower the network switching latencies to bring the systems even closer.

FIG. 2 also depicts possible system designs influenced by networking trends. System Design A 240 shows multiple Sequential Processing units (SPUs) connected to multiple groups of Throughput Processing units using OCS Based Switch technology. System Design A provides more flexibility in assigning the proper ratio of Sequential Processing units and Throughput Processing units to a job at launch and preserves a tight coupling of Sequential Processing units and Throughput Processing units. OCS technology is a good fit for this interconnection network since the routing is static for the duration of the job. However, this design has the expense and complexity of a second network fabric, and slightly increases the latency between units when compared to a node design with Throughput Processing units directly connected to Sequential Processing units. In addition, the OCS only connects a subset of Sequential Processing units and Throughput Processing units in the system. A full system is comprised from multiple blocks, represented by System Design A, connected using an InfiniBand network which adds additional complexities in resource management. A second design System Design B 250 connects the Sequential Processing units and Throughput Processing units in the system using an InfiniBand network. The expected network performance and functionality makes this system design a possibility in the exascale timeframe. Like System Design A, System Design B also provides flexibility in assigning the proper ratio of Sequential Processing units and Throughput Processing units to a job at launch without the complexity and cost of the second network fabric and removes the hierarchy of blocks imposed by the first design. The disadvantages are the looser coupling between the units resulting in longer latencies. The possible node and system designs resulting from the innovative use of technology examples in FIG. 2 only scratch the surface of the spectrum of possibilities for an extreme-system design in the exascale timeframe. Nevertheless, these possible system designs along with countless other variations help shape the extended memory architecture, which enables these designs to become a reality.

Figure 3:
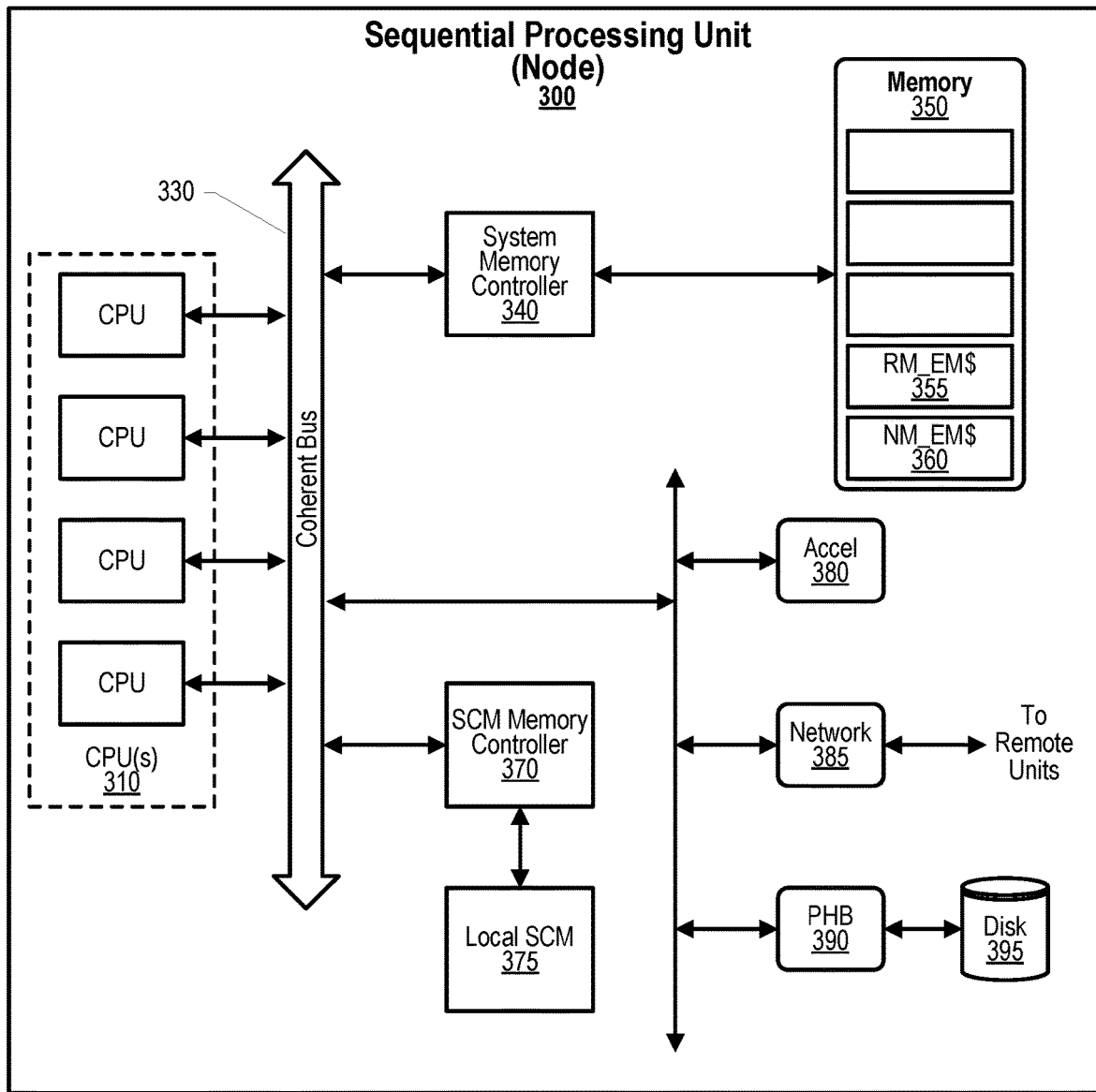
FIG. 3 shows a diagram depicting exemplary components of a sequential processing unit (node)

FIG. 3 depicts an example embodiment of a Sequential Processing unit (SPU) 300 in a node supporting caching remote memories within a local system's storage. The local system has one or more central processing units (CPUs) 310 accessing memory 350 via a coherent bus 330. A PCI-Host Bridge (PHB) 390 connects to a Disk 395 which may be used for paging or for other purposes, such as, loading programs. By way of example, and not limitation, other architectures may be used to perform I/O, such as, the Industry Standard Architecture (ISA) bus, the Micro Channel Architecture (MCA) bus, and the Peripheral Component Interface (PCI). System memory controller 340 enables regions of local memory 350 to be used as a cache. The local memory may be, for example, DRAM, HBM, or the like, and function as both system memory and a cache for remote memory or locally attached SCM 375 (more distant than the local memory 350). A large physical address window (equal to or larger than the memory regions allocated for the cache) may be used for mapping remote and local SCM. Smaller blocks of the physical address space are then mapped, using a cache directory, to a smaller physical memory area allocated to the extended memory caches (RM_EM$ or NM_EM$). In an embodiment, the system memory controller 340 may support multiple independent cache regions dedicated to caching a memory. For example, the "near-memory" cache (NM_EM$) 360 serves for data stored in the locally attached SCM 375 and the "Remote-memory" cache (RM_EM$) 355 is used for data located in remote memories attached to a remote node. In addition, there can be a plurality of each type of cache. When a referenced datum is not available in the NM_EM$, the reference is forwarded directly to the associated "near-memory" SCM Memory Controller 370, completing the access without any CPU involvement. When a referenced datum is not available in the RM_EM$, the memory controller sends an Extended Memory (EM) Cache Miss exception to one of the CPU(s) 310. A selected CPU may utilize an interrupt vector for handling the EM Cache Miss exception. In an embodiment, a firmware interrupt handler forwards the virtual address causing the exception to an architected network interface to bring a replica of the remote memory into the RM_EM$. When data is returned from the Network 385 and written into the RM_EM$ 355, the exception handler is notified, and the CPU load operation is re-issued and is serviced from the RM_EM$. The exception is used to: 1) Prevent stalling the CPU load for the entire duration of the network operation. 2) Determine the virtual address associated with the miss. The network controller may be configured to allow the firmware exception handler to fetch remote memory without needing a full-fledged device driver. In an embodiment, an architected, low latency interface for performing remote direct memory accesses (RDMA) is configured to route the RDMA request to the correct unit or node based on a virtual address.

Referring to FIG. 3, a schematic diagram of a Sequential Processing Unit 300 representing an example Node is shown wherein the methods disclosed herein may be implemented. The Node is only one example of a suitable system node and is not intended to suggest any limitation as to the scope of use or functionality of embodiments of the invention described herein. The Node could be constructed from a single CPU, a single coherent bus, a single system memory controlling accessing a single memory unit, that is, a Node consisting of a single Unit. Examples of well-known computing systems, environments, and/or configurations that may be suitable for use with the Node include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. The CPUs 310 may be described in the general context of computer system-executable instructions, such as program modules, being executed by a computer system. Generally, program modules may include routines, programs, objects, components, abstract data types, data structures, and so on that perform tasks or logic. The CPUs 310 may be practiced in distributed cloud computing environments where tasks are performed by remote processing devices that are linked through a communications network 385. In a distributed cloud computing environment, program modules may be in both local and remote computer system storage media including memory storage devices.

The Node may also contain other devices such as, but not limited to, Accelerators 380, Networks 385, and SCM Controllers 370 connected to the CPUs 310. By way of example, and not limitation, these devices can be directly connected to the coherent bus 330 or through interface architectures such as Open Coherent Accelerator Process Interconnect (OpenCAPI), or Peripheral Component Interconnects Express (PCIe) bus.

The coherent bus 330 represents one or more of any of several types of bus structures, including a memory bus or memory controller, a peripheral bus, an accelerated graphics port, and a processor or local bus using any of a variety of bus architectures.

The Node typically includes a variety of computer system readable media, such as, Disk 395. Such media may be any available media that is accessible by the Node, and it includes both volatile and non-volatile media, removable and non-removable media. The memory 350 may be any system memory that can include computer system readable media in the form of volatile memory, such as, DRAM and/or a cache memory. The Node may further include other removable/non-removable, volatile/non-volatile computer system storage media. By way of example only, a storage system can be provided for reading from and writing to a non-removable, non-volatile magnetic media (not shown and typically called a "hard drive"). Although not shown, a magnetic disk drive for reading from and writing to a removable, non-volatile magnetic disk (e.g. a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the local SCM may include at least one program product having a set (e.g. at least one) of program modules that are configured to carry out the functions of embodiments of the methods disclosed herein. A program/utility, having the set (at least one) of program modules, may be stored in the SCM by way of example, and not limitation, as well as an operating system, one or more application programs, other program modules, and program data.

Each of the operating systems may have one or more application programs, other program modules, and program data or some combination thereof, and may include an implementation of a networking environment. The program modules generally carry out the functions and/or methodologies of embodiments of the methods as described herein. The Node may also communicate with a set of one or more external devices such as a keyboard, a pointing device, a display, a tablet, a digital pen, etc. wherein these one or more devices enable a user to interact with the Node and/or any devices (e.g. network card, modem, etc.) that enable the Node to communicate with one or more other computing devices. Such communication can occur via Input/Output (I/O) interfaces. These include wireless devices and other devices that may be connected to the Node, such as, a USB port, which may be used by a tablet device (not shown). Still yet, the Node can communicate with one or more networks such as a local area network (LAN), a general wide area network (WAN), and/or a public network (e.g. the Internet) via a network adapter. As depicted, a network 385 communicates with the other components of the Node via the coherent bus 330.

Figure 4:
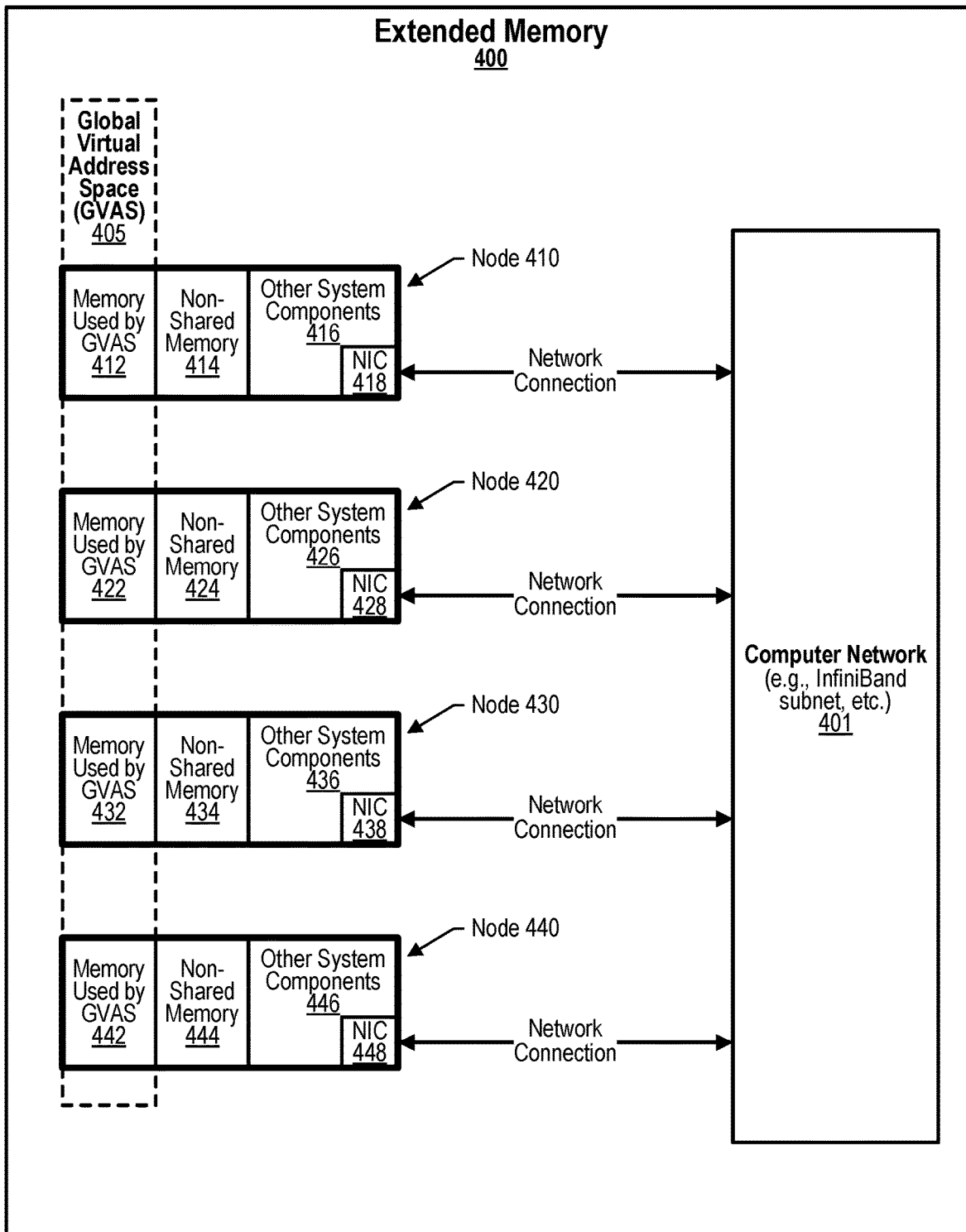
FIG. 4 shows a diagram depicting extended memory forming a Global Virtual Address Space (GVAS)

FIG. 4 depicts schematic view of Extended Memory 400 shown in a computer system with multiple nodes. Each node may be running several application processes under its own operating system. A virtual address translation mechanism converts virtual addresses in a user application to these real addresses. During application execution, the operating system may relocate the physical contents pointed to by a virtual address to some other medium like non-volatile memory or disk. In this case, the application's operation stalls until the physical contents are moved back into DRAM and address translation is re-established by the operating system. The Global Virtual Address Space 405 targets the need for increased memory as seen by a single node by providing the programmer and runtime environments with shared memory that spans across all or a subset of the nodes in the system, thus allowing for dereferencing of pointers by any process in the system. The Global Virtual Address Space (GVAS) remains even after a process terminates allowing data to remain in memory and other processes to reference the memory in the future. The Global Virtual Address Space model provides applications with a common virtual address space for all threads and processes running in a system. This model provides byte addressability of any shared virtual address mapped into the processes' virtual address. Each process uses the same virtual address mapping which allows for pointer dereference to work independent of where the physical memory resides or where the thread is running. Each Node [410, 420, 430, 440] may dedicate a portion of its virtual address space to be used only locally, identified as Non-Shared Memory [414, 424, 434, 444]. Another portion of the virtual address space may be dedicated for addressing memory in the Global Virtual Address Space (GVAS) [412, 422, 432, 442] which may also be referenced as "shared virtual memory." The GVAS memory may contain content homed on a remote node retrieved via a network interface controller (NIC) [418, 428, 438, 448] utilizing a Network Connection to a computer Network (e.g. Infiniband, subnet, etc.) 401. Other System Components [416, 426, 436, 446] may directly access the memory in the GVAS [412, 422, 432, 442]. The memory referenced by a global virtual address may be a replica of slower memory or memory on a remote node that is stored in the memory local to the node reducing the access latency. This replica is stored one of the extended memory caches (RM_EM$ 355 or NM_EM$ 360)

in the local memory. Each of the Nodes in FIG. 4 may have a similar infrastructure or vary.

Applications on modern large-scale distributed computer systems are typically constructed using multiple processes. The resources needed by each process, including its memory, are controlled by an operating system. The operating system also has the responsibility for isolating the resources of the processes from other processes, especially those outside its control. As a result, applications resort to the use of messaging techniques in order to communicate between its component processes. Messaging techniques are also used for communication between different applications within a workflow, though, more commonly, file systems are used for such communication, especially when the communicating applications within the workflow are not concurrent.

The extended memory architecture uses NDEs within a Coordination Namespace to communicate work between applications. In order to manage the Coordination Namespace, the system may also be associated with a Coordination Namespace server that manages a Coordination Namespace located in a distributed manner across all or subset of the memory elements of the system. The parts of the memory of the system associated with the Coordination Namespace is referred to as the Coordination Namespace memory. Parts of this memory may be in the nodes executing the applications, other parts may be in memory dedicated to coordination. The Coordination Namespace addresses the challenges of moving data between phases of a workflow by providing an efficient means for communication between and coordination of the applications within a workflow. In addition, the Coordination Namespace also addresses the need for keeping certain types of data persistent in memory longer than the duration of a single program or application. A Coordination Namespace Server (not shown) may be one of the Other System Components [416, 426, 436, 446] and used for accessing the Coordination Namespace memory.

In order to process Coordination Namespace Requests such as creating and reading NDEs a hashing of a named data element name (key) at a requesting client yields information about the node at which the named data element is located. This avoids the need either to go to a centralized coordination namespace directory or to broadcast the name to all nodes, solutions that are resource- and latency-intensive, and provides a single hop mechanism to locate a NDE.

FIGS. 5 through 12 depict a method for handling CNS NDE requests from a requesting process. The method searches for the name corresponding to the NDE in a Coordination Namespace when the request is a read( ), retrieve( ), and destroy( ). In response to determining an absence of a data corresponding to the NDE, indicating a pending state to the requesting process and creating the NDE in the Coordination Namespace. In response to determining that the data corresponding to the NDE exists, the method returns a successful state to the requesting process. The method may track the request received from the requesting process and responsively notify the requesting process when a value is written to the NDE. The data corresponding to the NDE may be returned to the requesting process while leaving the NDE in the Coordination Namespace using the read command. The NDE may be removed from the Coordination Namespace after the data is returned to the requesting process using the retrieve method. The NDE may be removed from the Coordination Namespace without returning the data to the requesting process using the destroy method. Furthermore, the method creates a NDE with the associated data in the Coordination Namespace when the request is a create( ). The receiving, determining, retrieving, and creating may be performed by a Coordination Namespace server that runs on at least one of a plurality of nodes and that manages the Coordination Namespace. The Coordination Namespace server may return a state to the requesting process, wherein the state is selected from the group consisting of the pending state and the successful state.

FIGS. 5 through 19 depict a method that accesses data referenced or included in a plurality of named data elements (NDEs) in a Coordination Namespace memory that is distributed amongst a plurality of nodes and wherein the plurality of nodes includes a local node and one or more remote nodes. The method receives a name corresponding to a NDE at a local node for an operation related to the NDE to occur in a Coordination Namespace. The method applies a hash function to at least a portion of the name, a result of the hash function being a natural node indicator. The method sends a request for operations related to a NDE to the natural node. Based on the request to the natural node, the method receives a response from the natural node. The response from the natural node may be the data, an indication of where to retrieve the data, an indication of a successful completion of the operation, or a failure to complete the operation. The response from the natural node may be a pending indicator that indicates that the NDE-data is not yet available and will be returned once the NDE-data is available. The response from the natural node may be an actual node indicator in which case the method sends a request for the operation related to the NDE to the actual node. Based on the request to the actual node, the method receives a response from the actual node. The response from the actual node may be the data corresponding to the NDE, an indication of where to retrieve the data, an indication of a successful completion of the operation, or a failure to complete the operation. The response from the actual node may be an indication that the NDE does not reside at the actual node. In response to the NDE not residing at the actual node, the method resends the request for the operation corresponding to the name of the NDE to the natural node. Based on the resend to the natural node, the method receives a second response from the natural node. The second response from the natural node may be a pending indicator that indicates that the NDE-data is not yet available and will be returned once the NDE-data is available. The second response from the natural node may be the NDE-data. The second response from the natural node may be a second actual node, wherein the first node responsively sends the request for NDE corresponding to the name for the NDE to the second actual node. The method may receive an indicator of a preferred node along with the a name corresponding to a NDE at a local node for an operation related to the NDE to occur in a Coordination Namespace and send the request for the operation corresponding to the name for the NDE to the preferred node prior to sending the request to the natural node wherein the sending of the request to the natural node is performed in response to the preferred node not performing the request. The method may update a table of a first preferred node. The method may determine that the NDE is not stored at the first preferred node and update the table with a second preferred node that is supplied by the natural node. The method may attempt to create a NDE at a preferred node and responsive to creating the NDE at the preferred node, notifying the natural node that the NDE is located at the preferred node.

Figure 5:
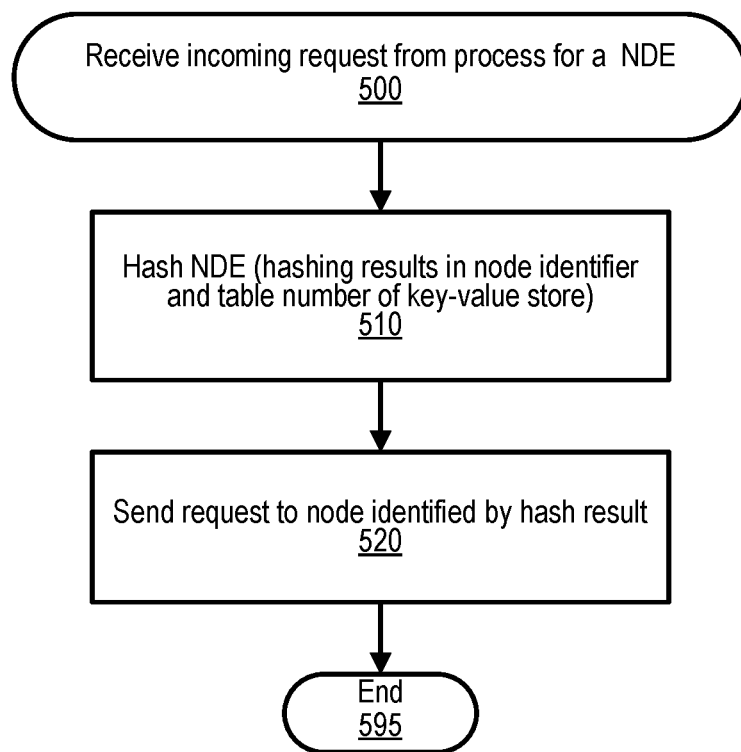
FIG. 5 shows a flowchart depicting steps taken to send a request to a coordination namespace server.

FIG. 5 is a flowchart showing steps performed for routing a Coordination Namespace Access request to a node. At step 500 an incoming request, such as, an out (NDE-name, NDE-value, or key-value) for a NDE is received. At step 510, a hash calculation is performed on the NDE-name (hashing results in node identifier, a table identifier and hash index for the node). The hash is performed on at least a portion of the NDE-name parameter passed to the NDE request. Using the node identifier, at step 520, the incoming request is sent to node identified by hash result and the process ends at step 595.

Figure 6:
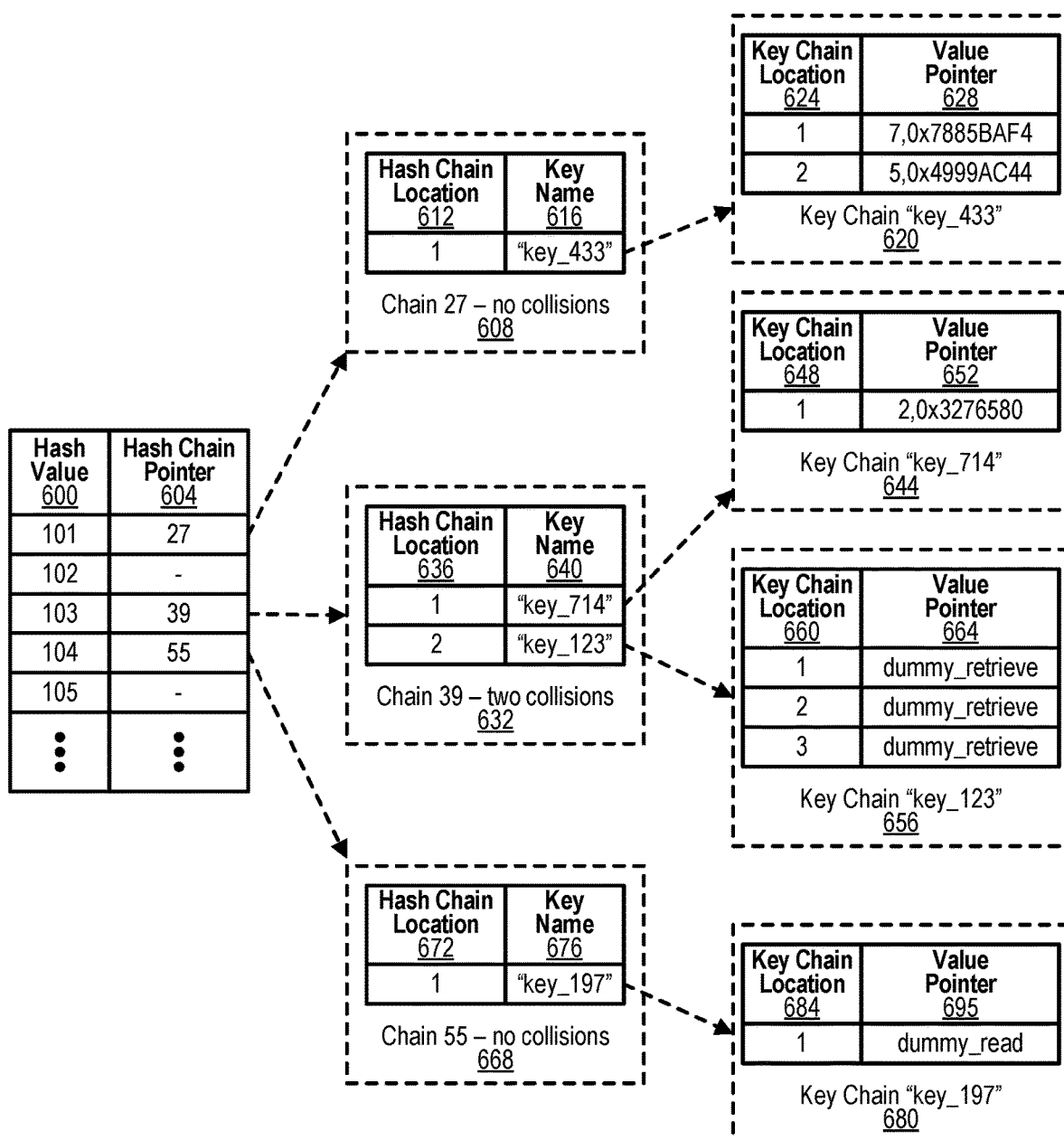
FIG. 6 shows a diagram depicting a structure of a Named Data Element (key-value) store.

FIG. 6 depicts a schematic diagram of an example embodiment of a structure for a hash table. A distributed key-value store uses the hash table structure that may be distributed across several nodes for NDEs stored in the Coordination Namespace. One or more hash tables may be in each node. The hash value (or hash index) 600 is used to select a hash chain pointer 604 that points to a hash chain listing all the keys associated with the hash index. Each hash chain location (612, 624, 636, 648, 660, 672, 684) contains the key name (616, 640, 676) and a pointer to the key chain location (624, 648, 660, 684) that contains a list of value pointers (652, 664, 695) for the value (or data) associated with the key. The "key" can be the first field of a NDE, the name, other meta-data, and the like. It is also possible to store the value associated with a key directly inside the hash chain instead of indirectly accessing the value using pointers. The latter method is more efficient when the value field is small. Hash Value 600 and Hash Chain Pointer 604 depicts an example of a section of a hash table. For purposes of illustration, FIG. 6 depicts a case where the keys are in a unique location, that is, a specific entry in a specific hash table on a specific node. Thus, the sets of keys located in various hash tables are disjoint. However, in general, for reliability or performance reasons, it may be desirable to locate a key in multiple locations in a consistent manner. FIG. 6 depicts the set of NDEs that are identified by hash table. In the example, the hash value (or index) 600 starting from 101 to 105 shows pointers to the hash chains corresponding to each hash value. The hash chain pointer 604 at hash index location 101 indicates chain pointer 27 608. Hash chain 27 608 has a single entry with a key name 616 of "key_433" 620 indicating no collisions as does Hash chain 55 668. The hash chain pointer 604 at hash index location 103 indicates chain pointer 39. Hash chain 39 632 has two entries with a key name 640 of "key_714" 644 and "key_123" 656 indicating two collisions or keys with the same hash value. Each entry in the hash chains contain the key name and a pointer to the associated key chain that reference the data associated with the key name. For example, entry 1 in hash chain 27 points to key chain describing the data associated with "key_433" 620. Key chain has two entries indicating the data associated with "key_433" have two blocks. Key Chain Location entry 1 describes a block containing 7 bytes located at address 0x7885BAF4 and entry 2 describes a block containing 5 bytes located at address 0x4999AC44. Summing the sizes of the two block indicates there are 12 bytes of data associated with "key_433."

The infrastructure may contain flags indicating the type of entries for example, value versus pointer and structured as a linked list or fields indicating counts of items, back up references, as various embodiments may be used. The values in the infrastructure may be entries in other tables or could be virtual addresses subject to being homed in different nodes or even metadata. Associated with each key is a hash value that is a mathematical function performed on the key which may be a number, a set of numbers, text, or a mixture of text and numbers. A hash function on a key may return, a node number, a table identification (ID) within that node, and an index into that table.

It is possible for a hash function to return the same (node, table, index) triple for two different keys, even though the function could be designed to minimize the probability of this type of collision. When a collision occurs, a typical key-value store will resolve the collision by placing the new key in some other available slot using one of several mechanisms, e.g. use a secondary hash function, or scan down the table from the indexed location to look for the next available location, or, chain together all keys hashing to the same location. In the latter embodiment, when a key is to be searched, the hash function will point to a (node, table, index) triple, at which location a linked list is searched for the presence of the key. If a key is not found, a new key is created, a dummy value pointer is inserted, and a null indicator is returned. This is a significant difference from standard key-value stores which typically return only a null indicator and does not create a new key.

If a NDE is requested using a read or retrieve method and the associated NDE is not found in the corresponding hash chain, a dummy entry is created for each request. Key Chain for "key_123" contains three entries indicating three retrieve requests for this key have been received. Each entry contains a dummy value pointer describing the node and process that issued the retrieve request. Similarly, Key Chain for key name "key_197" 680 has a single entry indicating a single read request has been received. When a NDE corresponding to a dummy entry is created, the associated data is returned to the node and process that issued the request.

If the NDE is present in the distributed key-value store and is not associated with a dummy pointer, a success returned value is transmitted back to the requesting process, which then gets unblocked, and proceeds to the next instruction. If the requested NDE is not found in the key-value store, a NDE with a dummy-read or dummy-retrieve pointer is created, dependent on the request, as indicated earlier. In this case, a "request logged" indicator along with the ID and location of the originating process is returned to the Coordination Namespace client. The Coordination Namespace client saves this information in a pending request table, which saves the ID, location, and nature of request. When the Coordination Namespace server receives a create( ) request with a NDE-name matching the logged request, the Coordination Namespace server sends the data associated with the key to the CNS client associated with the dummy_read pointers and removes the logged request (dummy_read pointers). If a dummy_retrieve is encountered, the Coordination Namespace server sends the data associated with the key to the CNS client associated with the dummy_retrieve pointer and stops processing dummy pointers.

It is often desirable, however, to locate NDEs in specific locations different from where the hashed values of their names point to. For example, it may be desirable to locate a NDE at a node that is likely to request it. The process creating the NDE may have information about the location of another process that needs to consume the NDE. By locating it at the consuming node, the system avoids the need to transfer the NDE from some intermediate location when the consuming process requests it, limiting the network communication between the CNS servers and the number of times the data is moved across the network. When requesting to read or retrieve a NDE, the CNS client can first search for the NDE locally or instructed by the requesting process to search a preferred location. In order to enable this, the create( ), read( ), delete( ), and retrieve( ) requests include an optional 'group' field in addition to the original 'name' and 'NDE' fields. 'Group' is a generic term indicating an affinity between NDEs and could be used to specify an absolute node location.

In many cases, the program consuming the NDE can specify the group identifying the location where the NDE is likely to be located. This allows the request to be sent directly to the node where the NDE is likely located. If the NDE access fails, the requesting node can repeat the request and send it to the natural home obtained by hashing the NDE-name. Even if the NDE is not located at the natural home, the hash table will have a relocated key entry indicating the actual home allowing the NDE access to complete successfully. This scheme benefits when the percentage of times that the request needs to be repeated is small. When the program does not have enough information about where the NDE is likely to be located, it is often possible to learn the desirable location for a NDE based on communication patterns of the program. As NDEs are created and retrieved or read, the CNS clients and servers can record the communication pattern (producing and consuming nodes) for a specific class of NDEs in a prediction table and use this information for future invocations of NDEs within the class.

Figure 18:
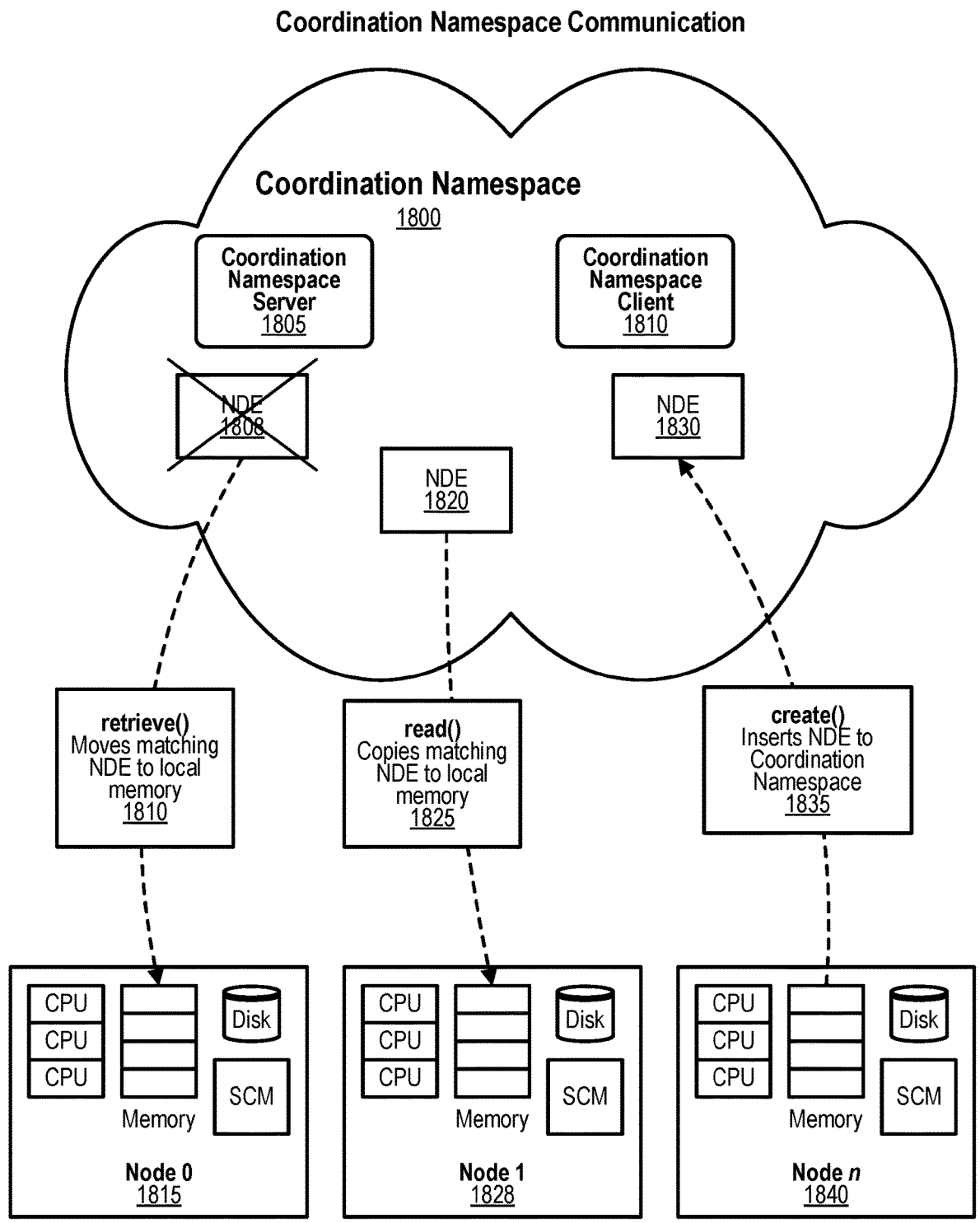
FIG. 18 shows a diagram depicting communication in a coordination namespace computer system.

The NDEs in the Coordination Namespace are immutable—they cannot be modified while they are in the Coordination Namespace. NDEs that are created are not required to have unique names. When multiple NDEs exist with the same name, the CNS server will return any one of the NDEs matching the request. The three access actions that can be made by an application process are depicted in FIG. 18. The first is the create( ) 1835 action that copies a specified block from its process virtual address namespace and places it in the Coordination Namespace. The second is the retrieve( ) 1810 action that causes an existing NDE matching the request criteria to be transferred to a specified location in the processes' virtual address namespace which could be a specified location in the local address space of a requesting node and deletes the NDE from the coordination space, while the third action, the read( ) 1825 action, performs the same operation without deleting the NDE. All actions may block the application from proceeding to next instruction until the action is completed, maintaining the semantics of ordering the NDE request, or non-blocking, allowing the application to continue to the next instruction and NDEs to be processed out of order.

When the Coordination Namespace server receives an create( ) request, it determines an appropriate memory location where the arriving NDE must be stored. This location may depend on several features. For example, if the request is for long-term storage, it may look for an available slot in non-volatile memory. Or, if the node that is likely to use the NDE is known, either because of information provided by the requesting process, or because of analysis/prediction by the CNS server itself, the Coordination Namespace server will look for a memory location closer to that node.

The Coordination Namespace server may need to evict some other NDE to a backup location to create space for the incoming NDE. The eviction could use any one of several known replacement techniques, including the least-recently-used (LRU) algorithm. When the Coordination Namespace server receives a create( ) request as a (NDE-name, NDE-data) pair, it uses the NDE-name as a key for the NDE-data store. The Coordination Namespace server also transmits the ID and location of the process originating the request. If the NDE does not exist, a new NDE is created, and its value pointer is made to point to a free space in memory into which the NDE-value is copied. The CNS server indicates successful insertion to the process that originated the create( ) request, which proceeds to the next instruction in its program if blocked. If the NDE already exists in the table, and if it is not associated with a dummy value pointer, the actions are the same as just listed, except that new NDE is chained to the existing NDEs in a linked list. If the NDE already exists in the table, and is associated with a dummy-read pointer, then the incoming NDE-value is inserted in memory, and the pointer modified to point to a free space in memory into which the NDE-value is copied. If the process of insertion involves changing a dummy-read pointer to a valid pointer, a second message is sent back to the Coordination Namespace server along with ID and location of the requesting server, the nature of the request (in this case, an read( )), and a copy of the NDE-data. If the dummy pointer is converted from a dummy-retrieve pointer, again a message is sent back to the Coordination Namespace server along with the ID and location of the requesting server. Before processing any other request, the CNS server deletes the NDE.

Figure 7:
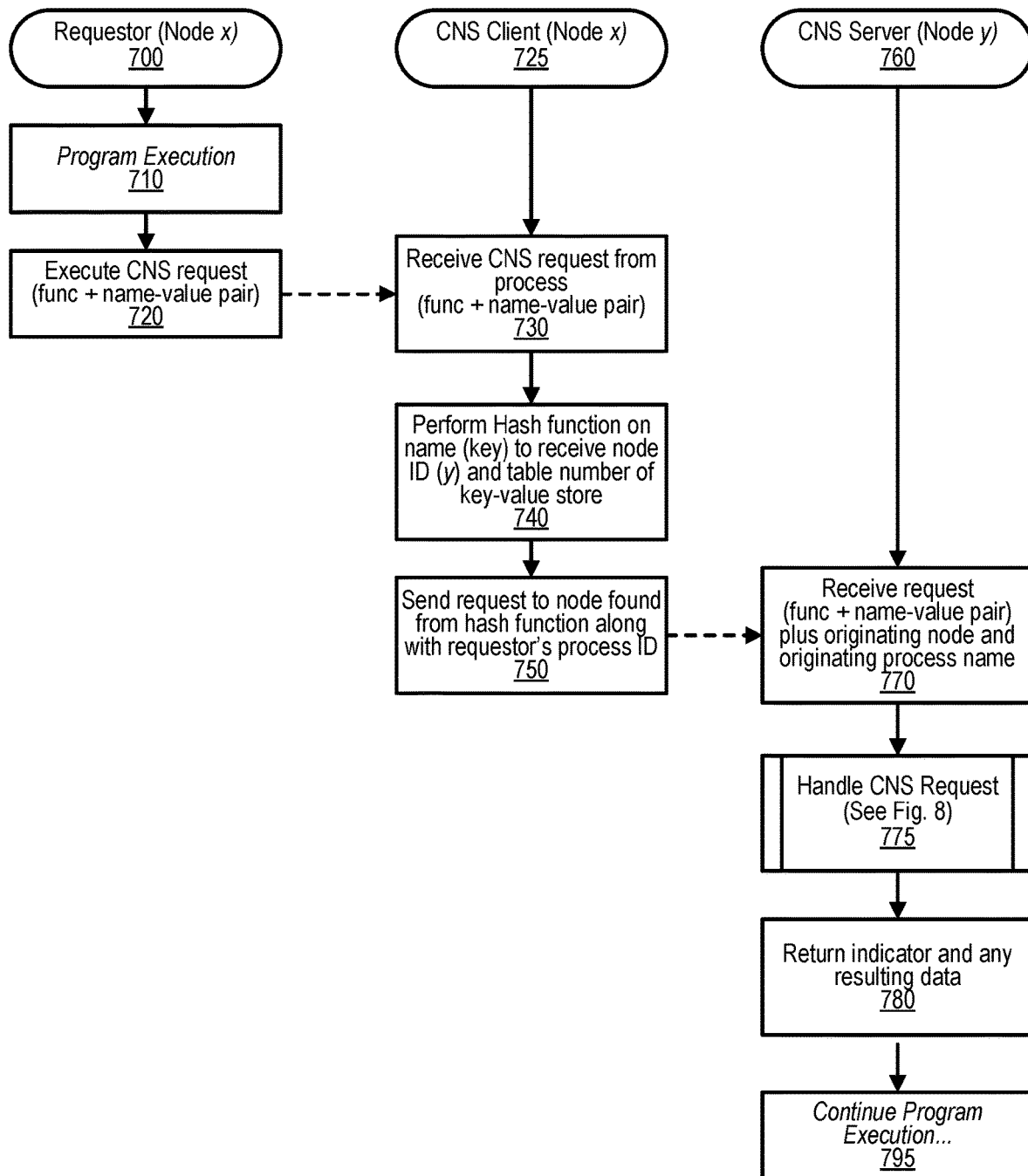
FIG. 7 shows a flowchart depicting steps taken to use a coordinated namespace.

FIG. 7 depicts a flow of handling Coordination Namespace (CNS) request by a node processing an application workload. The handling begins at step 700 where a requestor, Node x, is running an application in application space. As the application is executing at step 710, a CNS request is detected at step 720. Once the CNS request is detected, a system function or library is executed that handles the CNS request, such as, read( ). Control for the request proceeds to step 730 in the CNS Client 725 on Node x. At step 730, a CNS request is received from process with variations that may depend on the operation requests, for example, a create may be represented by: (func+name-value pair). The execution at step 730 may be due to handling a CNS request asynchronously, such as, via command queues, which may include requests received from different process on the node. At step 740, a Hash function is performed on name (key) to receive node ID y, table number of key-value store, and index in table. At step 750, the request is sent to the CNS Server 760 on the node identified by the hash function along with requestor's node and process ID. The request is sent to the CNS Server Node y 760. It is possible for x to equal y. At step 760, the CNS Server (Node y) receives the request and proceeds to step 770, where the Server (Node y) receives request (func+name-value pair) plus originating node and originating process ID. Again, the execution at Node y may be asynchronous, for example, by obtaining queued work. At step 775, the predefined task to Handle CNS Request (see FIG. 8 and corresponding text) is executed. At step 780, control returns to the CNS Client 725 along with a status indicator and any resulting data. At step 795, the execution of the program continues. The flow depicted in FIG. 7 blocks the program execution while the CNS request is processed. Other flows are possible where the CNS request is processed asynchronously allowing the program execution to continue in parallel with the processing of the CNS request.

Figure 8:
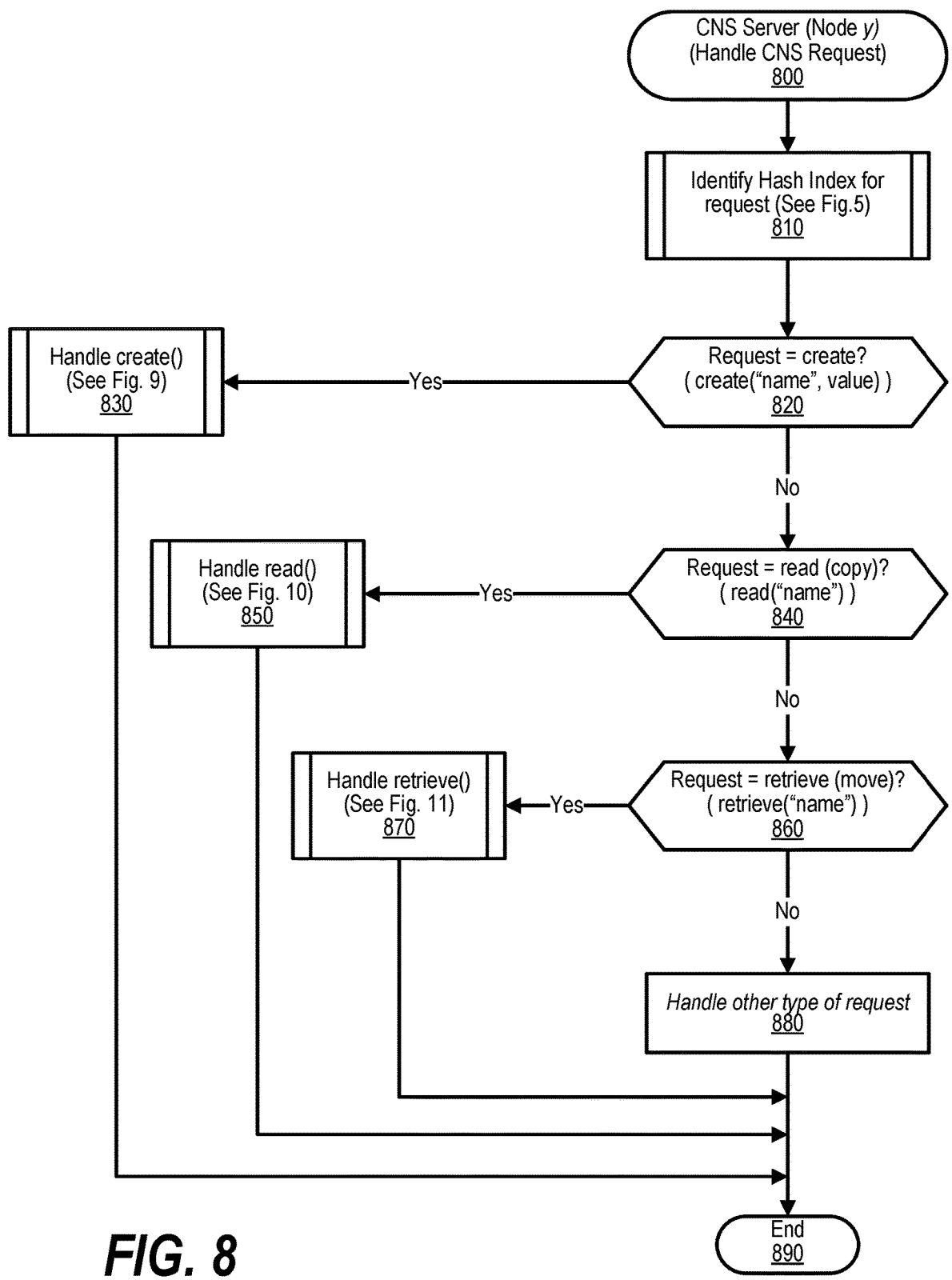
FIG. 8 shows a flowchart depicting steps taken to handle a coordinated namespace request.

FIG. 8 is a flowchart showing steps performed to handle Coordination Namespace (CNS) request by Node y 800. FIG. 8 commences at step 800, where the CNS Server (Node y) is handling CNS requests. In some embodiments, the requests are placed in a queue and the execution at step 800 starts a flow for handling a specific CNS request taken from the queue. The predefined NDE Hash is executed at step 810, where the hash index is identified (See FIG. 5, step 510 and corresponding text for details) for the NDE. A determination is made as to whether request=create (decision 820).

Figure 9:
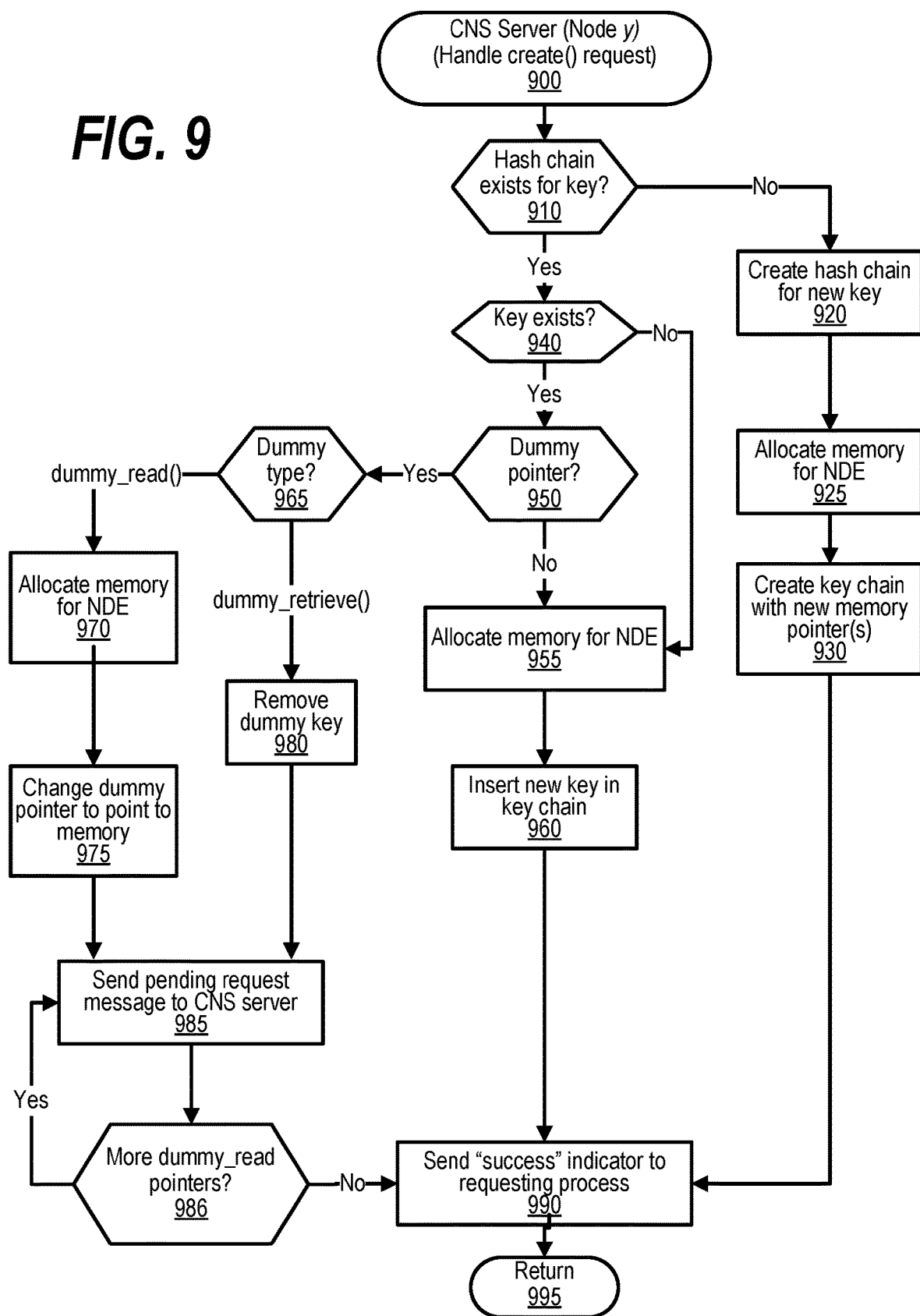
FIG. 9 shows a flowchart depicting steps taken to handle a create( ) request.

If request=create, then decision 820 branches to the 'yes' branch at step 830, where the predefined task of handling create( ) is described in FIG. 9 with details in the corresponding text. On the other hand, if not request=create then decision 820 branches to the 'no' branch where a determination is made as to whether request=read (copy) (decision 840). If request=read (copy), then decision 840 branches to the 'yes' branch to step 850, to handle read( ) (See FIG. 10 and corresponding text). On the other hand, if not request=read (copy), then decision 840 branches to the 'no' branch to determine if request=retrieve (move) (decision 860). If request=retrieve (move), then decision 860 branches to the 'yes' branch to step 870 where retrieve( ) is handled (See FIG. 11 and corresponding text). On the other hand, if not request=retrieve (move), then decision 860 branches to the 'no' branch to step 880, where some other type of request is handled, such as destroy( ), where the destroy( ) process is similar to a retrieve( ), but the data is not returned and a dummy-retrieve entry in the Key Chain is not created. The handling ends at step 890.

FIG. 9 depicts handling the create( ) from step 830 sent to the Coordination Namespace server. FIG. 9 commences at step 900, where the Coordination Namespace server receives a create( ) request as a (NDE-name, NDE-value) pair. The Coordination Namespace server uses the NDE-name as a key to a key-value store. The Coordination Namespace server may also transmit the ID and location of the process originating the request. A determination is made as to whether the hash chain exists for the key (decision 910). If hash chain exists for the key, then decision 910 branches to the 'yes' branch. On the other hand, if the hash chain does not exist for the key, then decision 910 branches to the 'no' branch. At step 920, a hash chain for the new key is created and the key is inserted. At step 925, memory for NDE is allocated. At step 930, a key chain with new memory pointer(s) is created and continues to step 990. If the key chain does exist (yes branch of 910), a determination is made as to whether key exists (decision 940). If key does not exist, then decision 940 branches to the 'no' branch and continues to step 955. On the other hand, if the key exists, then decision 940 branches to the 'yes' branch. A determination is made as to whether there are dummy pointers (decision 950). If there is a dummy pointer, the decision 950 branches to the 'yes' branch. If there are not any dummy pointers, the decision 950 branches to the 'no' branch and continues to step 955. At step 955, memory for NDE is allocated. At step 960, a new key in key chain is inserted and continues to step 990. If a dummy pointer exists (yes branch of 950), a determination is made as to whether dummy type (decision 965) is an dummy_retrieve or a dummy_read pointer. If the type is a dummy_retrieve, then decision 965 branches to the dummy_retrieve branch. At step 980, the dummy_retrieve is removed and continues to step 985. On the other hand, if not dummy type is not a dummy_retrieve, then decision 965 branches to the dummy_read branch. At step 970, memory is allocated for NDE. At step 975, the dummy pointer is changed to point to memory. At step 985, a pending request message is sent to CNS Client corresponding to the dummy_pointer(s). At step 986, A determination is made as to whether there are more dummy_read pointers. If more dummy_read pointers exist, the decision 986 branches to the 'yes' branch and step 985 is repeated for the next dummy_read pointer. If the no more dummy_read pointers exist (decision 986), a "success" indicator is sent to requesting process in step 990. At step 995, the CNS server's handling of the create( ) is complete and control returns to caller.

Figure 10:
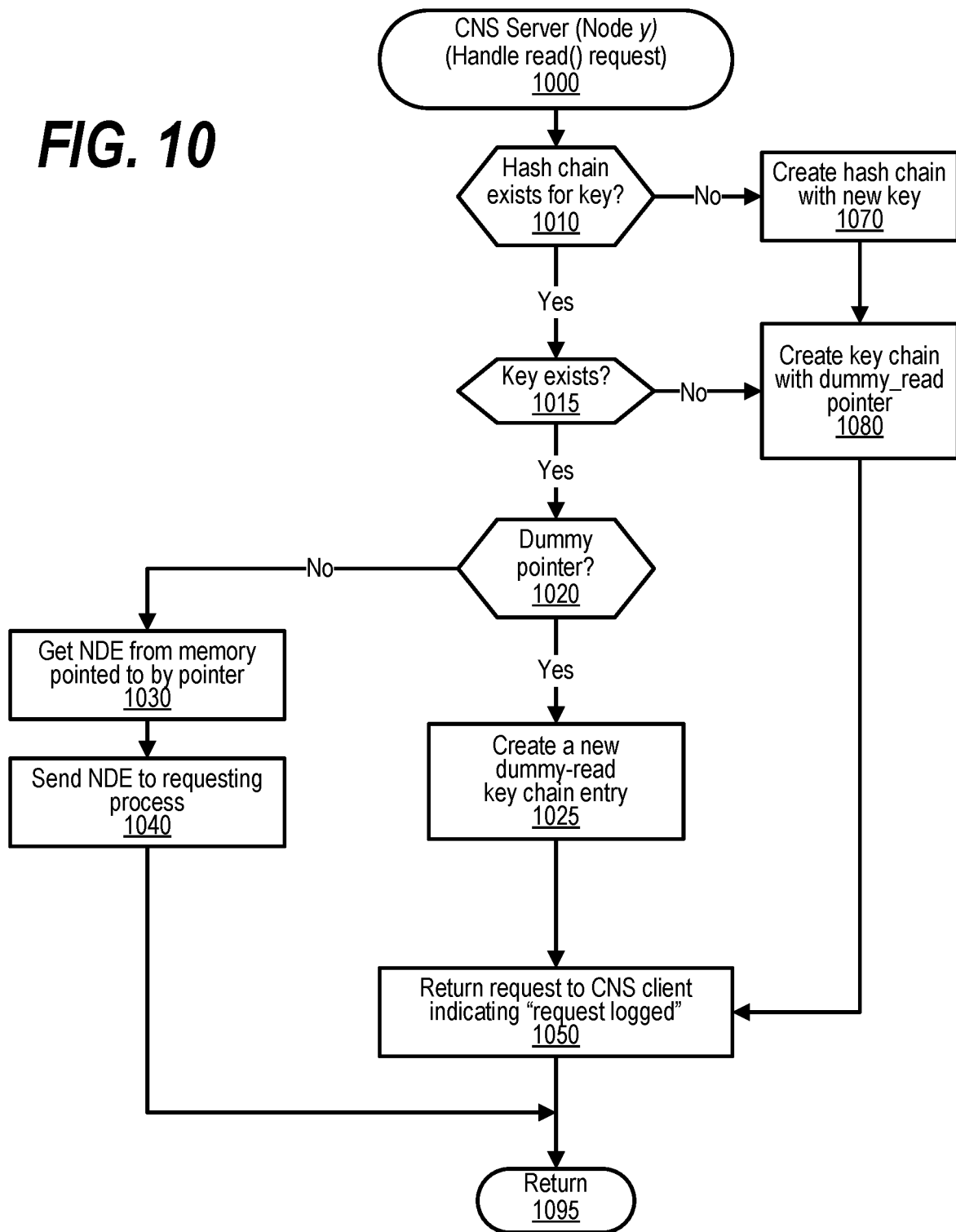
FIG. 10 shows a flowchart depicting steps taken to handle a read( ) request.

FIG. 10 depicts a flow for handling a read( ) request from step 850. FIG. 10 commences at 1000 and shows the steps taken by the CNS Server (Node y) (for a read( ) request). A determination is made as to whether the hash chain exists for the key (decision 1010). If hash chain exists, then decision 1010 branches to the 'yes' branch and continues with step 1015. On the other hand, if the hash chain does not exist, then decision 1010 branches to the 'no' branch to step 1070 where a hash chain for the new key is created. At step 1080, the key is inserted in the hash chain with a dummy_read pointer for the key, and continues with step 1050. If the hash chain exists (decision 1010), a determination is made as to whether the key exists in the hash chain in step 1015. If the key does not exist, then decision 1015 branches to the 'no' branch and continues with step 1080. If the key does exist (yes branch of 1015) a determination is made as to whether a dummy pointer exist in step 1020. If a dummy pointer exists, then decision 1020 branches to the 'yes' branch and continues with step 1025. On the other hand, if a dummy pointer does not exist, then decision 1020 branches to the 'no' branch. At step 1030, the NDE is retrieved from memory pointed to by the value pointers. At step 1040, the NDE is sent to the requesting process and continues to step 1095. If a dummy pointer does exist (decision 1020), a new dummy_read key chain entry is created at step 1025. At step 1050, control returns CNS Client indicating "request logged." Control returns to the caller at 1095 and completes the CNS server's handling of the read( ).

Figure 11:
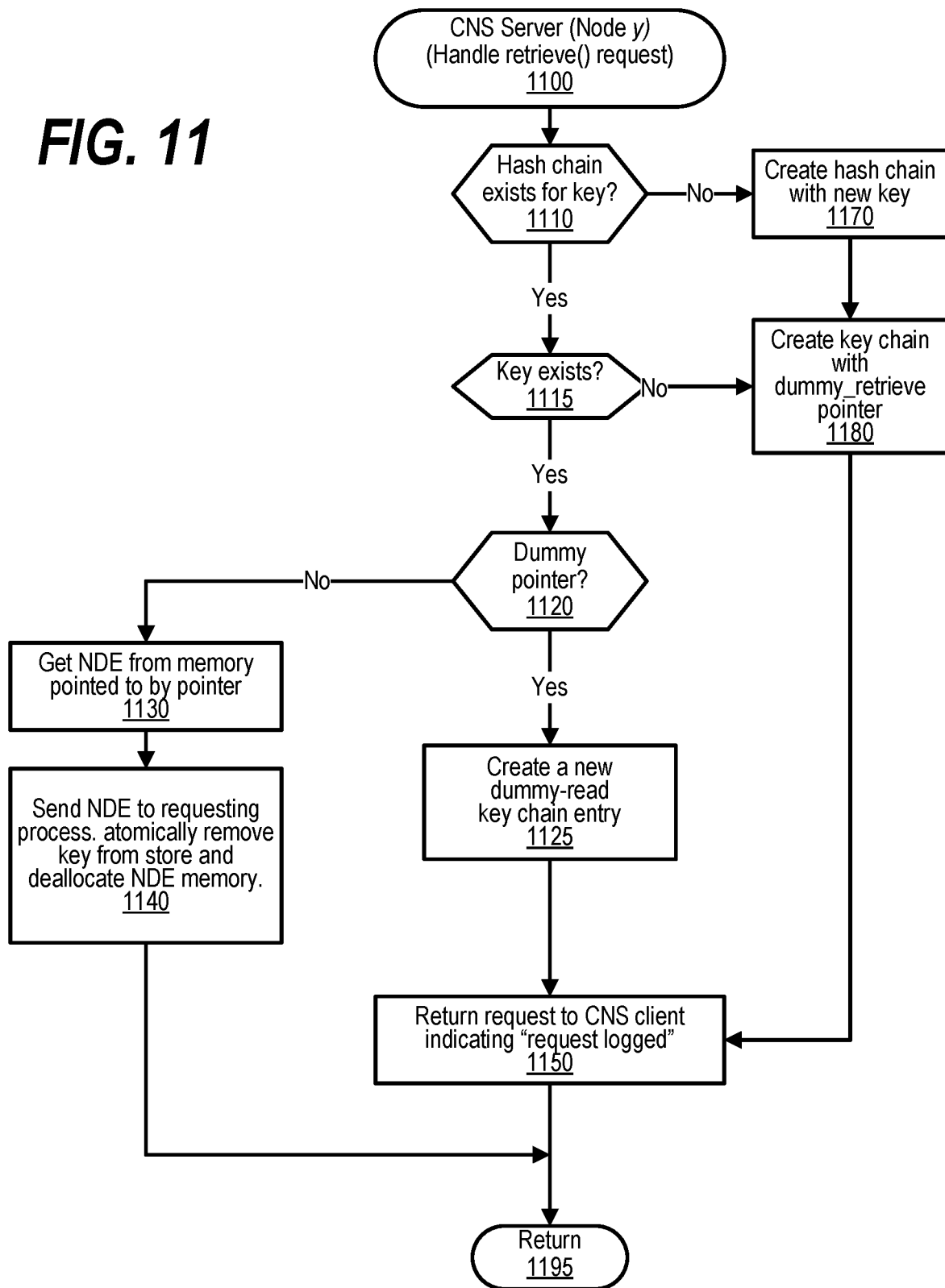
FIG. 11 shows a flowchart depicting steps taken to handle a retrieve( ) request.

FIG. 11 depicts a flow for handling a retrieve( ) request from step 870. FIG. 11 commences at 1100 and shows the steps taken by the CNS Server (Node y) (for a retrieve( ) request). A determination is made as to whether the hash chain exists for the key (decision 1110). If hash chain exists, then decision 1110 branches to the 'yes' branch and continues with step 1115. On the other hand, if the hash chain does not exist, then decision 1110 branches to the 'no' branch to step 1170, where a hash chain for the new key is created. At step 1180, the key is inserted in the hash chain with a dummy_retrieve pointer for the key, and continues with step 1150. If the hash chain exists (decision 1110), a determination is made as to whether the key exists in the hash chain in step 1115. If the key does not exist, then decision 1115 branches to the 'no' branch and continues with step 1180. If the key does exist (yes branch of 1115) a determination is made as to whether a dummy pointer exist in step 1120. If a dummy pointer exists, then decision 1120 branches to the 'yes' branch and continues with step 1125. On the other hand, if a dummy pointer does not exist, then decision 1120 branches to the 'no' branch. At step 1130, the NDE is retrieved from memory pointed to by the value pointers. At step 1140, the NDE is sent to the requesting process, the key chain is deleted and associated memory freed, and the key is removed from the hash chain. If the hash chain has no more entries, the hash chain is also deleted. The process continues to step 1195 after step 1040 is complete. If a dummy pointer does exist (decision 1120), a new dummy_retrieve key chain entry is created at step 1125. At step 1150, control returns CNS Client indicating "request logged." Control returns to the caller at 1195 and completes the CNS server's handling of the retrieve( ).

While not shown, the flow for handling a destroy( ) request is similar to a retrieve( ) request. When handling a destroy( ) request, the data is not returned to the CNS client if a data corresponding to the key is not retrieve in step 1130 and not returned to the CNS client in step 1140. If the hash chain is not found ('no' branch of decision 1110) or dummy pointers exist ('yes' branch of decision 1020), control returns to the caller indicating a key was not destroyed.

Figure 12:
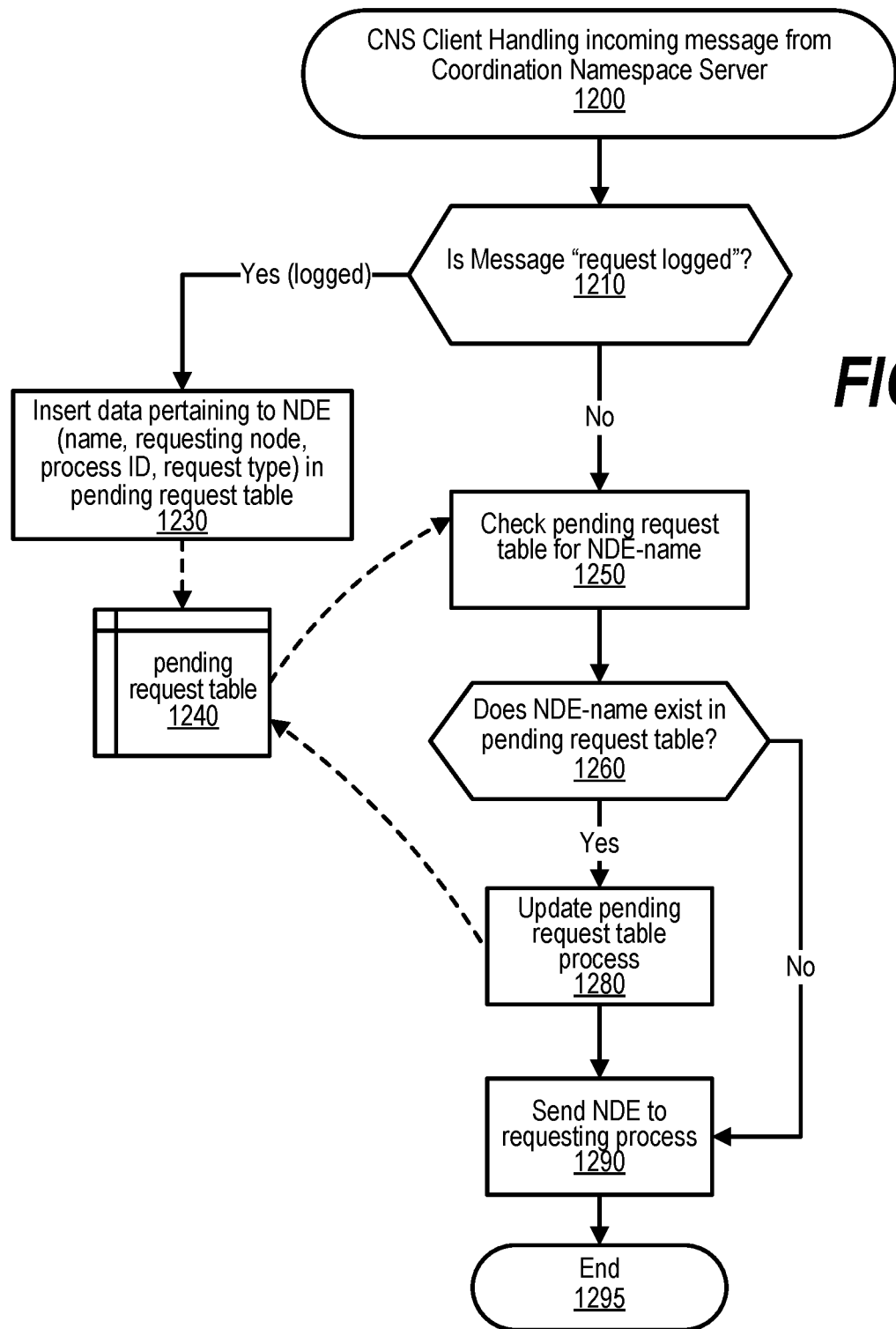
FIG. 12 shows a flowchart depicting steps taken to handle an incoming message for a named data element.

FIG. 12 processing commences at 1200 and shows the steps taken by a process for the CNS Client handling of incoming message from Coordination Namespace Server. The process determines as to whether a message is "request logged" (decision 1210). If is message is "request logged", then decision 1210 branches to the 'yes' branch. On the other hand, if message is not "request logged", then decision 1210 branches to the 'no' branch. At step 1230, the process inserts data pertaining to NDE (name, requesting node, process ID, request type) in pending request table 1240. At step 1250, the process checks pending request table for NDE-name as to whether does NDE-name exist in pending request table (decision 1260). If pending request for NDE-name exist in pending request table, then decision 1260 branches to the 'yes' branch. On the other hand, if pending request for NDE-name does not exist in pending request table, then decision 1260 branches to the 'no' branch. At step 1280, the process updates pending request table process. At step 1290, the process sends NDE to the requesting process. FIG. 12 processing thereafter ends at 1295.

Figure 13:
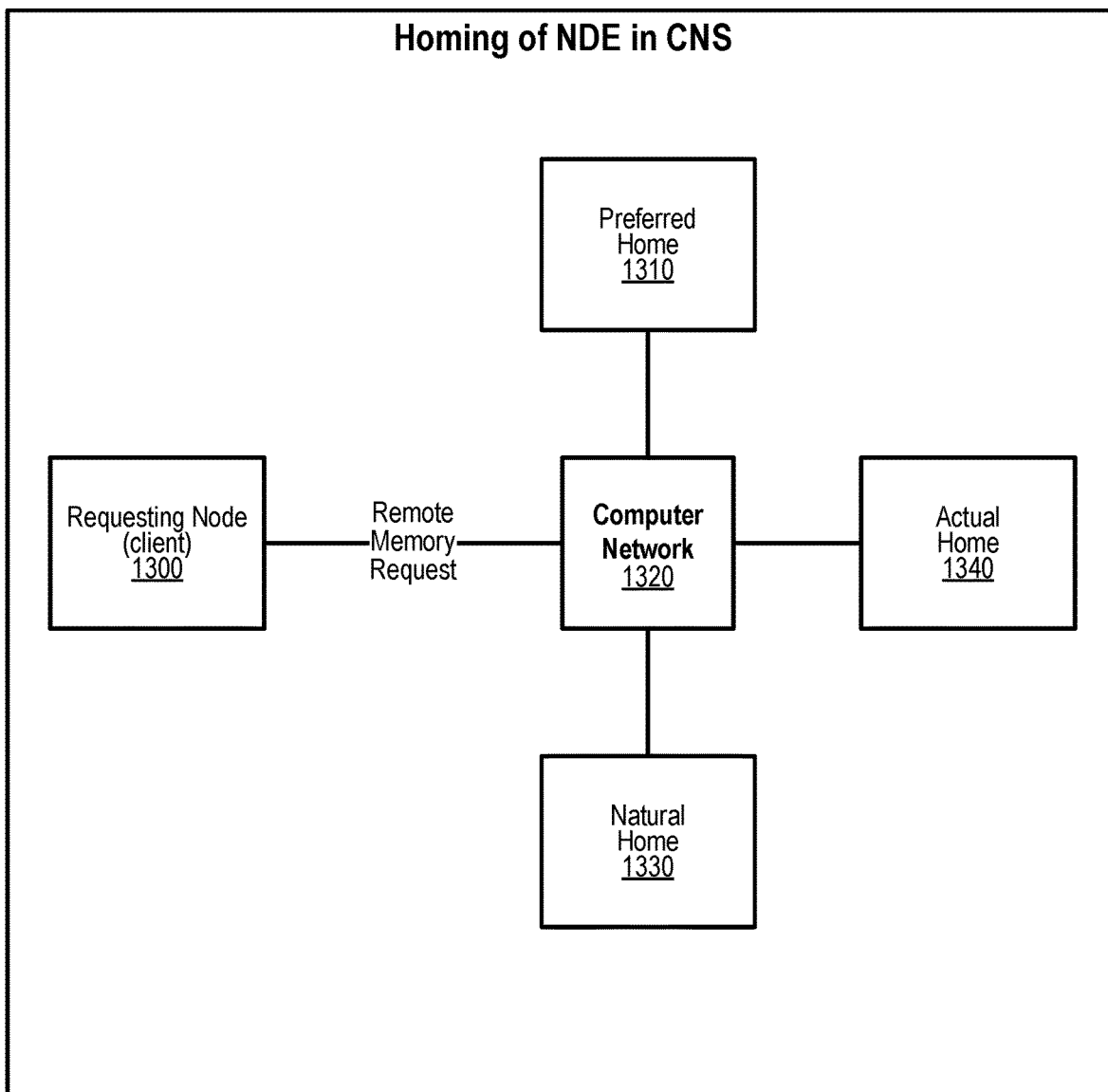
FIG. 13 shows a diagram depicting the homing of a named data element (NDE) in a Coordination Namespace (CNS)

FIG. 13 depicts a schematic overview of where NDEs are "homed" in Coordination Namespace (CNS). The requesting Node (client 1300) is the location running the process making the NDE request. The hash algorithm may be applied to the NDE-name to identify the Natural Home 1330. The Natural Home directly or indirectly indicates the node where the NDE is created or may be found if no other information is provided. The Preferred Home 1310 may be provided by the process making the request or by prediction algorithm in the CNS client, for example, by an affinity parameter. When supplied, the Preferred Home 1310 directly or indirectly indicates the node where the NDE should be created or where to first search for the NDE. The Actual Home 1340 identifies the node where the NDE resides. When creating a NDE, the Preferred Home is tried first. If the NDE cannot be created there for some reason, such as out of memory an alternate home is chosen, and that node becomes the Actual Home. When a NDE is created, the Natural Home always keeps a record in the local hash table indicating the Actual Home but does not store the data. When a NDE is requested, the hash table on the Preferred Home is searched first. If the NDE is not found, the request is sent to the Natural Home for recording the dummy pointers for the associated key. The nodes identified by the Natural, Actual, and Preferred Homes can all be different, the same, or any combination. In addition, they can also be different or the same as the requesting node. The communication between the requesting node, the Natural Home, the Preferred Home, and the Actual Home may be performed via the Computer Network 1320.

Figure 14:
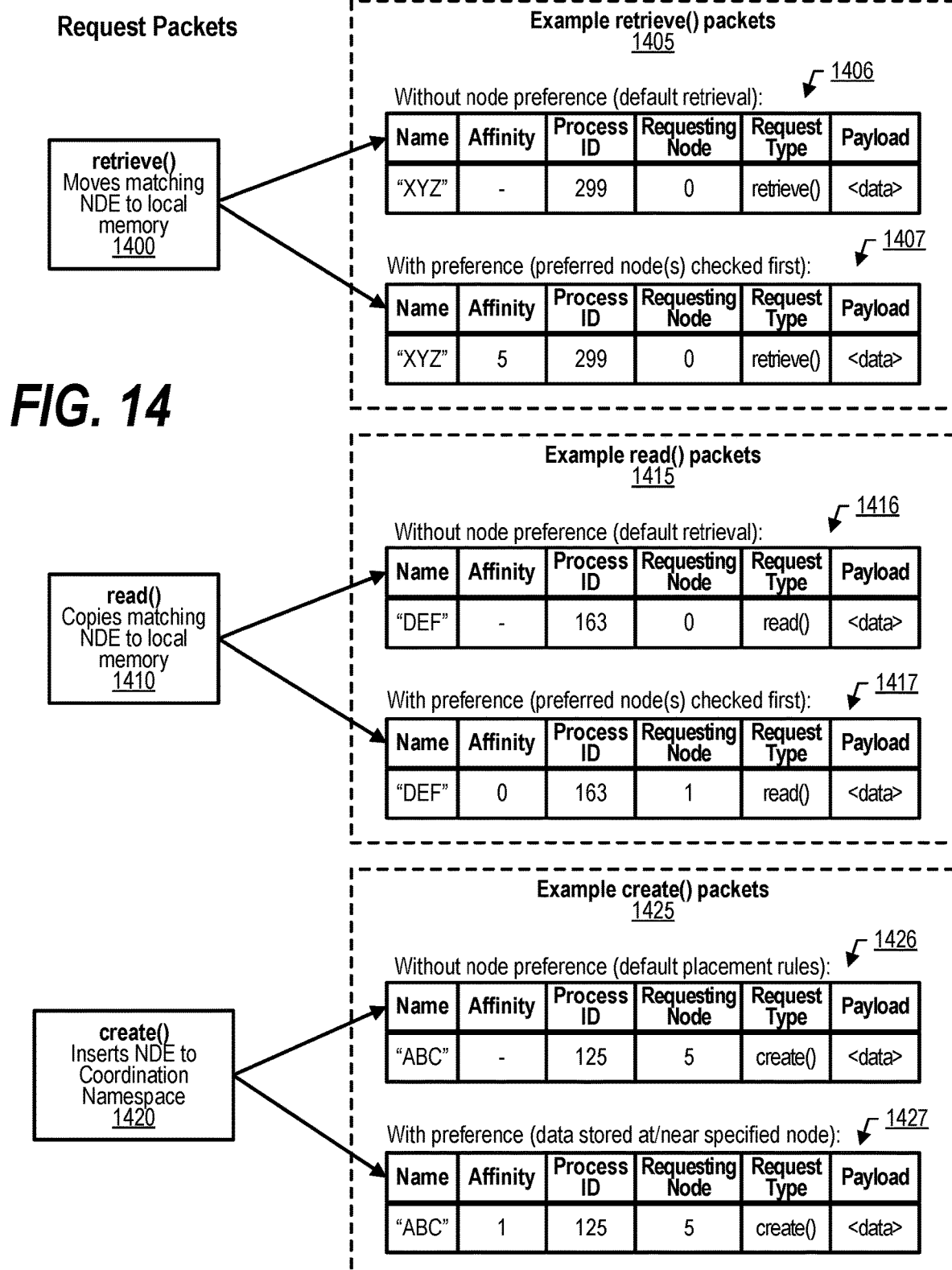
FIG. 14 shows a diagram depicting example request packets.

FIG. 14 depicts an embodiment of packets to send request to a coordination name server or a data store supporting identification of node preferences. At step 1400, the processing of retrieve( ) moves matching NDE to local memory. Entry 1405 depicts example retrieve( ) packet, where entry 1406 depicts a packet without node preference specified, that is no Affinity. Entry 1407 depicts a packet with node preference specified, that is, an Affinity is specified. At step 1410, the processing of read( ) copies matching NDE to local memory. Entry 1415 shows example read( ) packets. Entry 1416 depicts an example without node preference (default retrieval). Entry 1417 depicts an example with preference (preferred node(s) checked first). At step 1420, the processing of create( ) inserts NDE to Coordination Namespace. Entry 1425 depicts example create( ) packets. Entry 1426 depicts an example without node preference (default placement rules). Entry 1427 depicts an example with node preference.

Figure 15:
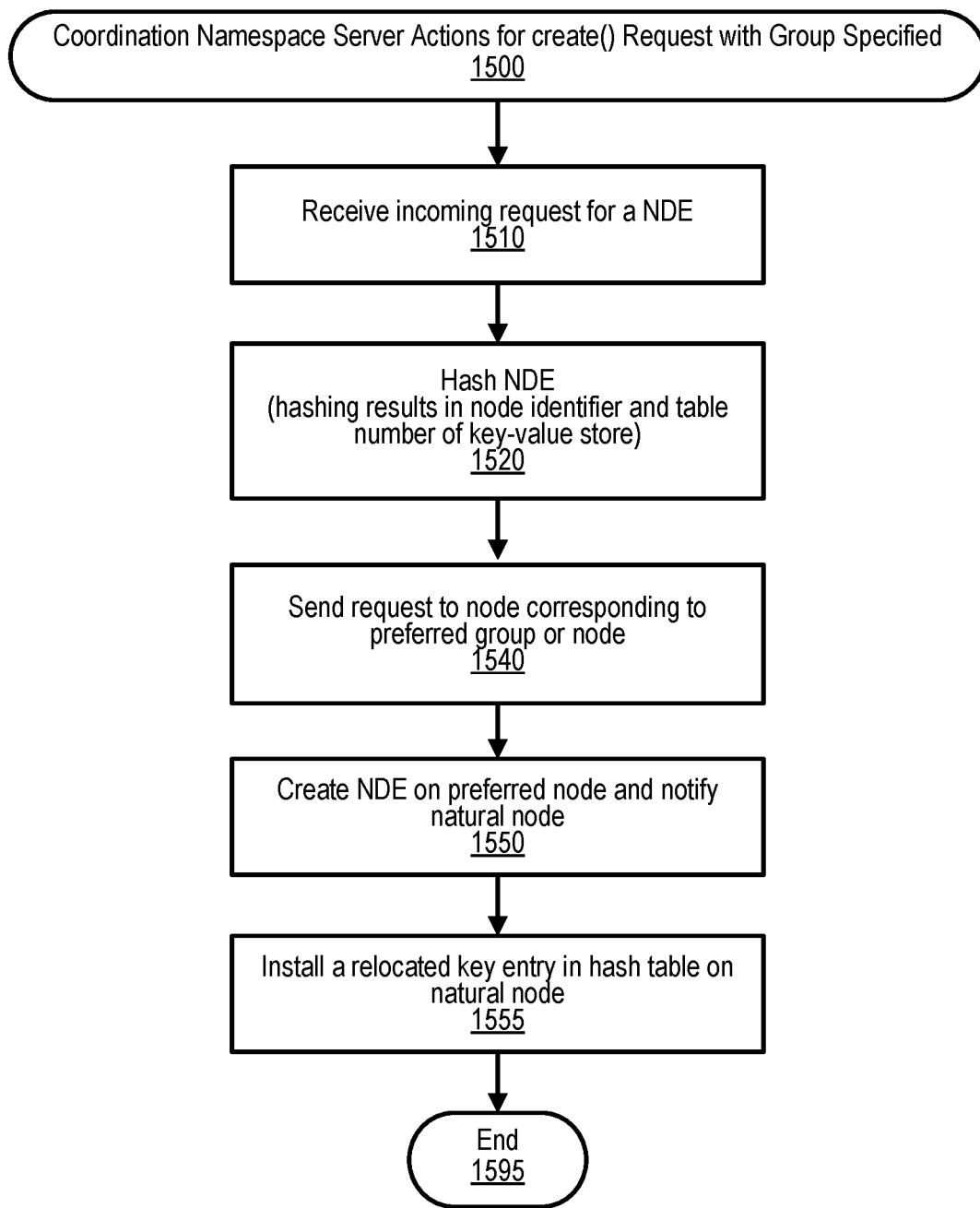
FIG. 15 shows a flowchart depicting steps taken to handle coordination namespace server actions for create( ) request with a group specified.

FIG. 15 shows a flowchart depicting steps taken to handle Coordination Namespace server actions for create( ) request with a group specified In many cases, the program producing the NDE knows where the NDE is needed. In these cases, the producer issues a create( ) NDE request with a group specified, step 1500. The create( ) request is receive by the CNS client in step 1510. The NDE-name is hashed as usual to determine the natural home (the Coordination Namespace server that would normally handle the request) in step 1520. In step 1540, the create( ) request is sent to this CNS server on the preferred home instead of the CNS server on the natural home specified by the hash in step 1510. In step 1550, the NDE is created at the preferred home at the table and index specified by the hash in 1510 and a simplified create( ) packet may then sent to the natural home CNS Server. In step 1555, a relocated key entry is installed in the hash table on the natural node. The process ends at step 1595 after both the natural home and preferred home have recorded the NDE creation. The preferred home is now the actual home of the NDE.

Figure 16:
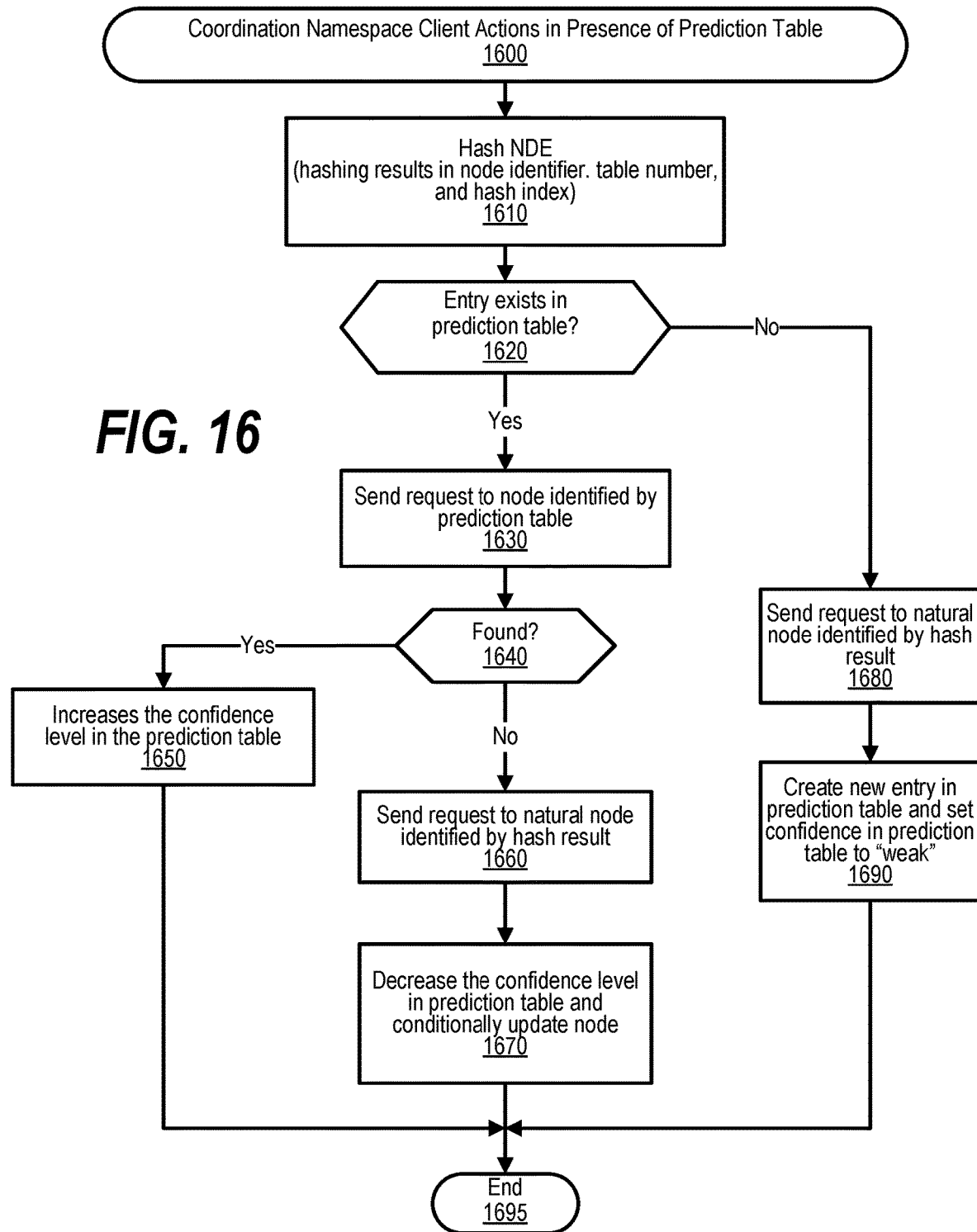
FIG. 16 shows a flowchart depicting steps taken to handle coordination namespace server actions in the presence of a prediction table.

FIG. 16 depicts a process to improve the latency of access of a NDE in a coordination space by using a prediction table to predict the node where the NDE is likely to be located. NDEs may often be relocated to nodes that are different from the natural (default) node identified by hashing on the NDE-name. For example, the system could locate a NDE close to where it is produced in order to reduce the latency of executing an create( ) request. Or the system could locate a NDE close to where it is likely to be consumed next, thus reducing the latency of performing an retrieve( ) or read( ) operation. Or the system could place a NDE in a node that has better memory characteristics than the default node, e.g. larger pool of available memory, or persistence characteristics more suited to the uses of the NDE. In an embodiment, a process receives a NDE-name and locates a NDE corresponding to the NDE-name by hashing at least a portion of the NDE-name, using a first hashing algorithm to form a first hashing result. Retrieving a first entry corresponding to the first hashing result from a prediction table. Responsive to determining the first entry is a predicted node, requesting from the predicted node a NDE with the NDE-name. Responsive to receiving the NDE with the NDE-name from the predicted node, updating the prediction table to increase the confidence level of the prediction. In response to the first entry failing to provide the predicted node identifier, utilizing a second hashing algorithm to derive a natural node from the NDE-name and requesting from the natural node the NDE with the NDE-name. After receiving a response from the natural node, indicating that the NDE is stored on the natural node, updating the prediction table to indicate that the natural node identifier is the predicted node identifier, and updating the prediction table to indicate the entry prediction is weak. After receiving a response from the natural node, indicating that the NDE is stored on a node different than the natural node (actual node), updating the prediction table to indicate that the actual node identifier is the predicted node identifier, and updating the prediction table to indicate the entry prediction is weak. If the response from the actual node is an error, re-requesting the NDE from the natural node. The process may receive a response from the natural node. The response from the natural node may be the data, an indication of where the data is available, the NDE, or a copy of the NDE . . . . The response may be a pending indicator corresponding to the requested NDE not yet created in the Coordination Namespace. In response to receiving the pending indicator, receiving the data, an indication of where the data is available, the NDE, or a copy of the NDE once the NDE has been created in the Coordination Namespace. The process may receive a request that includes the preferred node identifier and forward the request to the preferred node prior to forwarding the request to the natural node. The first hashing algorithm may be identical to the second hashing algorithm.

FIG. 16 depicts a process for handling NDEs by CNS client in a Presence of a Prediction Table. FIG. 16 processing commences at 1600 and shows the actions taken by the Coordination Namespace client in a Presence of Prediction Table and requests not including a Group identifier. At step 1610, the process hashes NDE (hashing results in node identifier, table number, and hash index). The process determines as to whether entry exists in prediction table (decision 1620). If entry exists in prediction table, then decision 1620 branches to the 'yes' branch and continues with step 1630. On the other hand, if no entry exists in prediction table, then decision 1620 branches to the 'no' branch. At step 1680, the process sends request to natural node identified by hash result. At step 1690, the process creates new entry in prediction table and sets the confidence in prediction table to "weak." The process continues with step 1695. If an entry does exist in the predication table (decision 1620), the process sends request to node identified by prediction table in step 1630. A determination as to whether the NDE was found at the predicted node is made in step 1640. If the NDE was found, then decision 1640 branches to the 'yes' branch. At step 1650, the process increases the confidence level in the prediction table. On the other hand, if the NDE is not found at the predicted node, then decision 1640 branches to the 'no' branch. At step 1660, the process sends the request to natural node identified by the hash result in step 1610. At step 1670, the process decreases the confidence level in the prediction table and conditionally updates the predicted node. Updating the predicted node in the prediction table may involve the traversal of a finite state machine which determines whether the node field in a prediction table should be updated based on a predefined set of rules for the class of NDEs. At step 1695, the process ends.

Figure 17:
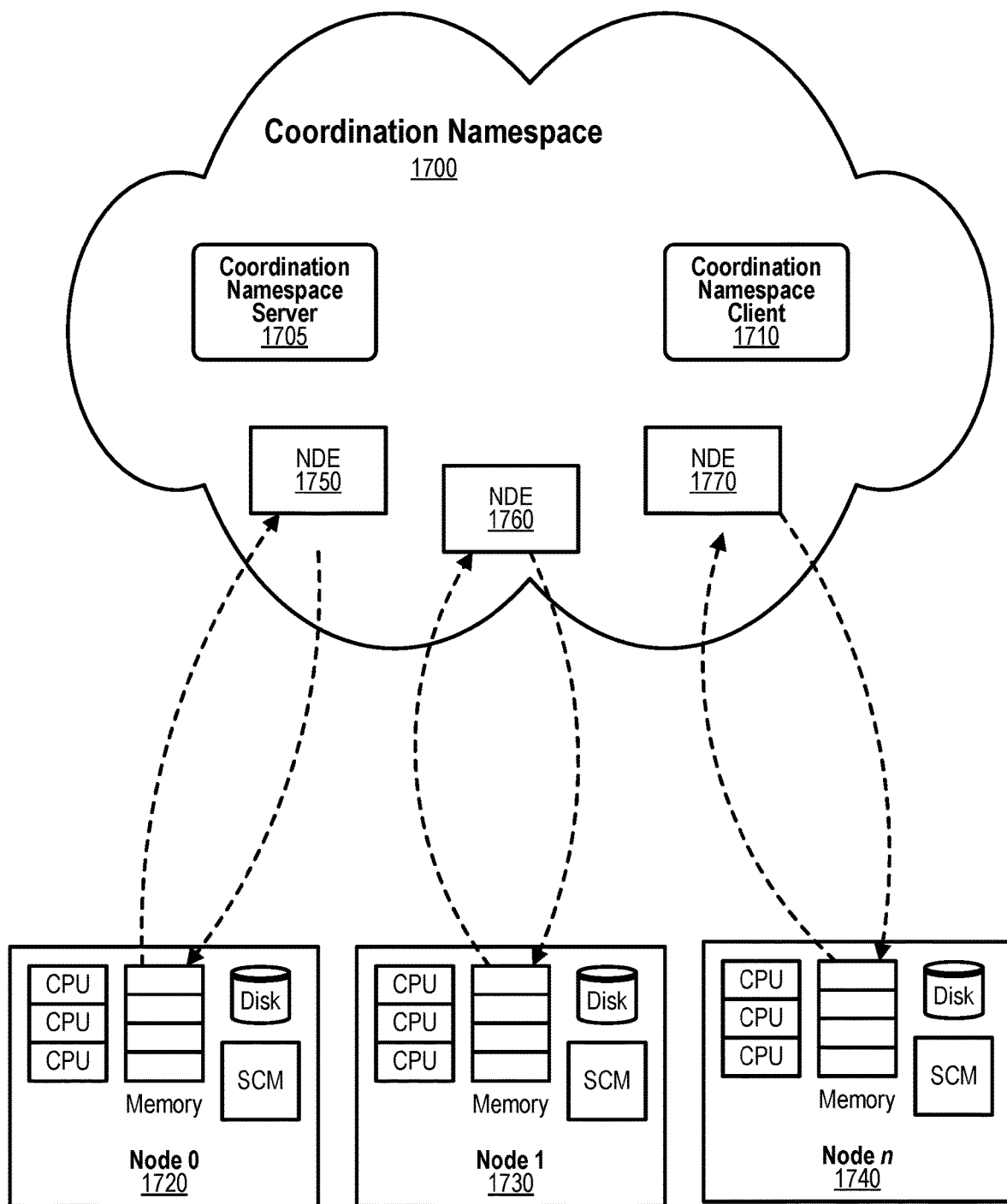
FIG. 17 shows a diagram depicting extended memory utilized in a coordination namespace computer system.

FIG. 17 depicts a computer system supporting Coordination Namespace 1700 with multiple nodes, node 0 1720, node 1 1730, . . . , node n 1740, each running several application processes under its own operating system. The system is also associated with a Coordination Namespace server 1705 that manages a Coordination Namespace located in a distributed manner across all nodes (each node may have its own CNS server 1705, CNS client 1710, or both) of the system contributing to the distributed memory. A node may contribute all its memory to the Coordination Namespace (node is a dedicated CNS Server), parts of its memory or none of its memory. A node may still access the Coordination Namespace even if not contributing any of its memory. The parts of the memory of the system associated with the Coordination Namespace may also be referred to as the Coordination Namespace memory or distributed memory. Various NDEs, such as NDE 1750, NDE 1760, and NDE 1770 may be located in the distributed memory.

FIG. 18 depicts a schematic view of Coordination Namespace Communication. Application processes communicate with the Coordination Namespace 1800 using access requests as shown in the FIG. 18. A plurality of namespaces are accessible to each process in the system, its own process virtual address namespace and the plurality of Coordination Namespaces. Processes may communicate with other processes by creating NDEs in the Coordination Namespace and by accessing (reading or retrieving) NDEs using their names and other optional characteristics from the Coordination Namespace. FIG. 18 depicts a computer system with multiple nodes, node 0 1815, node 1 1828 . . . , node n 1840, each running several application processes under its own operating system. The system is also associated with a Coordination Namespace server 1805 that manages a Coordination Namespace located in a distributed manner across all nodes (each node having its own CNS server 1805, CNS Client 1810, or both) of the system contributing to the distributed memory. Various NDEs, such as NDE 1808, NDE 1820, and NDE 1830 are located in the distributed memory.

The retrieve( ) request 1810 moves a matching NDE 1808 to local memory by storing the data in the memory of node 0 1815 not contributed to the Coordination Namespace, and removes the NDE 1808 from the Coordination Namespace. The read( ) process 1825 copies a matching NDE 1820 to local memory by storing the data in the memory of node 1 1825 not contributed to the Coordination Namespace but does not remove the NDE 1820 from the Coordination Namespace. The create( ) process 1835 inserts NDE 1830 into the Coordination Namespace. The NDE data are copied from the memory of node 0 1815 that is not contributed to the Coordination Namespace.

Figure 19:
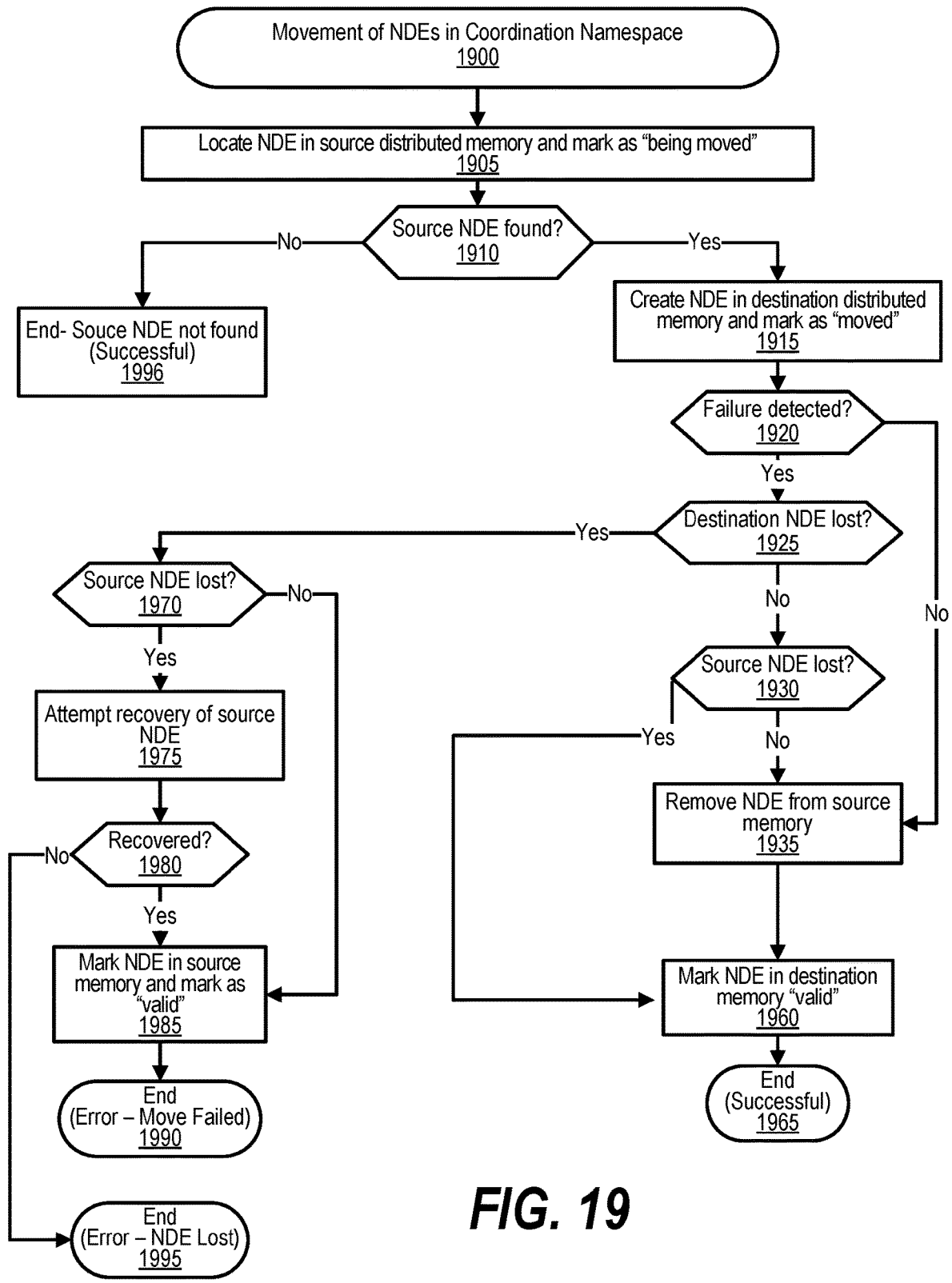
FIG. 19 shows a flowchart depicting steps taken to handle movement of named data elements in a coordination namespace.

FIG. 19 depicts a method to manage the persistence of NDEs within a Coordination Namespace. The method provides a means for atomically moving NDEs between Coordination Namespaces with differing level of persistent storage while also maintaining the durability of the NDE. In a preferred embodiment of a Coordination Namespace, the distributed memory storing the NDEs is determined by the attributes of the Coordination Namespace. In another embodiment, the selection of storage could be on a NDE by NDE basis. For the preferred embodiment, all NDEs are stored within a single class of memory defined by the persistence level attribute of the Coordination Namespace. For example, a Coordination Namespace with a persistence level of "1" may be associated with DRAM distributed across the nodes in the system, a persistence level of "2" may be associated with Storage Class Memory (SCM) distributed across the nodes in the system, and a persistence level of "3" may be associated with a global file system. If a node is powered off, the NDEs within a Coordination Namespace with a persistence level of "1" are lost if no other means are provided to manage the persistence of the NDEs. Level 2 on the other hand would survive a power cycle, but not a hardware failure of a node. A Coordination Namespace stored on the global file system would provide the most protection from power and hardware failures. To manage the persistent level of any given NDE, software must have a means for atomically moving a NDE between Coordination Namespaces with different persistent level attributes, without the potential loss of the said NDE.

The high-level view of an embodiment of moving a NDE may include the following steps: The first step is to locate the NDE to move and mark the NDE as in the processes of "being moved" without removing the NDE. The second step is to create a NDE in the destination memory and mark the NDE as a "moved" NDE, meaning the NDE is not yet valid at the destination. If a failure occurs between steps 1 and 2, a check is performed to determine if the source NDE was lost. If so, a recovery of the NDE is attempted. If source NDE is successfully recovered or the failure was some other error where the destination NDE was not created, the process continues to where the source NDE is marked as "valid" and an error is signaled that the NDE was not moved. If the recovery is not successful, the process continues where an error is signaled indicating the NDE has been lost. If an error did not occur between steps 1 and 2, the process continues to step 3 where the NDE source NDE is removed. If a failure occurs between steps 2 and 3, a check is performed to determine if the designation NDE is lost. If destination NDE is lost, the process continues to where the source NDE is marked as "valid" and an error is signaled that the NDE was not moved. If the destination NDE was not lost, a check is performed to determine if the source NDE was lost (step 3 the step 4). If source NDE was not lost the process continues as if no failure occurred. If the source NDE was lost, the process continues with step 4 where the destination NDE is marked valid completing the move. If a failure occurs between steps 3 and 4, a check is performed to determine if the destination NDE was lost. If so, a recovery of the NDE is attempted. If destination NDE is successfully recovered or the failure was some other error the process continues as if no failure occurred and the NDE is marked valid completing the move. If the recovery is not successful, the process continues where an error is signaled indicating the NDE has been lost. If an action directed by a requestor at the named data element in the first storage area subsequent to the creating and the deleting, a response that identifies the second storage area may be sent to the requestor. In this case, the action may be re-performed by requesting the action to the named data element in the second storage area.

FIG. 19 depicts a method to move NDEs within the Coordination Namespaces. The source and destination Coordination Namespace can be the same or different. FIG. 19 processing commences at 1900 and shows the steps taken by a process that moves NDEs in Coordination Namespace. At step 1905, the process locates NDE in source distributed memory and marks the NDE as "being moved." At step 1910, a determination as to whether the source NDE was found is made. If source NDE was not found, then decision 1910 branches to the 'no' branch and the process completes successfully indicating no NDE was found to be moved at step 1996. On the other hand, if a NDE was found, then decision 1910 branches to the 'yes' branch. At step 1915, the process creates NDE in destination memory and marks the NDE as "moved." At step 1920, a determination as to whether a failure was detected is made. If a failure was not detected, then decision 1920 branches to the 'no' branch and continues with step 1935. On the other hand, if a failure was detected, then decision 1920 branches to the 'yes' branch. At step 1925, a determination as to whether the destination NDE was lost is made. If destination NDE was lost, then decision 1925 branches to the 'yes' branch and continues with step 1970. On the other hand, if the destination NDE was not lost, then decision 1925 branches to the 'no' branch. At step 1930, a determination as to whether the source NDE was lost is made. If source NDE was lost, then decision 1930 branches to the 'yes' branch and continues with step 1960. On the other hand, if the source NDE was not lost, then decision 1930 branches to the 'no' branch. At step 1935, the process removes NDE from source distributed memory. At step 1960, the process marks NDE in the destination distributed memory "valid" and continues with step 1965. At step 1965, the process ends (Successful). If the destination NDE was lost (yes branch of decision 1925) a determination as to whether source NDE was lost is made at step 1970. If the source NDE was not lost, then decision 1970 branches to the 'no' branch and continues with step 1985. On the other hand, if the source NDE was lost, then decision 1970 branches to the 'yes' branch. At step 1975, the process attempts recovery of source NDE. At step 1980, a determination as to whether the source NDE was recovered. If source NDE was not recovered, then decision 1980 branches to the 'no' branch and the process completes with an "(Error—NDE lost)" at step 1995. On the other hand, if source NDE was recovered, then decision 1980 branches to the 'yes' branch. At step 1985, the process marks NDE in source distributed memory as "valid" and the process completes with an "(Error—Move Failed)" at step 1990.

With the increasing demand from applications for addressable memory, there is a desire to make these memories (SCM and memory on remote nodes) appear as normal system memory instead of a memory mapped files or through other communications stacks. However, the bandwidth and latency characteristics of these memories usually prevent direct access using processor load and store instructions. While there are caches in the system, they are typically designed to cover only the latency of system memory and are not effective for SCM or memory on remote nodes. To provide direct access to these memories using processor load and store instructions require a different cache design. In an embodiment, system memory is used as a cache for these memories providing for much larger caches that hold a larger working set and capable of covering the expected latencies of these memories (SCM and memory on remote nodes). Caches contain both the data and addition state (or the cache directory) about each cache granule or cache line. In other system memory caches, this addition state information is stored in a different memory location than the data requiring two memory access to be performed for a single memory reference. In an embodiment of the methods disclosed herein, the addition state information is stored in the metadata that is associated with each granule of data. In an embodiment, a granule size has 32 bytes of metadata and 128-bytes of user data that are loaded into processor register (s). The metadata contains the ECC, Special Error Codes, memory domain indicators and eight memory state bits. The metadata are additional bits of data beyond the 128-bytes of user data. Since the metadata are accessed at the same time as the data, storing the cache-state in the metadata memory state bits eliminate the need to perform a second memory access to determine the state of the cache line.

In an embodiment, the cache contains only unmodified data with a separate location allocated when data are modified. In a second embodiment, the cache may contain modified data. The first step is to determine if the virtual address for the data being referenced hits in memory pages allocated for the cache. If the cache page is not allocated and there is a free page in the cache, the page is installed, and the flow continues with fetching of data and metadata. If a free page does not exist, then an existing page is flushed, and the virtual address mapping removed before installing the new virtual to cache mapping. If cache page is allocated, then the data and metadata are fetched. If the data is valid and the instruction is a load, then the cache data is returned. If the data is not valid and the instruction is a load, the data is fetched from the SCM or remote memory, installed in the cache, and the metadata updated. If the data is valid but the instruction is a store, the data are flushed from the cache, a local page is allocated to hold the modified data, the virtual mapping is updated to point to the newly allocated page, and the store is performed to the newly allocated page. If the data are not valid in the cache and the instruction is a store, a local page is allocated to hold the modified data, the virtual mapping to the newly allocated page is created, and the store is performed to the newly allocated page. At a later point in time, the modified data are written into either the SCM or remote node's memory. In another embodiment, the store is performed directly into either the SCM or remote node's memory instead of allocating a local page for the modified data. In yet another embodiment, the data is written directly to the cache.

In an embodiment, an application can initialize only the data granules homed by local system memory and leave the other locations invalid. When an invalid granule is accessed, system software (Firmware or OS) receives a fault and can either populate the granule from locally attached SCM, from the remote node, or indicate to the application that an un-initialized memory location is being referenced. Similarly, other cases, such as when data is not initialized without remote memory or SCM or with remote memory or SCM or when the data is initialized, but not yet local, an exception may be used. In all these cases, there is an improvement over other systems by allowing the detection of bad pointers or software accessing memory that was not previously initialized, thus helping to find software bugs.

FIGS. 20 through 23 depict a method of maintaining state of a data granule associated with a shared virtual address mapped to a block of memory utilizing a metadata for the block of memory wherein the state information indicates whether the data granule is stored on a local node. The method generates an interrupt in response to detecting an access of the data granule when the data granule associated with the block of memory is not stored in the block of memory. The data granule may be stored in the block of memory and be associated with the shared virtual address that is stored on a remote node accessible by the local node over a computer network. In an embodiment, the block of memory is a cache line that is included in a cache in the local node. The data granule may correspond to the shared virtual address that is selected from a plurality of virtual addresses that are included in a plurality of nodes. The state information may indicate whether a memory corresponding to the data granule is owned by one of the remote nodes. The state information may indicate the data granule is valid. The generation of the interrupt may be performed when the block of memory has a state selected from the group of states consisting of "read/write," with modified data in the cache, "uninitialized," "not valid," "no-access," and "read-only" with the access of the "read-only" being a modification request. The state information may also indicate if the contents of the data granule has been modified by the local node.

FIGS. 20 through 33 depict a method of accessing a data granule wherein state information associated with the data granule indicates whether the data granule is currently stored in a local block of memory associated with the extended memory cache or at the Home Node. The method generates an interrupt in response to detecting that the data granule associated with the block of memory is not stored in a local block of memory associated with the extended memory cache. The location of the data granule may be determined by accessing a Home Node Directory. The data granule may be stored in a shared memory comprising memory that is shared amongst a plurality of nodes that include a local node and one or more remote nodes. The block of memory may be a cache line that is included in an extended memory cache in the local node. The data granule may correspond to a global virtual address selected from a plurality of global virtual addresses that reference memory distributed across a plurality of nodes. The state information may indicate whether a memory corresponding to the data granule is owned by one of the remote nodes. The state information may indicate whether a data granule is valid. The method may determine if the data granule is uninitialized and generate the interrupt in response to detecting a read action from the data granule. The state information may also indicate that the data granule has been modified by the local node. The state information may include error checking code (ECC) corresponding to the cache line, error codes for errors caused outside of the block of memory, validity corresponding to the cache line, read only status of the cache line, read/write status of the cache line, and a modified indicator corresponding to the cache line.

Another method of accessing memory in a system is utilizing a Global I Address Space Directory (GASD). Furthermore, the GASD needs to be accessible by the plurality of operating systems in each node of the system and capable of storing the data if the GVAS memory area is not present in any physical memory associated with the GVAS. In an embodiment, NDEs in the Coordination Namespace are created for tracking the GVAS memory areas.

Figure 20:
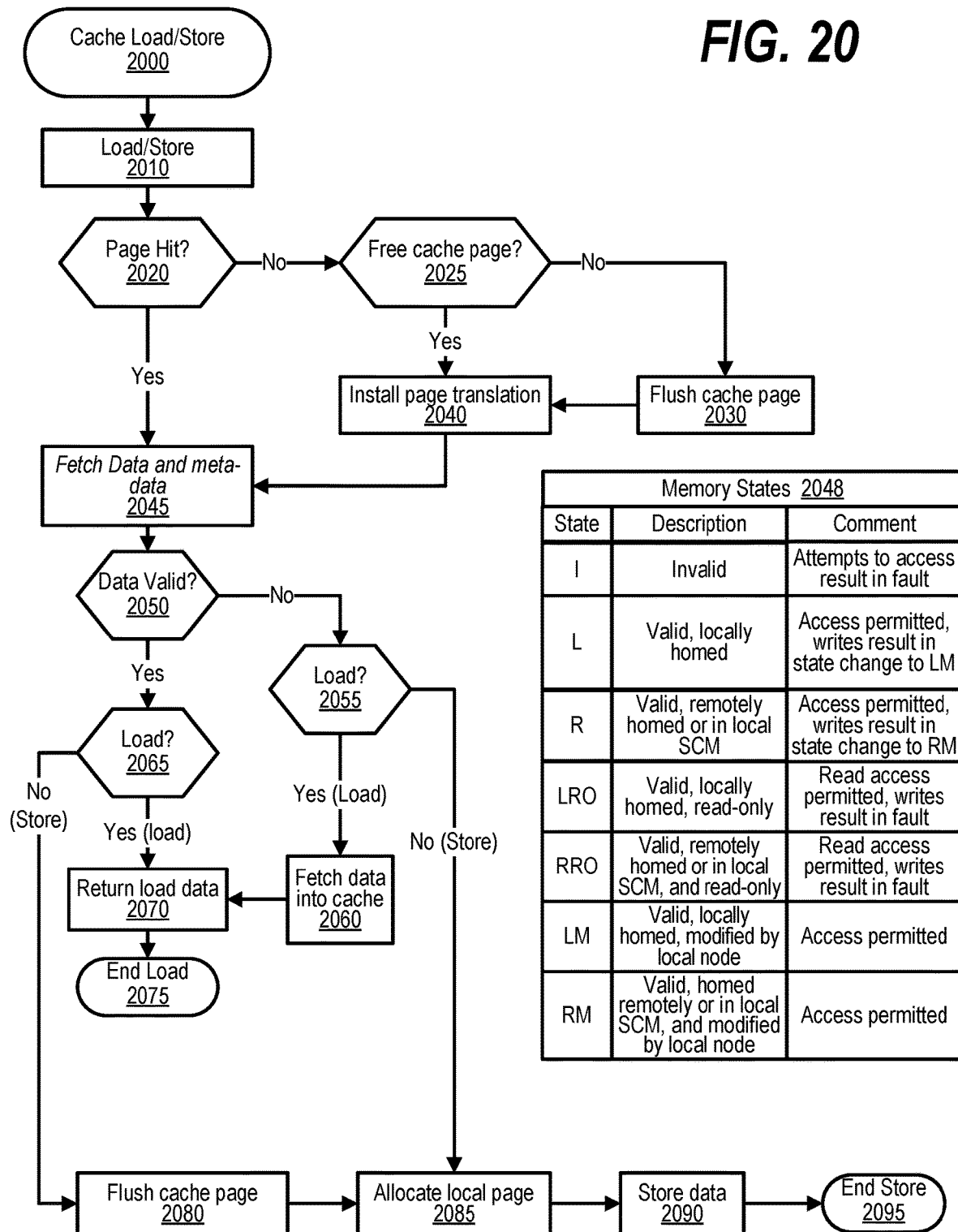
FIG. 20 shows a flowchart depicting steps taken to handle a cache load and store.

FIG. 20 depicts a high-level flow for utilizing system memory as a cache for locally attached Storage Class Memory (SCM) and/or memories on remote nodes. The method utilizes the system's DRAM to store cached data and the associated metadata for tracking the state of each cache line or granule of data. In an embodiment, a method for allocating and creating NDEs tracking memory areas within the GVAS with a preferred virtual address is provided. The method comprising a means for reading the NDEs into any global virtual address space. The method further comprising a means for re-locating the object in case the preferred global virtual address is not available in the targeted virtual address space. When a Global Virtual Address Space (GVAS) exist, there is a need for a Global Address Space Directory (GASD) structure that tracks the memory areas allocated in the Global Virtual Address Space. Furthermore, the GASD needs to be accessible by the plurality of operating systems in each node of the system and capable of storing the data if the GVAS memory area is not present in any physical memory associated with the GVAS.

FIG. 20 commences at 2000 and shows the steps taken by an embodiment of caching of remote data (SCM or memory on remote nodes) referenced by Load/Store instructions. At step 2010, the process receives a Load/Store instruction. The instruction references a virtual address (VA) which is mapped by a page table to a local physical address. The process determines as to whether a page mapping exist (page Hit—decision 2020). If a page Hit, then decision 2020 branches to the 'yes' branch and continues with step 2045. On the other hand, if not a page Hit, then decision 2020 branches to the 'no' branch. The process determines if there is a free cache page exists (decision 2025). If free cache page exists, then decision 2025 branches to the 'yes' branch and continues with step 2040. On the other hand, if no free cache page, then decision 2025 branches to the 'no' branch where a cache page is chosen for replacement and proceeds to step 2030, where the process flushes cache page chosen for replacement. At step 2040, the process installs page translation to indicate the new page residing at the chosen cache page. At step 2045, the process fetches data and metadata. In an embodiment, both the data and the metadata are loaded at the same time. The metadata includes Memory States 2048, which provides information about the data. The process determines whether the data are valid (decision 2050). If the data is valid, then decision 2050 branches to the 'yes' branch and continues with step 2065. On the other hand, if the data is not valid, then decision 2050 branches to the 'no' branch. The process determines as to whether the valid data is for a Load (decision 2065). If the operation is a load, then decision 2065 branches to the 'yes (Load)' branch to process the Load data. At step 2060, the process fetches data into the cache and continues with step 2070. On the other hand, if not a load operation, then decision 2055 branches to the 'no (Store)' branch and continues with step 2085 to process the Store operation. At step 2055, the process determines as to whether the not valid data is for a load operation. If the operation is not a Load, then decision 2065 branches to the 'no (Store)' branch and continues with step 2080. On the other hand, if the operation is not a Load, then decision 2065 branches to the 'yes (Load)' branch to process the Store operation. At step 2070, the process returns load data. At step 2075, the process ends the Load operation. At step 2080, the process flushes the cache page. At step 2085, the process allocates local page and installs a page translation. At step 2090, the process stores data into the local page. FIG. 20 processing thereafter ends at 2095.

Figure 21:
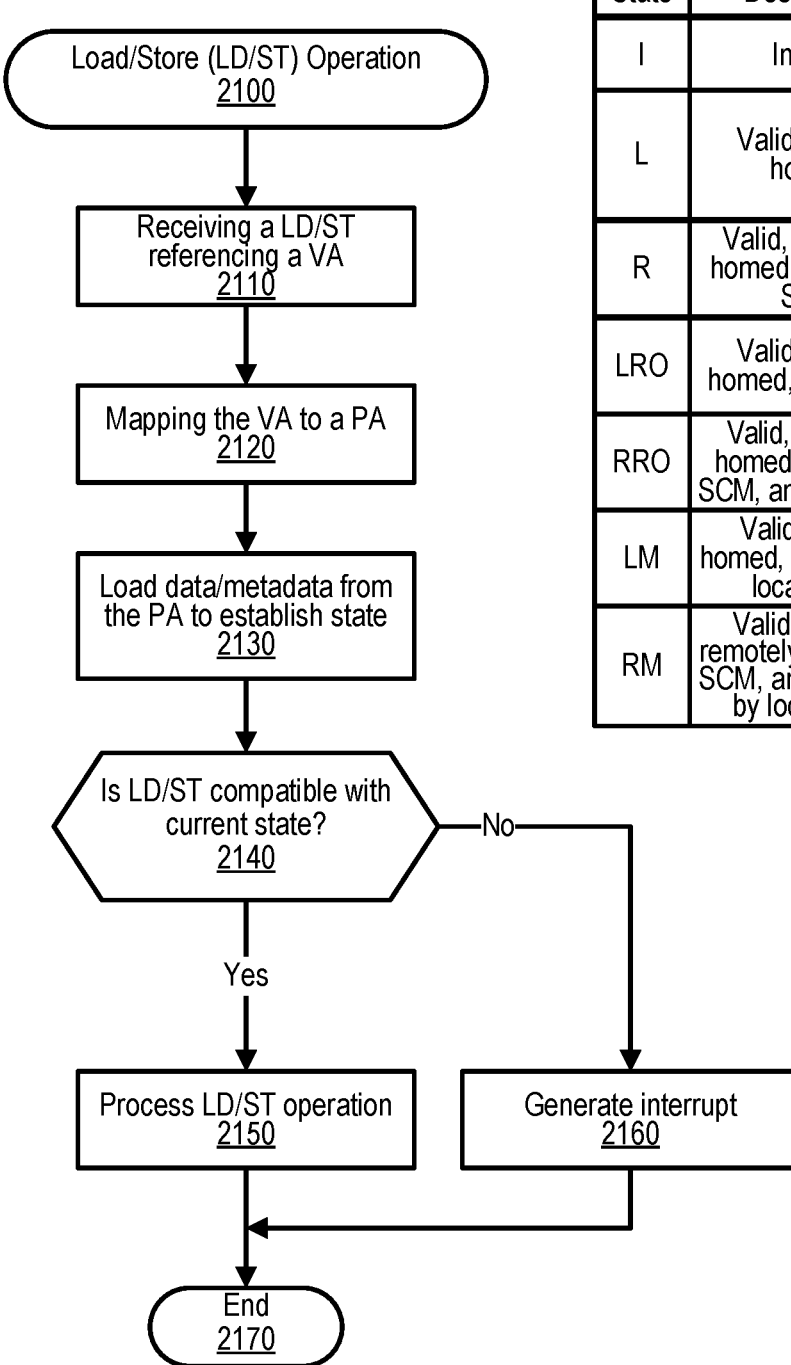
FIG. 21 shows a flowchart depicting steps taken to handle load or store (LD/ST) operation.

FIG. 21 processing commences at 2100 and shows the steps taken by an embodiment for handling of data referenced by Load/Store instructions, which may include normal processing as opposed to the caching embodiments described in FIG. 20. At step 2110, the process receives a LD/ST referencing a Virtual Address (VA). At step 2120, the process maps the VA to a Physical Address (PA), which may entail updating translation tables. (See FIGS. 25, 35, 36, 37, 55, and 56) At step 2130, the process loads data/metadata from the PA which establishes memory states 2135 using the metadata from memory. The process determines as to whether LD/ST is compatible with current state (decision 2140). If LD/ST is not compatible with current state, then decision 2140 branches to the 'no' branch and continues with step 2160. On the other hand, if LD/ST is compatible with current state, then decision 2140 branches to the 'yes' branch. At step 2150, the process handles the LD/ST operation and continues with step 2170. At step 2160, the process generates interrupt. FIG. 21 processing thereafter ends at 2170.

Figure 22:
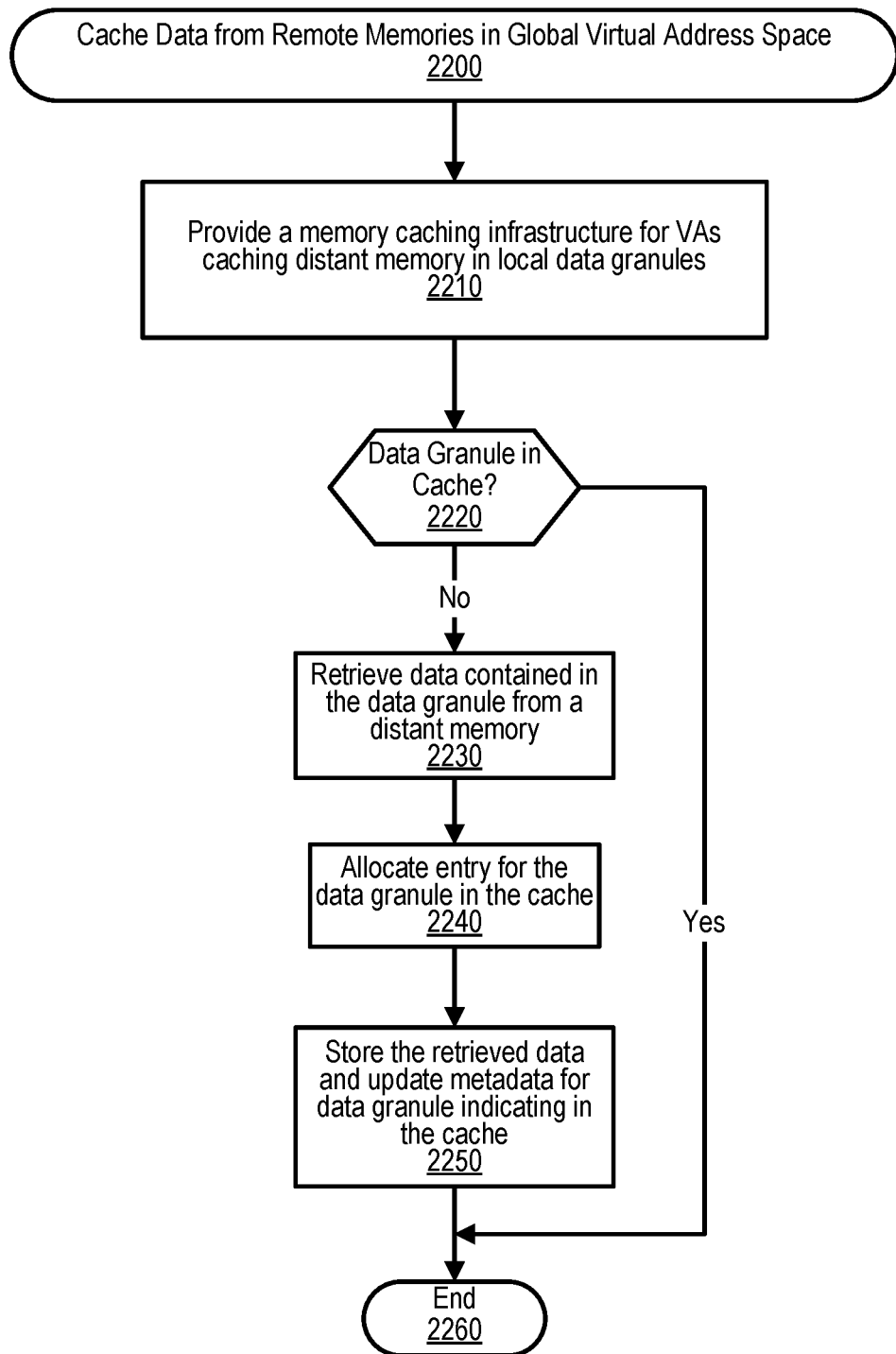
FIG. 22 shows a flowchart depicting steps taken to handle caching of data from remote memories in a Global Virtual Address Space (GVAS)

FIG. 22 processing commences at 2200 and shows the steps taken by a process that caches Data from Remote Memories in Global Virtual Address Space. At step 2210, the process provides a memory caching infrastructure for VAs caching distant memory in local data granules. The process determines as to whether the data Granule is in the Cache (decision 2220). If the data Granule is in the Cache, then decision 2220 branches to the 'yes' branch and continues with step 2230. On the other hand, if the data Granule is not in the Cache, then decision 2220 branches to the 'no' branch. At step 2230, the process retrieves data contained in the data granule from a distant memory. At step 2240, the process allocates entry for the data granule in the cache. At step 2250, the process stores the retrieved data and updates metadata for data granule indicating in the cache. FIG. 22 processing thereafter ends at 2260.

Figure 23:
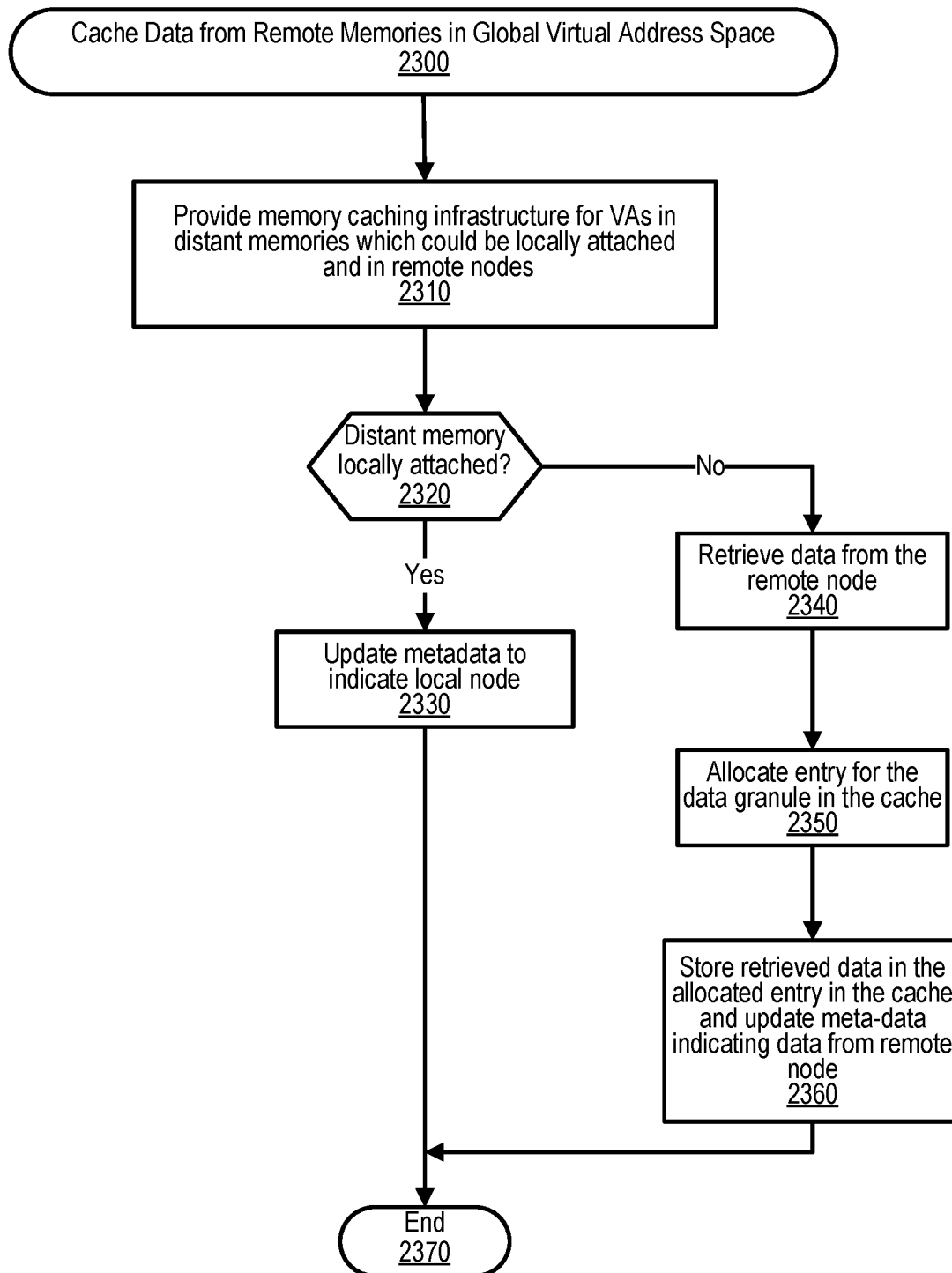
FIG. 23 shows a flowchart depicting steps taken to handle caching of data from remote memories in a Global Virtual Address Space (GVAS)

FIG. 23 processing commences at 2300 and shows the steps taken by a process that caches Data from Remote Memories in Global Virtual Address Space. At step 2310, the process provides a memory caching infrastructure for VAs in distant memories which could be locally attached or in remote nodes. The process determines as to whether distant memory is locally attached (decision 2320). If distant memory is locally attached, then decision 2320 branches to the 'yes' branch and continues with step 2330. On the other hand, if distant memory is not locally attached, then decision 2320 branches to the 'no' branch. At step 2340, the process retrieves data from the remote node. At step 2350, the process allocates entry for the data granule in the cache. At step 2360, the process stores retrieved data in the allocated entry in the cache and updates the metadata indicating remote node and continues with step 2370. At step 2330, the process updates metadata to indicate local node. FIG. 23 processing thereafter ends at 2370.

There is a need for a Global Address Space Directory (GASD) structure for tracking the memory areas allocated in the Global Virtual Address Space. In an embodiment, a hierarchical multi-level directory, referred to as the "Home Node Directory" is used where each level contains a plurality of entries describing fixed size ranges in the GVAS. Each entry either points to a next level of directory or contains information describing how the range of GVAS is distributed across the plurality of nodes. There is also a need for a directory structure to convert a Global Virtual Address (GVA) into the node containing the physical memory (henceforth referred to backing memory or "Home" node). Furthermore, the directory needs to support distribution of data at a fine granule and the ability to relocate data during the running of an application. The backing memory may be, for example, a failing node's system memory (which could include DRAM and SCM), if still accessible, a duplicate source (in the case of some form of RAID), or a checkpoint.

FIGS. 24-33 depict an embodiment, where a Coordination Namespace is used to maintain a GASD for the Global Virtual Address Spaces, where NDEs in the Coordination Namespace keep track of memory areas in the GVAS. Maintenance of the Directory could be by Coordination Name Servers supporting reading, retrieving, adding, and deleting NDEs. Each separate GVAS is given a NDE directory name and a plurality of NDEs that track the memory areas within the associated GVAS. Various other embodiments may be used, such as having a distributed GASD where no full GASD for the GVAS is created or maintained. Instead, each node maintains a directory tailored to memory areas residing locally on its node. Various methods may be used to recover from failures utilizing copies of the NDEs on different Nodes or located in a Global File System.

When a program opens a Global Virtual Address Space the operating system reads the associated NDEs tracking GVAS and based on the NDE-data (VA and metadata) to create the global virtual address mappings for the CPUs and the Home Node Directory (see FIGS. 24 through 37 and the associated text). If a program references a memory area that is not in physical memory associated with the GVAS, the operating system reads the NDE with the memory area and installs the data in the memory at the preferred Global Virtual Address (GVA) specified by the NDE. Installing the data may require reading other NDEs associated with the memory area. Furthermore, the data may be written to physical memory distributed across the nodes in the system based on the GVAS distribution meta-data. If the preferred GVA for the memory area is not available, the NDE provides a method for relocating the data to a different GVA. If the memory area contains GVA pointers to other locations within the memory area, the relocation method updates these pointers to reflect the new GVA. The NDE may also contain methods for adjusting the data layout for compatibility with the requesting program's programming model. For example, arrays within the memory area may be converted from Row Major to Column Major.

Figure 24:
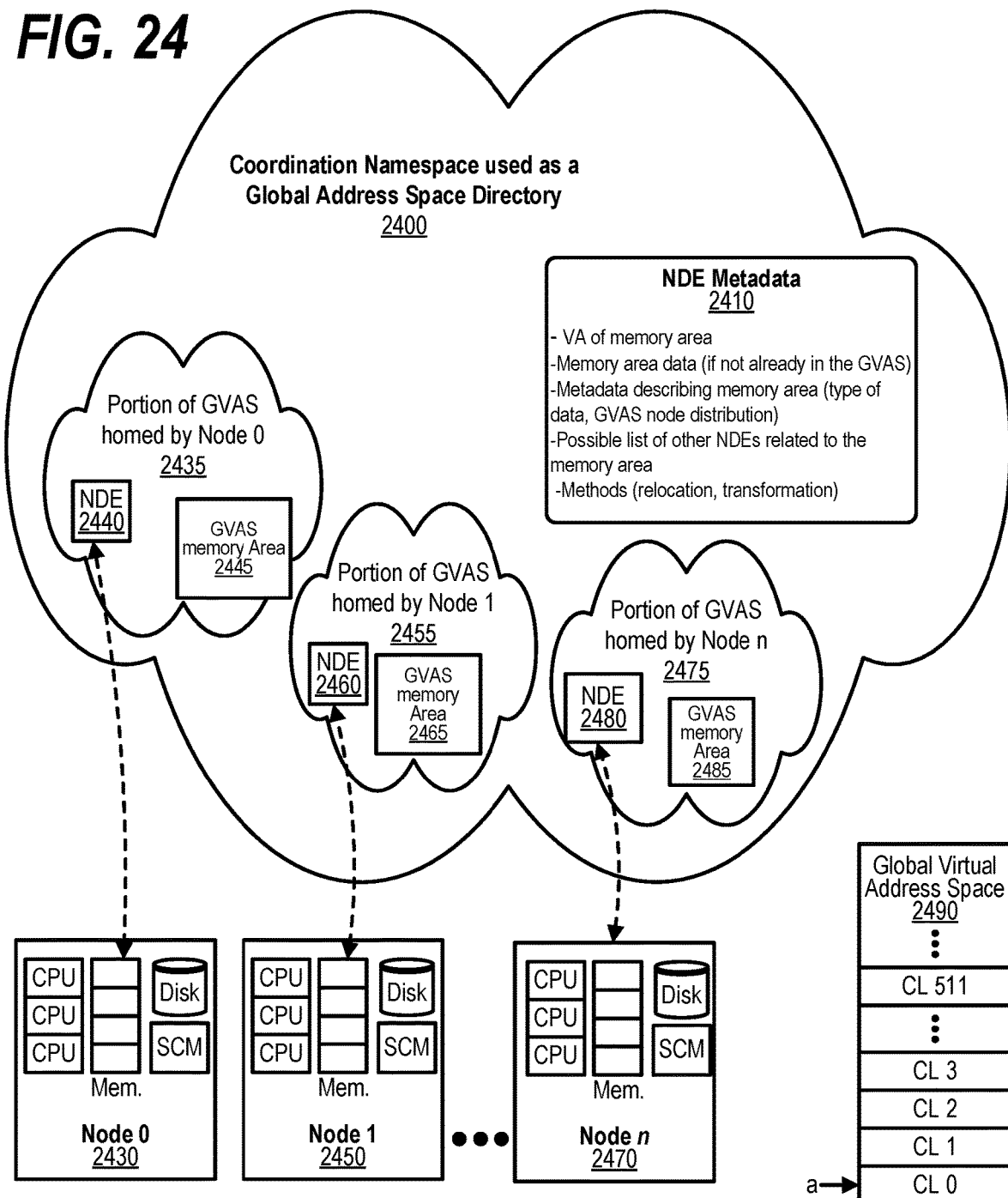
FIG. 24 shows a diagram illustrating a multi-node system using NDEs for tracking the memory areas in the Global Virtual Address Space (GVAS)

FIG. 24 depicts a schematic diagram illustrating a multi-node system using NDEs for tracking the memory areas in the Global Virtual Address Space (GVAS) 2400. The memory of Node 0 2430 is the home for a portion of the GVAS memory Area 2445. NDE 2440 is used for tracking the portion or GVAS homed by Node 0 2435. The memory of Node 1 2450 is the home for a portion of the GVAS memory Area 2465. NDE 2460 is used for tracking the portion or GVAS homed by Node 1 2455. The memory of Node n 2470 is the home for a portion of the GVAS memory Area 2485. NDE 2480 is used for tracking the portion or GVAS homed by Node n 2475. Each of the nodes accesses the same Global Virtual Address Space 2490 and Coordination Namespace used for the GASD. NDEs for tracking the memory areas in the GVAS 2490 are stored in the Coordination Space as multiple distributed NDEs. Furthermore, each NDE for tracking a GVAS memory area may be a hierarchy of NDEs. NDEs 2440, 2460, and 2480 may be a plurality of NDEs, each representing a block of memory either homed by the corresponding node or not in the physical memory associated with the GVAS. The NDE-data contains the information about the data represented by the NDE and may contain the GVAS data if not in the physical memory associated with the GVAS. A single NDE 2410 contains a description of the GVAS memory area or subset of the GVAS memory area and potentially the data associated with the GVAS memory area.

FIG. 25 depicts an example of possible entries in the multi-level directory for describing where Global Virtual Address are physically located at a home node 2500. The first field of the table is the Type 2520 which identifies the type of entry which is documented under Description 2540. Auxiliary Information 2560 provides more information about the GVA range associated with the entry. Notes 2580 also provides additional description material related to the Auxiliary Information. Information like the Auxiliary Information 2560 and corresponding Notes 2580 for types 0x2 thru 0x9 may be contained in the NDE-data 2410 of NDEs [2440, 2460, 2480] of FIG. 24.

Figure 26:
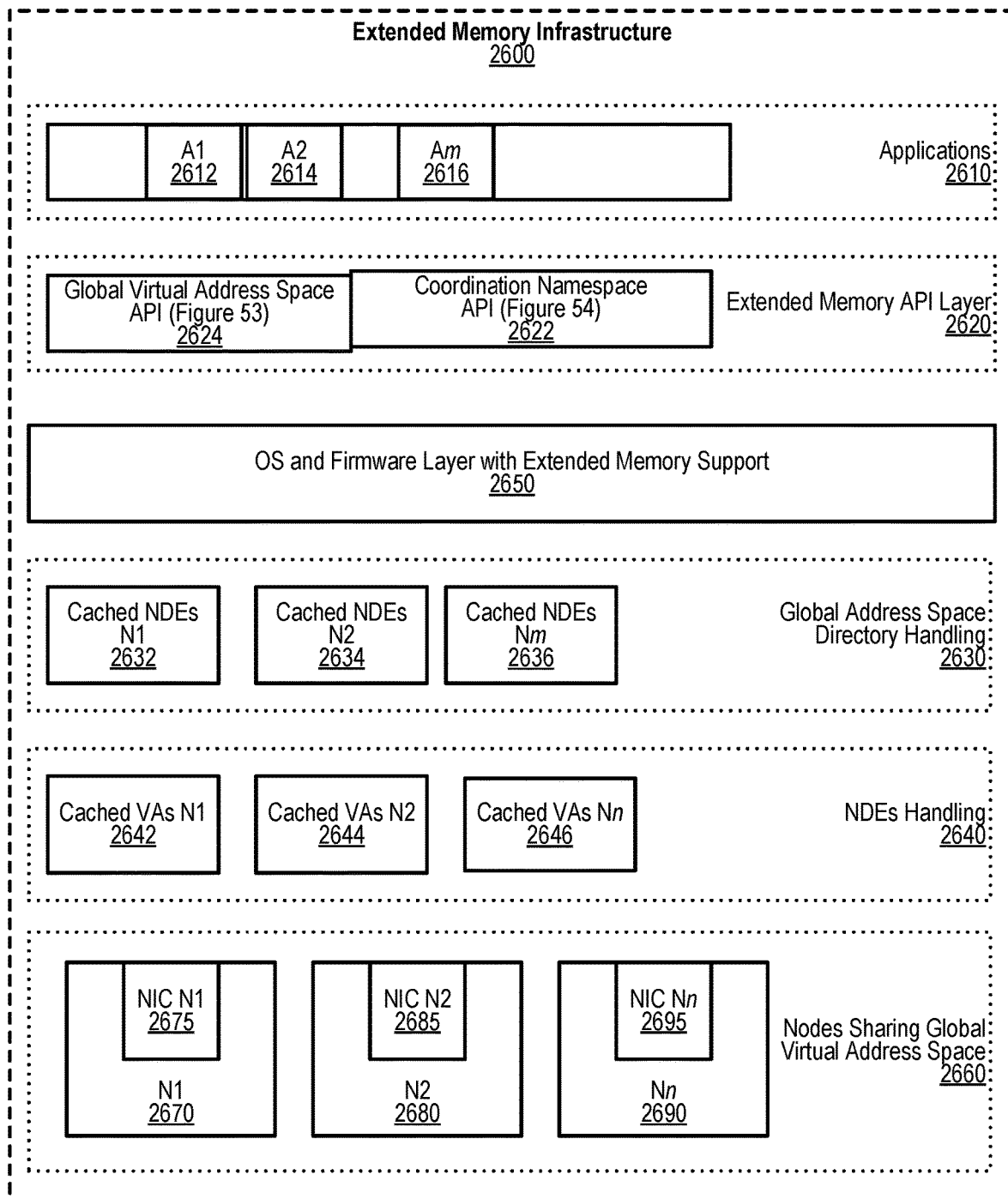
FIG. 26 shows a view of an Extended Memory Infrastructure.

FIG. 26 depicts a schematic view of an Extended Memory Infrastructure 2600. The infrastructure shows various applications 2610 including A1 2612, A2 2614, . . . , Am 2616. The applications may directly utilize an Extended Memory Application Programming Interface (API) Layer 2620 to utilize the Extended memory features such as Coordination Namespace 2622 or Global Virtual Address Space API libraries 2624. Alternatively, the application may be executing in a runtime environment such as a Java Virtual Machine (JVM) which utilize the libraries. The Extended Memory API layer utilizes an Operating System (OS) and Firmware layer with support for the extended memory features 2650. The Applications 2610, Extended Memory API Layer 2620, and OS and Firmware 2650 may be distributed across the Nodes sharing the Global Virtual Address Spaces 2660. The OS and Firmware layer utilizes the Global Address Space Directory Handling layer 2630 to maintain a Global Address Space Directory for the Global Virtual Address Spaces as referenced in FIG. 24 and corresponding text. The Global Address Space Directory Handling layer 2630 may support caching NDEs, such as, NDE N1 2632, NDE N2 2634, . . . , NDE Nm 2636 which track memory areas in the Global Virtual Address Spaces. In cooperation with the Nodes sharing the GVAS 2660 and the Network Interface Controllers in each node, NIC N1 2675 for N1 2670, NIC N2 2685 for N2 2680, . . . , NIC Nn 2695 for Nn 2690. the OS and Firmware may cache Global Virtual Addresses, such as, cached GVAs N1 2642, cached GVAs N2 2644, . . . , cached GVAs Nm 2646 in the system memory of the respective node. The libraries in the Extended Memory API layer 2620 may also make calls to the OS and Firmware with extended memory support 2650 to access the GVAS and Coordination Namespaces performing NDE handling 2640 as supported by NIC N1 2675 for N1 2670, NIC N2 2685 for N2 2680, . . . , NIC Nn 2695 for Nn 2690.

Figure 27:
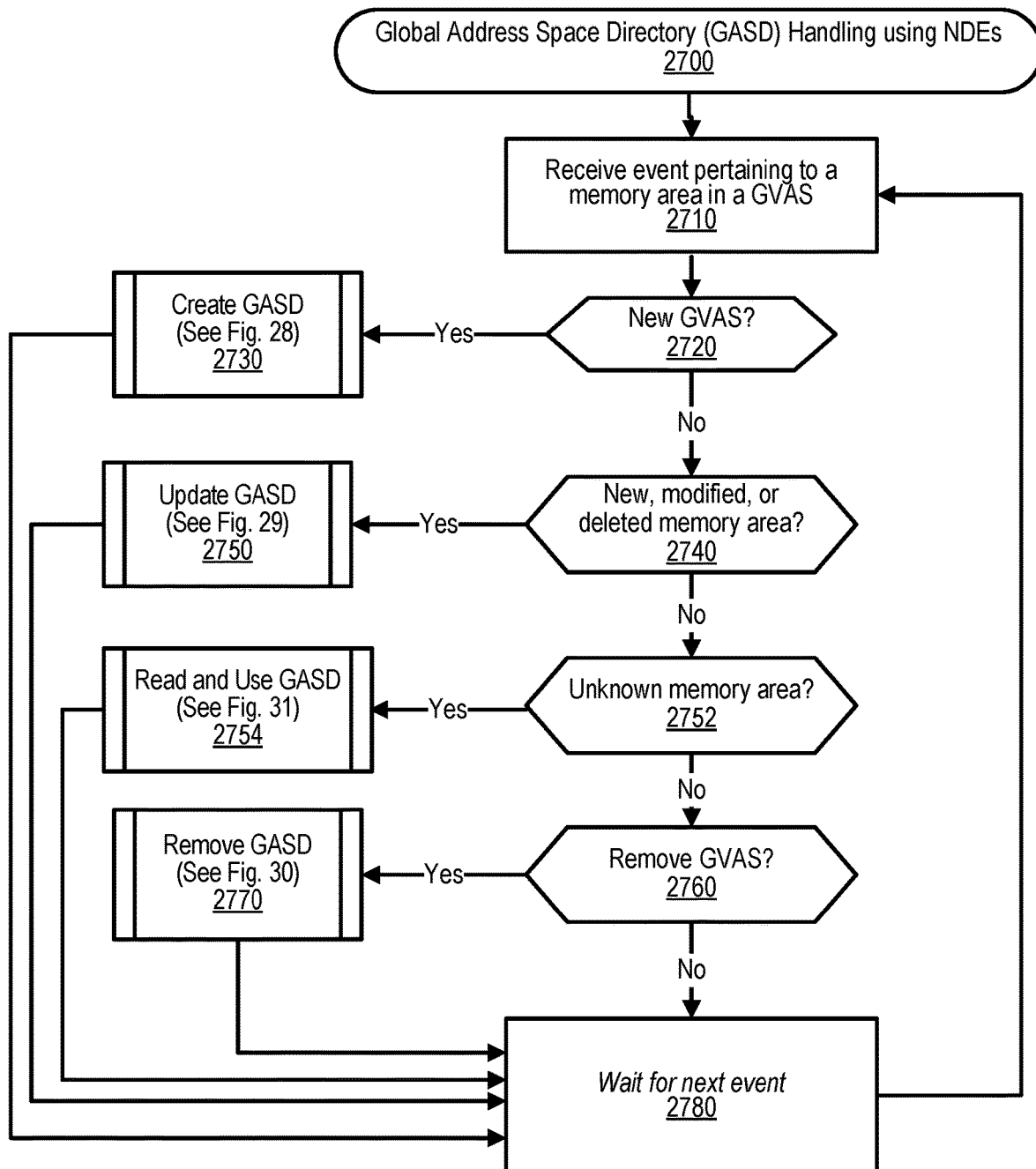
FIG. 27 shows a flowchart depicting steps taken to perform Global Address Space Directory (GASD) Handling using NDEs.

FIG. 27 processing commences at 2700 and shows an embodiment of the steps taken to perform Global Address Space Directory Handling using NDEs. At step 2710, an event pertaining to a memory area in a GVAS is received. A determination is made as to whether the GVAS is new or already exists (decision 2720). If the GVAS is new, then decision 2720 branches to the 'yes' branch. At predefined process 2730, the Create GASD routine (see FIG. 28 and corresponding text for processing details) is executed and once complete, continues with 2780. On the other hand, if the GVAS is not new, then decision 2720 branches to the 'no' branch. A determination is made as to whether a memory area is a new, modified, or deleted memory area (decision 2740). If the determination is made that the memory area is for a new, modified, or deleted a memory area, then decision 2740 branches to the 'yes' branch. At predefined process 2750, Update GASD routine (see FIG. 29 and corresponding text for processing details) is executed and once complete, continues with 2780. On the other hand, if the determination is made that the memory area is not for a new, modified, or deleted memory area, then decision 2740 branches to the 'no' branch. A determination is made as to whether the Memory area is unknown to system software (decision 2752). If Memory area is unknown to system software, then decision 2752 branches to the 'yes' branch. At predefined process 2754, the Read and Use GASD routine (see FIG. 31 and corresponding text for processing details) is executed, and once complete, continues with 2780. On the other hand, if the determination is the Memory area is known, then decision 2752 branches to the 'no' branch. A determination is made as to whether the GVAS is being removed (decision 2760). If removing the GVAS, then decision 2760 branches to the 'yes' branch. At predefined process 2770, the remove GASD routine (see FIG. 30 and corresponding text for processing details) is executed, and once complete, continues with 2780. On the other hand, if not removing the GVAS, then decision 2760 branches to the 'no' branch. At step 2780, the flow waits for next event.

Figure 28:
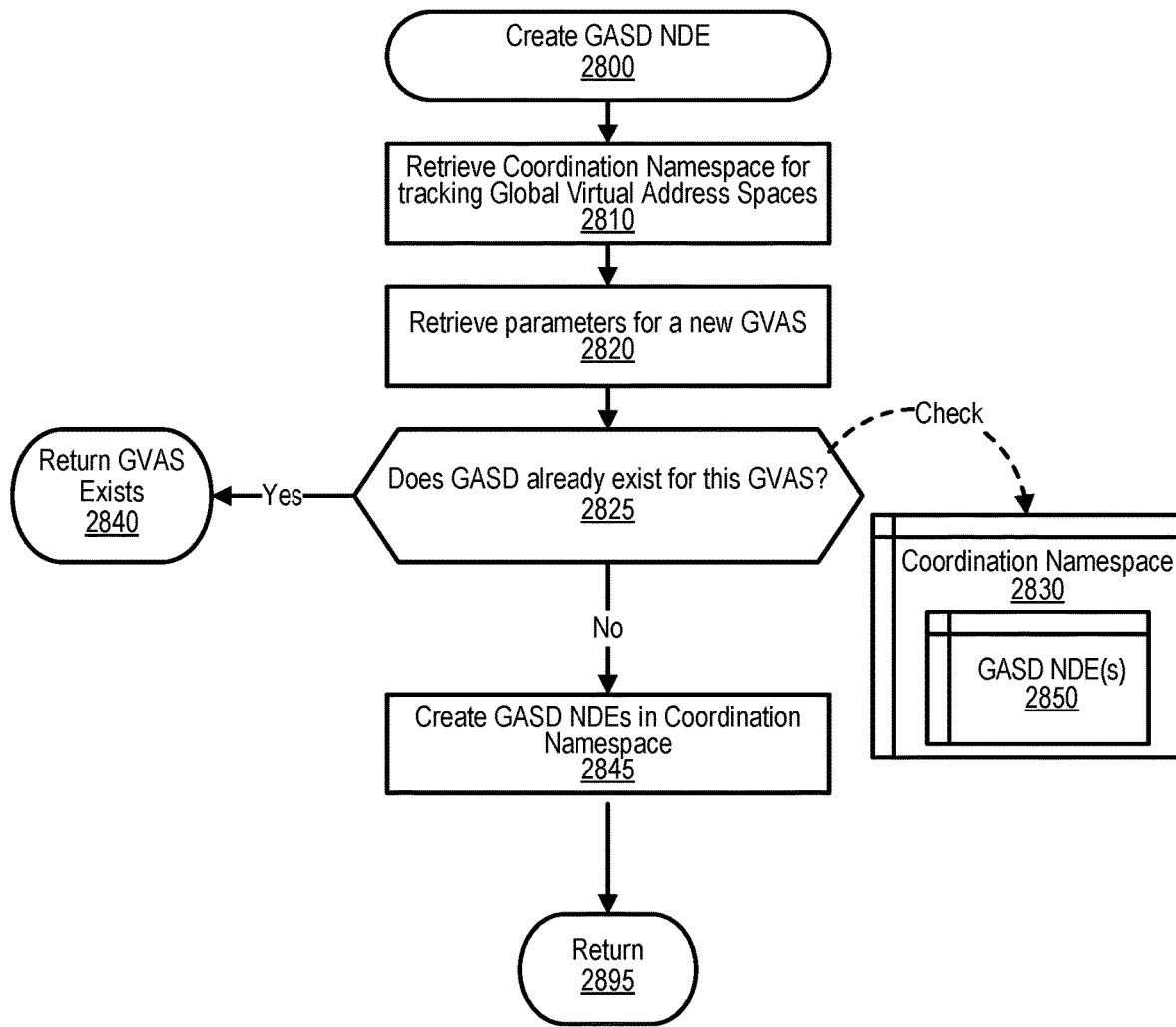
FIG. 28 shows a flowchart depicting steps taken by a process that creates GASD NDE for a new GVAS.

FIG. 28 processing commences at 2800 and shows the steps taken by a process that creates GASD NDE for a new GVAS. At step 2810, the process retrieves the Coordination Namespace for tracking memory areas in the Global Virtual Address Spaces. At step 2820, the process receives the parameters for the new GVAS. At step 2825, a determination is made as to whether the GASD already exists for this GVAS. If GASD already exists for this GVAS, then decision 2825 branches to the 'yes' branch. The check at step 2825 retrieves the data from Coordination Namespace 2830 to check for the existence of the GASD NDE 2850 that corresponds to the GVAS being created. If the GASD NDE exists, the process returns indicating the GVAS exists and the corresponding GASD was not created. On the other hand, if GASD NDE does not already exists for this GVAS, then decision 2825 branches to the 'no' branch. At step 2845, the process creates a new GASD NDE-name using the parameters received in step 2820 and proceeds to create the GASD NDE 2850 in Coordination Namespace 2830. FIG. 28 processing thereafter ends at 2895.

Figure 29:
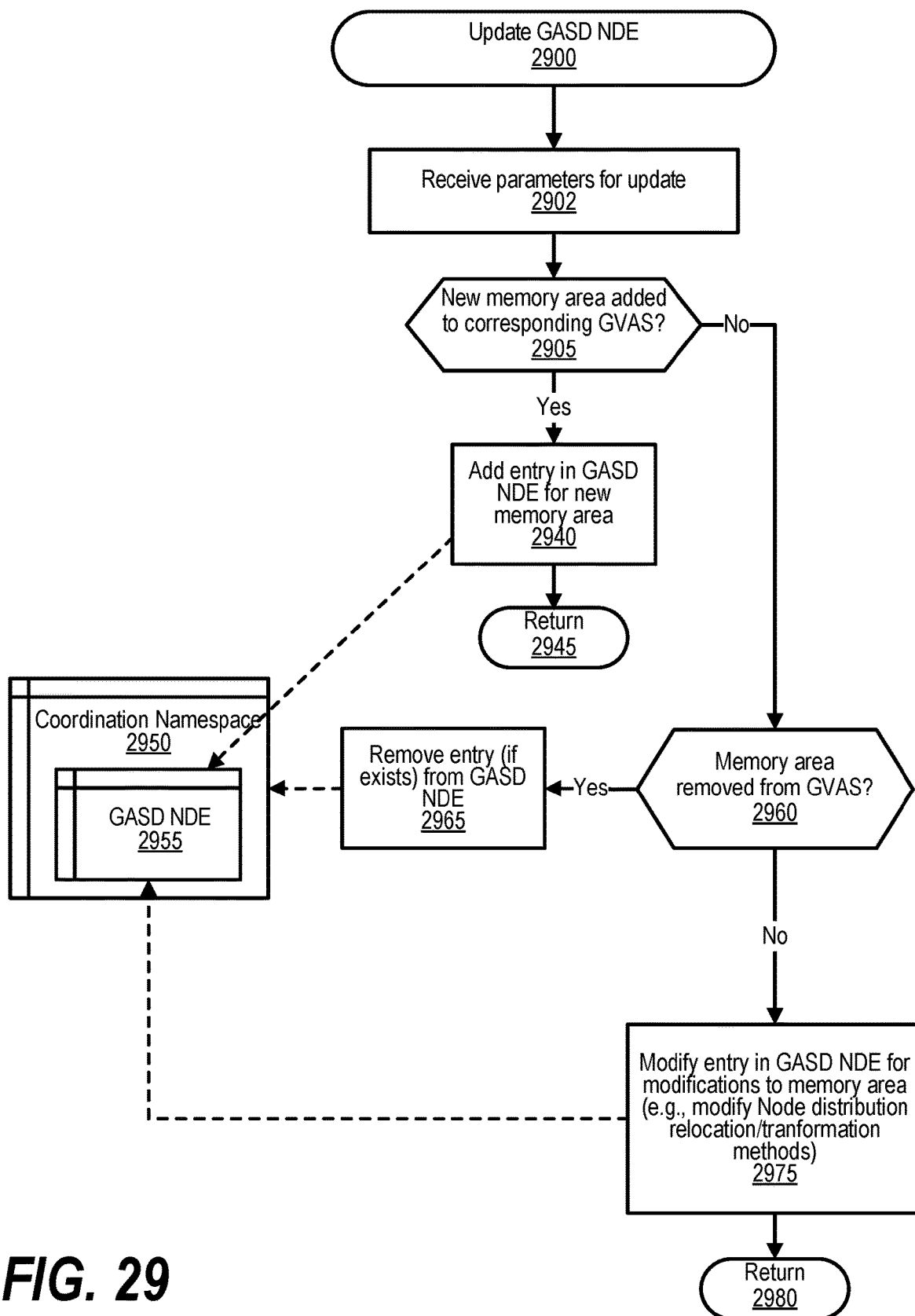
FIG. 29 shows a flowchart depicting steps taken to handle updates of GASD NDE tracking a GVAS.

FIG. 29 processing commences at 2902 where parameters for updating the GVAS are received and shows the steps taken by a process that updates a Global Address Space Directory (GASD) NDE 2900. The process determines as to whether new memory area is being added to corresponding GVAS (decision 2905). If new memory area is being added, then decision 2905 branches to the 'yes' branch and continues with step 2940. On the other hand, if a new memory area is not being added, then decision 2905 branches to the 'no' branch. At step 2960, a determination is made as to whether a memory area is being removed. If a memory area is being removed, then decision 2960 branches to the 'yes' branch and continues with step 2965. On the other hand, if a memory area is not being removed, then decision 2960 branches to the 'no' branch. At step 2975, the process modifies an entry in GASD NDE 2955 in Coordination Namespace 2950 per the parameters received in step 2902. The modifications for the memory area may include but are not limited to modifying the node distribution, the relocation/transformation methods, or state indicating the data is in the GASD or in memory associated with the GVAS. At step 2980, the process returns. At step 2940, an entry in the GASD NDE 2955 in Coordination Namespace 2950 is added for the new memory area per the parameters received in step 2902. At step 2965, the process removes the entry (if exists) from GASD NDE corresponding to the memory area being removed from the GVAS. The process of adding, step 2940, removing, step 2960, or modifying, step 2975, a GASD NDE 2955 entry may require accessing a hierarchy of NDEs in the Coordination Namespace where the hierarchy may be a linked list of NDEs. Furthermore, the process may require reading a NDE, retrieving a NDE, destroying a NDE, and creating a new NDE. The process returns at step 2945 and step 2980.

Figure 30:
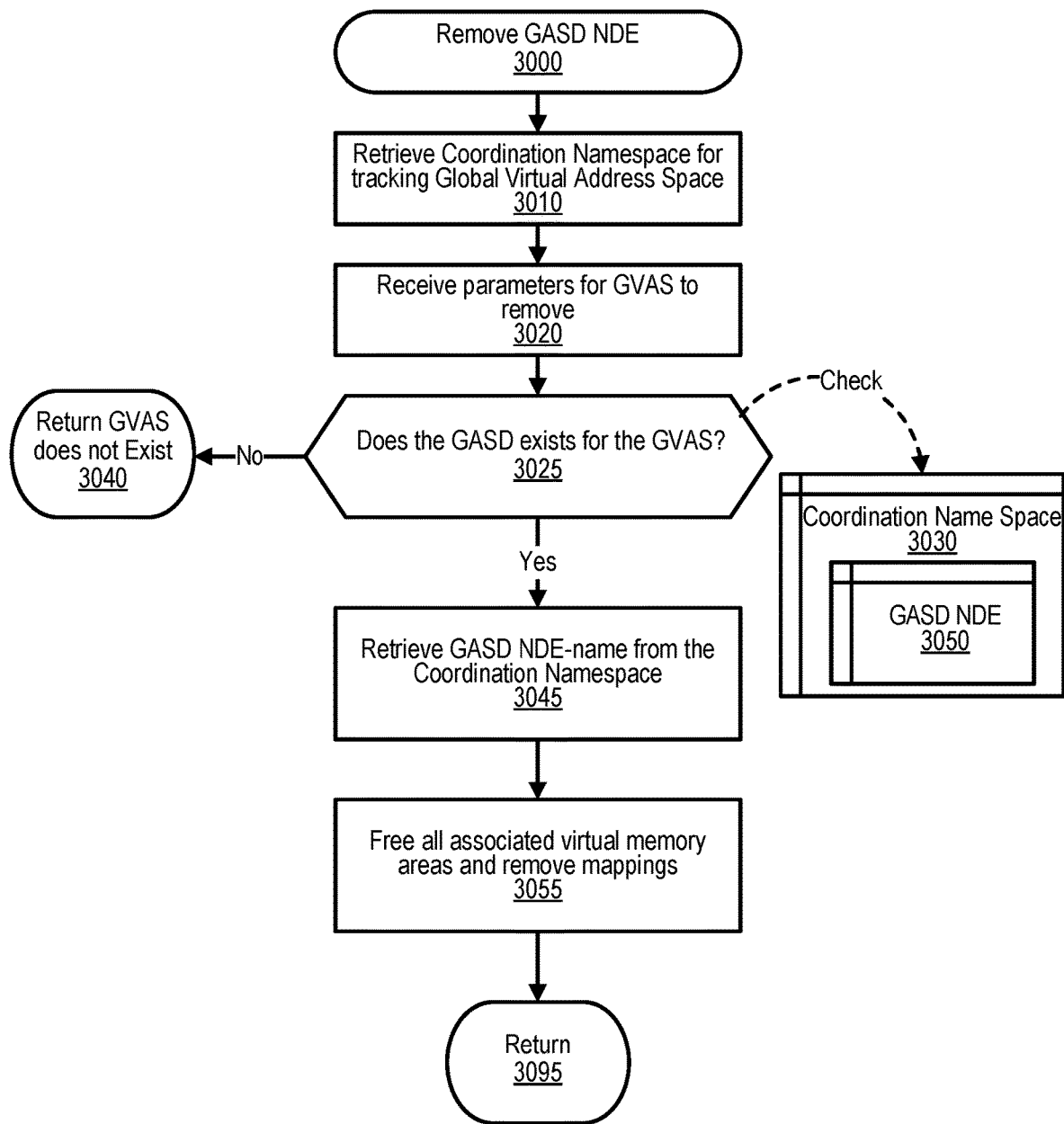
FIG. 30 shows a flowchart depicting the steps taken by a process that removes a GASD NDE tracking a GVAS.

FIG. 30 processing commences at 3000 and shows the steps taken by a process that remove a GASD NDE tracking a GVAS. At step 3010, the process retrieves the Coordination Namespace for tracking virtual memory areas in the Global Virtual Address Spaces. At step 3020, the process receives the parameters for the GVAS being removed. At step 3025, a determination is made as to whether the GASD already exists for this GVAS. The check at step 2825 retrieves the data from Coordination Namespace 3030 to check for the existence of the GASD NDE 3050 that corresponds to the GVAS being created. If the GASD NDE exists (no branch of 3025), the process returns indicating the GVAS does not exist and the a corresponding GASD was not removed, at step 3040. On the other hand, if GASD NDE exist for this GVAS, then decision 3025 branches to the 'yes' branch. At step 3045, the process retrieves the GASD NDE-name, frees all associated virtual memory areas and removes the associated mappings 3055 for all processes attached to the GVAS. Retrieving the GASD NDE-name also removes the GASD NDE 3050 from the Coordination Namespace 3030. FIG. 30 processing thereafter ends at 3095.

Figure 31:
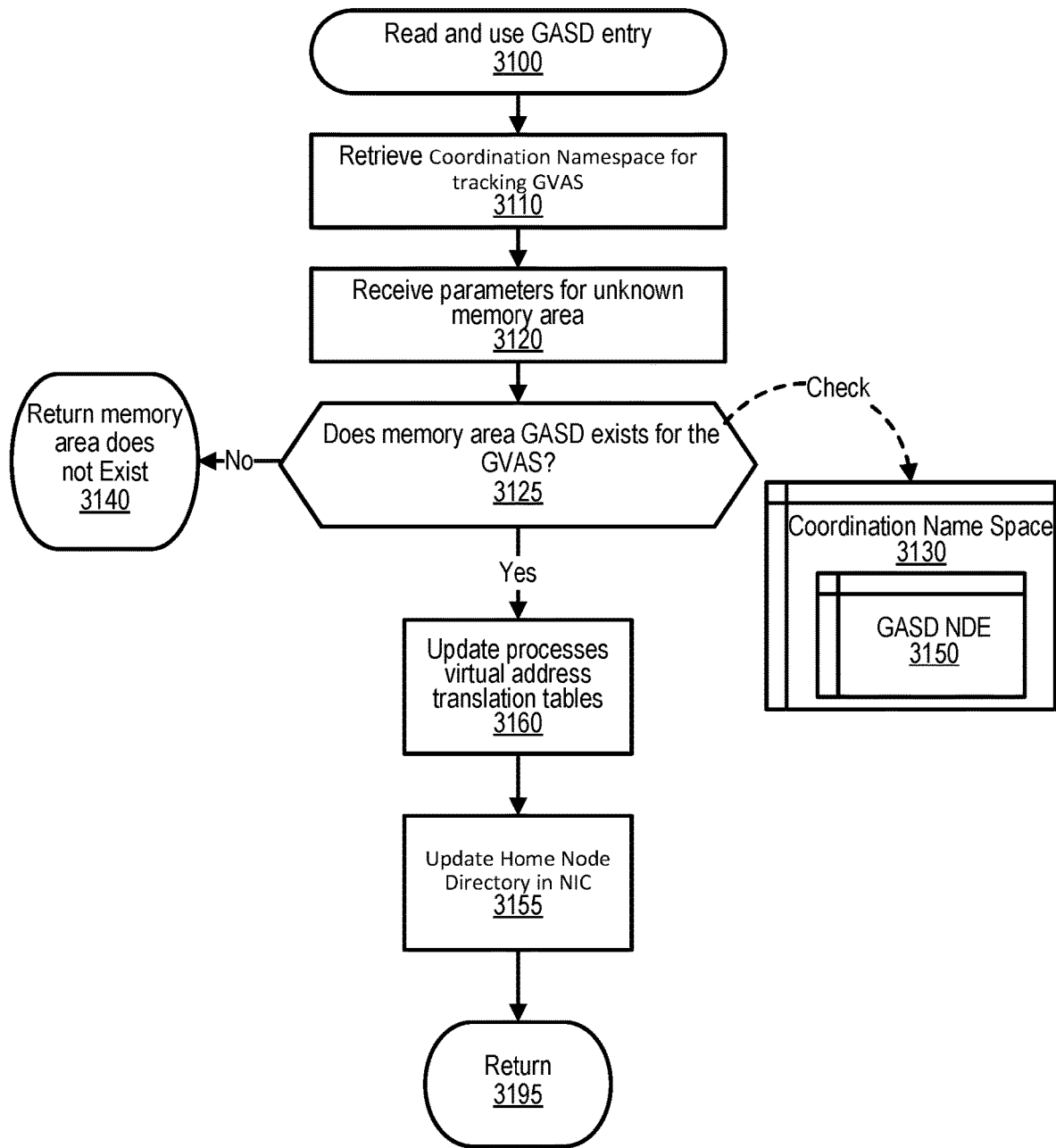
FIG. 31 shows a flowchart depicting the steps taken by a process that reads and uses an entry in the GASD for a memory area unknown to system software.

FIG. 31 processing commences at 3100 and shows the steps taken by a process that reads and uses an entry in the GASD for a memory area unknown to system software. At step 3110, the process retrieves the Coordination Namespace for tracking memory areas in the Global Virtual Address Spaces. At step 3120, the process receives the parameters for the unknown memory area. At step 3125, a determination is made as to whether the memory area exists in this GVAS by reading the associated NDE(s). If memory area does not exist in this GVAS, then decision 3125 branches to the 'no' branch. The check at step 3125 reads the data from Coordination Namespace 3130 to check for the existence of the memory areas in the GASD NDE(s) 3150 that corresponds to the GVAS being created. If the memory area does not exist, the process returns indicating the corresponding memory area does not exist 3140. On the other hand, if memory area does exist in this GVAS, then decision 3125 branches to the 'yes' branch. At step 3160, the process uses the directory information read in step 3125 to update the virtual translation tables for the process needing access to the memory area. At step 3155, the process uses the directory information read in step 3125 to update the Home Node Directory in NIC for locating the backing memory. FIG. 31 processing thereafter ends at 3195.

Figure 32:
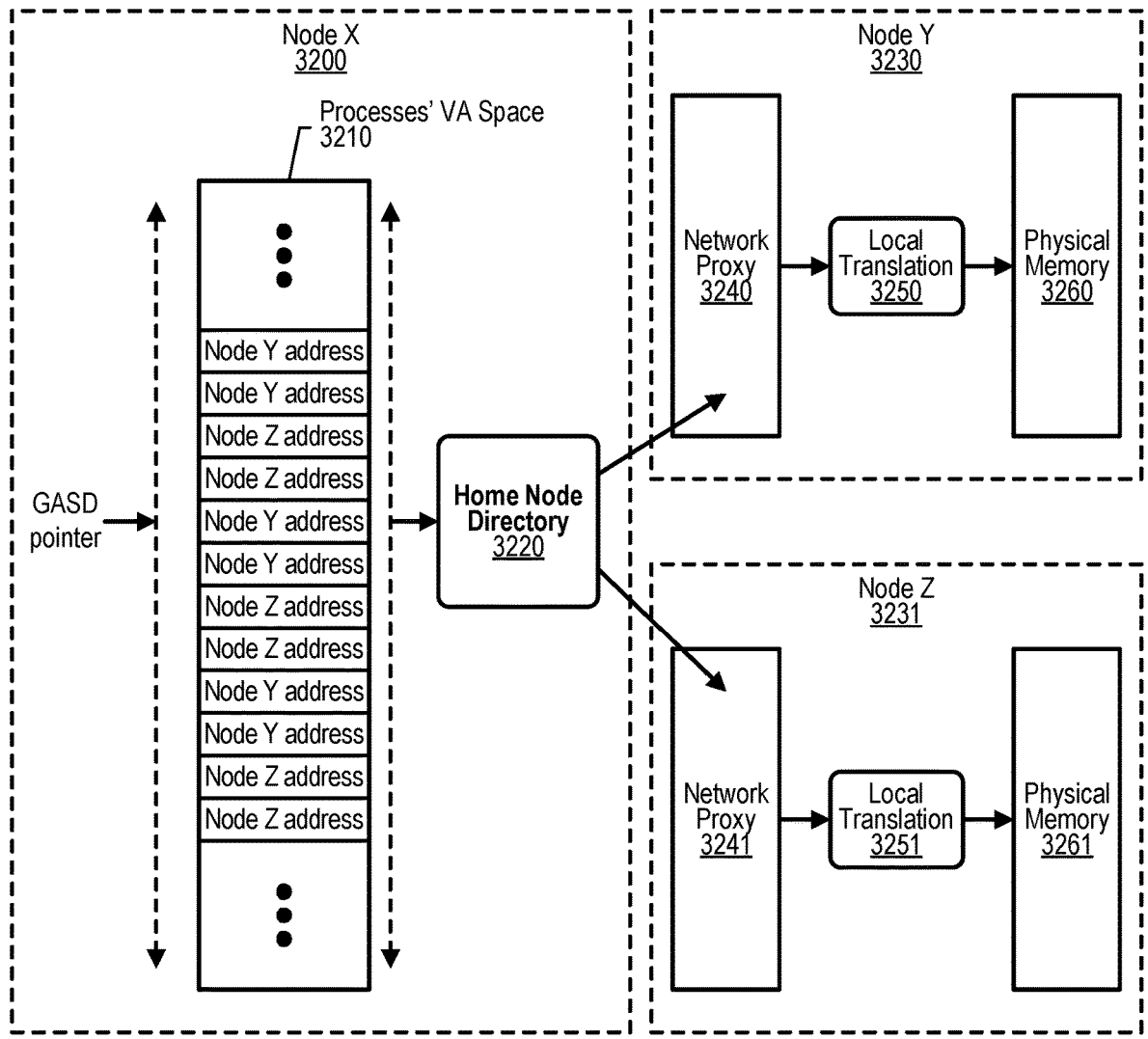
FIG. 32 shows a diagram depicting a Global Address Space Directory (GASD)

FIG. 32 is an illustration of a process to locate the "Home Node" or backing memory for a given GVAS pointer. The Processes' VA Space 3210 represents the virtual address space of a process running on node X 3200 of which a portion of the Processes' VA Space 3210 is the GVAS. (Note: The memory allocation handler for globally shared data ensures that all processes have the same virtual addresses for all processes that share the GVAS.) Each node contains a Home Node Directory 3220 that maps a block of global virtual addresses to the node containing the backing memory for the corresponding global virtual address range. The Node Y 3230 and Node Z 3231 contain the backing memory for the corresponding blocks mapped in the Processes' VA Space 3210 on Node X 3200. Not shown in FIG. 32 is a first VA translation of the virtual address into a local physical address and a first search of a local extended memory cache located in the node's physical memory. Assuming the remote data is not locally available in the extended memory cache, a search of the Home Node Directory 3220 is performed to find the "Home Node" and a network packet is created containing a request for the global virtual address and sent to the node identified by the Home Node Directory. A network proxy on the target node receives the packet, performs a second VA translation to locate the global virtual address within the physical memory of that node, and then performs the requested operation. In FIG. 32, the Home Node Directory 3220 has address ranges homed on Node Y where Network Proxy 3240 performs the Local Translation 3250 into the Physical Memory 3260 on Node Y 3230. Similarly, the Home Node Directory 3220 has address ranges homed on Node Z where Network Proxy 3241 performs the Local Translation 3251 into the Physical Memory 3261 on Node Z 3231. Within each node, a NIC may contain the Home Node Directory shown in FIGS. 36 and 37 with entries shown in FIGS. 56 and 57 for mapping these blocks to Home Node and creating the network packet. Furthermore, the NIC within each node may perform the network proxy function. As depicted in FIG. 24, a GVAS has a GASD tracking the memory areas allocated in the GVAS and the operating system references the GASD to initialize both the local VA translations and the Home Node Directory. Processes attached to the same Global Virtual Address Space will therefore have the same Home Node Directory information for a given global virtual address enabling sharing of pointers across physical units or nodes. The directory information is kept up to date by the operating systems when the GVAS APIs (gsMap( ), gsMapAll( ), gsFree( ), gsSetHome( ), and gsExpose( )) API routines [FIG. 52] are called.

Not shown in FIG. 32 is the local VA translation and the local extended memory cache that allows units to cache remote memory within its local memory pool. The local VA translation is standard in most modern CPUs and maps a VA to a physical memory address, in this case the address of a physical extended memory cache page (FIG. 20, FIG. 21, FIG. 51, and FIG. 54). If the remote data is available in the extended memory cache, the unit performs a local memory access of the cache. If not available, the unit sends the global virtual address request to the NIC, which performs the global virtual address to home unit translation and sends a request across the network to the Home Node. A network proxy on the home unit receives the global virtual address request, performs a local virtual address translation to locate the requested global virtual address within its memory pool, and then performs the requested operation. Since the Home Node contains the backing memory, the translation will resolve to normal physical memory and not memory associated with the extended memory cache of that node. To make the VA request operation efficient, the NIC may support a special command initiated by the host processor that carries the VA and request all within a single bus operation. In addition, the NIC may support performing VA request from remote units with little or no host processor support.

FIGS. 33 through 37 depict a method of identifying a home node of a data granule by retrieving a Home Node Directory mapping a plurality of global virtual addresses to a plurality of memory addresses stored in a shared memory. The shared memory may be shared amongst a plurality of nodes that include the local node and one or more remote nodes. The method may retrieve from the Home Node Directory, the home node associated with a selected global virtual address and access the data granule corresponding to the selected global virtual address from the home node. The global virtual address may be received from a process. The method may determine that the data granule corresponding to the global virtual address is not located in the local memory, wherein the retrieving, receiving, reading, and requesting are performed in response to the determination. The home node may be a remote node different from the local node, and wherein the data granule is stored in a local address of the remote node. The method may identify a change to an owner of the global virtual address and update the Home Node Directory and corresponding entries the Global Address Space Directory based on the change to the owner. The owner is changed by assigning a new home node to the data granule. The memory type may correspond to the memory address where the data granule is stored in the global virtual memory and wherein the memory type is selected from the group consisting of, but not limited to, a DRAM, SCM, a volatile memory, and a nonvolatile memory.

Figure 33:
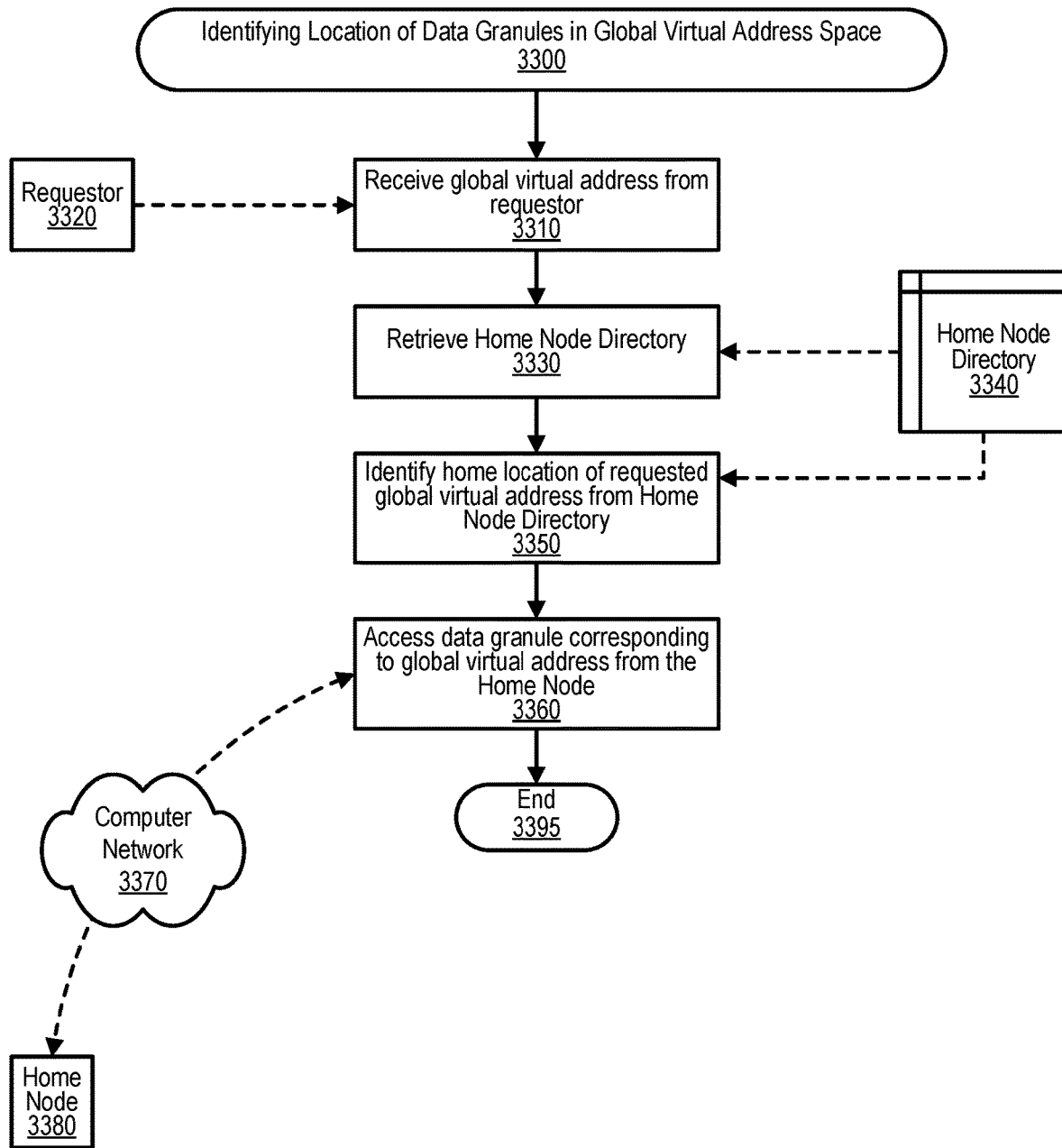
FIG. 33 shows a flowchart depicting steps taken to identify the location of data granules in a Global Virtual Address Space (GVAS)

FIG. 33 processing commences at 3300 and shows the steps taken by a process that identifies a Location of Data Granules in Global Virtual Address Space using a Home Node Directory. At step 3310, the process receives global virtual address from requestor 3320. At step 3330, the process retrieves Home Node Directory 3340 entry corresponding to the global virtual address. At step 3350, the process identifies a home location of the requested global virtual address from Home Node Directory entry. At step 3360, the process accesses the data granule corresponding to global virtual address from the Home Node 3380 via computer Network 3370. FIG. 33 processing thereafter ends at 3395.

The ability to dynamically update the Home Node Directory, provides support for applications to restart from an error with fewer nodes or more nodes. This is a significant improvement to the Reliability, availability, and serviceability (RAS) in previous systems where the application must be restarted with the same number of nodes or the application must be constructed to handle restarting with fewer or more nodes which complicates the application leading to more potential software failures. This improvement allows the system manager to restart an application immediately with the available resources without having to wait for the required number of resources. Furthermore, the application can also be restarted with more resources than might have been available when first started. By providing this capability, applications can be restarted dynamically which reduces impact of restart failures on the true system error rate. In addition, this support provides an overall performance improvement for applications and workflows by allowing the full system to be utilized more effectively in the case of failures and reducing the restart latency by allowing an application or workflow to restart immediately.

Figure 34:
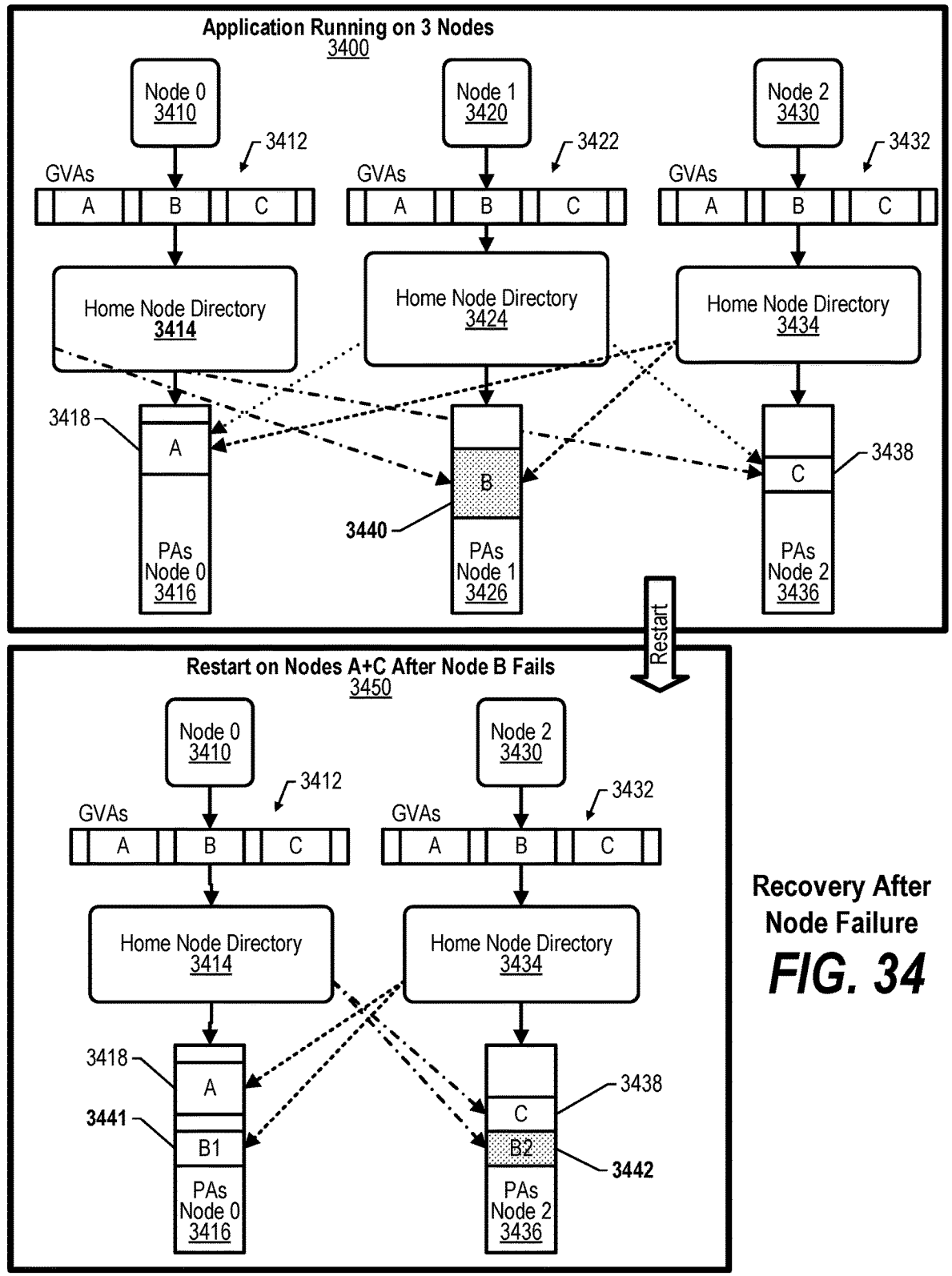
FIG. 34 shows a diagram depicting the recovery of the system after a node failure.

FIG. 34 depicts a schematic view of Applications Running on three Nodes 3400 and a restarting on two nodes, Node A+C after Node B Fails 3450. Under the extended memory architecture, each node contains a portion of the global virtual address space. Diagram 3400 shows an application running on three nodes where virtual memory region A 3418, B 3440, and C 3438 are in the physical memory on Node 0 3410, Node 1 3420, and Node 2 3430 respectively. As shown in 3400, Home Node Directory 3414 on Node 0 maps A VAs to Physical Addresses (PAs) Node 0 3416. Home Node Directory 3424 on Node 1 maps B VAs to PAs Node 1 3426. Home Node Directory 3434 on Node 2 maps C VAs to PAs Node 2 3436. If node B fails as indicated in 3450, the extended memory architecture allows for dynamically re-constructing the physical memory backing the global virtual address space (GVAS) without requiring a reboot of all nodes by updating the Global Address Space Directory (GASD), restoring the physical memory and updating the Home Node Directories [3414, 3434] in Node 0 3410 and Node 2 3430 based on the new GASD information. In FIG. 34, the GVAs B 3440 are shown mapped to B1 3441 as PAs Node 0 3416 and B2 3442 as PAs Node 2 3436. Various approaches may be used to support the restoring the physical memory. For example, in one embodiment, the memory on B may be accessible by Nodes A and C. In another embodiment, the restart may involve restoring the state of the machines, including the memory, from a previous check pointed state. In a third embodiment, the memory may be shadowed and retrieved from a duplicated source. In a fourth embodiment, page tables are utilized to support remapping (See FIGS. 36 and 37 and corresponding description.) This fundamental difference between the extended memory architecture and previous distributed memory systems enables a more resilient Global Virtual Address Space in an extreme-scale system that allows applications to be restarted using a different number of nodes and resources. Application may restart on the same, fewer, or more nodes than used prior to the failure.

Figure 35:
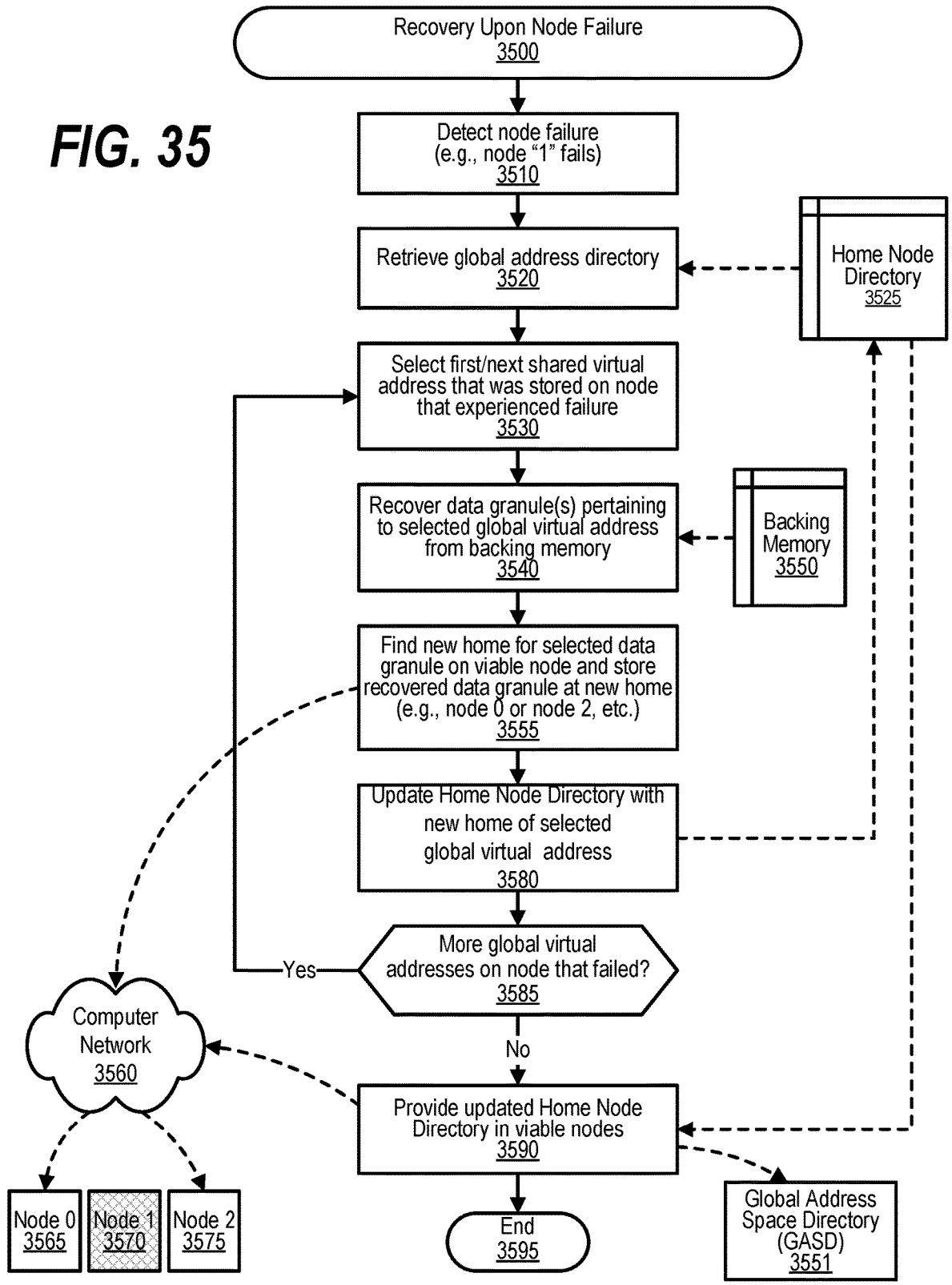
FIG. 35 shows a flowchart depicting steps taken to recover system after a node failure.

FIG. 35 processing commences at 3500 and shows the steps taken by a process that recovers Upon Node Failure where the process is performed by the system manager. At step 3510, the process detects a node failure (e.g. node "1" 3570 fails). At step 3520, the process retrieves Home Node Directory 3525. At step 3530, the process selects the first global virtual address that was stored on node that experienced failure. At step 3540, the process recovers data granule(s) pertaining to selected global virtual address from backing memory 3550. At step 3555, the process finds new home for selected data granule on the available nodes and stores the recovered data granule via Computer Network 3560 at new home (e.g. node 0 3565 or node 2 3575, etc.). At step 3580, the process updates Home Node Directory with new home of selected shared virtual address. The process determines as to whether there are more global virtual addresses on node that failed (decision 3585). If more there are more global virtual addresses on node that failed, then decision 3585 branches to the 'yes' branch and continues with step 3530. On the other hand, if there are no global virtual addresses on node that failed, then decision 3585 branches to the 'no' branch. At step 3590, the process updates the Home Node Directories in the new set of viable node(s) and updates the Global Address Space Directory (GASD) 3551 to reflect the new homes for the relocated virtual addresses. FIG. 35 processing thereafter ends at 3595.

Figure 36:
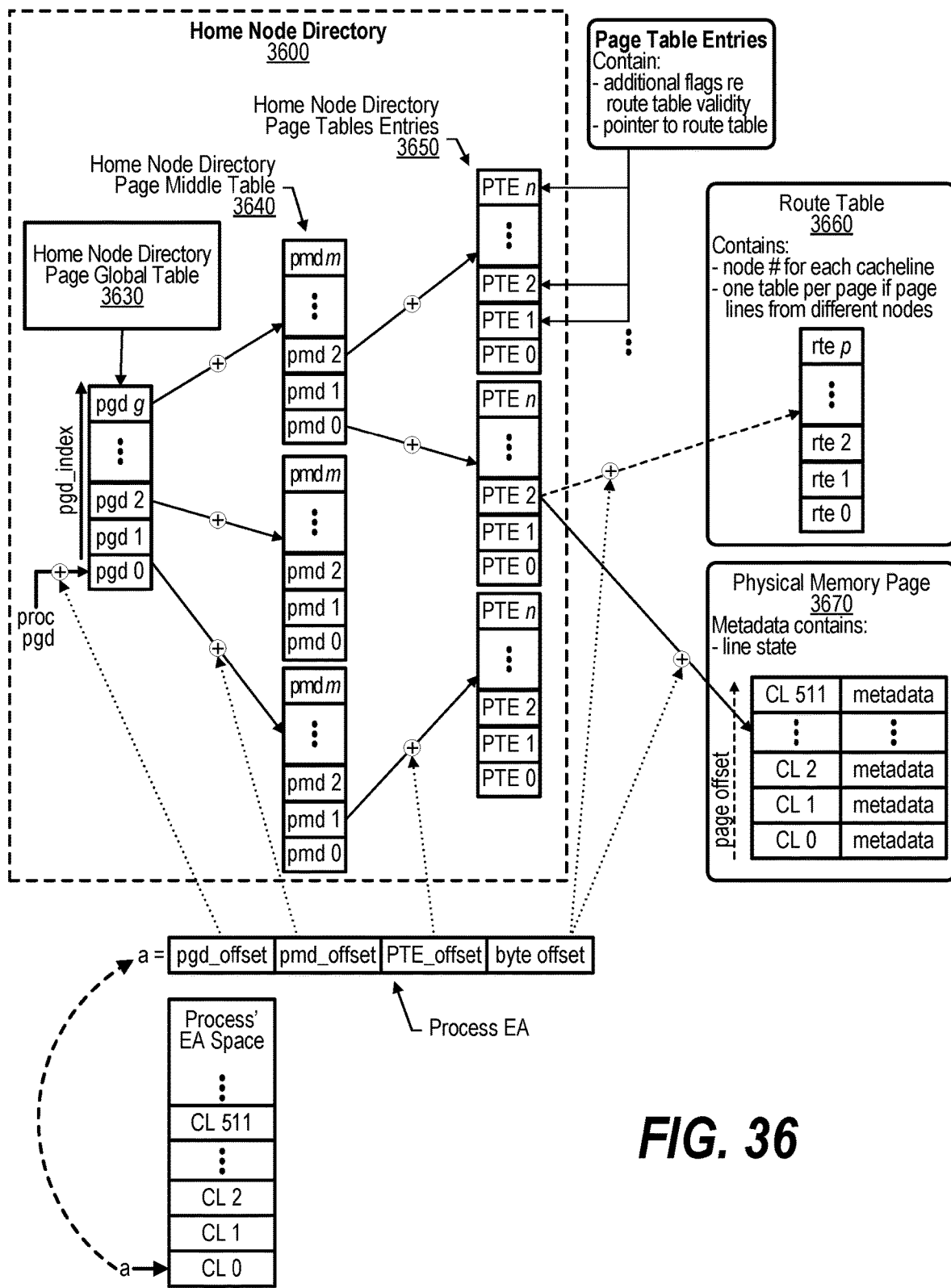
FIG. 36 shows a diagram depicting a standard page table with extended memory extensions.

FIG. 36 shows an embodiment of a Home Node Directory using a standard page table construction with extended memory extensions supporting fine grain relocation 3600 of data between a plurality of nodes. The Home Node Directory Page Global Directory 3630 has entries pointing to Home Node Directory Page Middle Directories 3640 which point to Home Node Directory Page Tables 3650 having Page Table Entries (PTE) which may point to Route Table 3660 allowing for a separate node for each cache line. In this case, the hierarchical page table construction is augmented with a "Home" node location for the data. This example shows the insertion of another last level containing the routing information for each cache line (128-bytes) within the page, the Route Table 3660. If the nodes that own or "Homes" the data represented by an entry in a layer of the Home Node Directory [3630, 3640, 3650] can be described, then the entry will be of type 0x2-0x9 (see FIG. 25) and the hierarchy stop with this entry. If on the other hand, the nodes that own or "Homes" the data represented by an entry in a layer of the Home Node Directory [3630, 3640, 3650] cannot be described, then the entry is of type 0x1 (see FIG. 25), and the hierarchy continues to the next level. The Route Table 3660 level is only necessary if the cache lines within the page are "Homed" or owned by more nodes than can be described by the entries at each level (see FIG. 25). In another embodiment, Home Node Directory entries in levels 3630 and 3640 may point to a Route Table 3660. In a third embodiment, the Home Node Directory may also serve as the page table. In the third embodiment, the last level page table 3650 contains additional flags describing the type of page. If all the granules of data within the page are locally homed, then the flags indicate a normal page. If all the granules of data within the page are owned by remote nodes, the flags indicate an extended memory cache page. If one or more granules are locally owned, the flags indicate a mixed page (local/extended memory cache page). If the flags indicate an extended memory cache page or mixed page, physical address points to a physical memory page that contains meta-data 3670. For locally homed data granules, the metadata may indicate "valid" or if the memory is not initialized "invalid." If the granule is homed on a remote node, the metadata indicates if the granule contains a valid replica of the remote data associated with the global virtual address. The metadata may include a tag that allows a plurality of remote data to be placed in the same granule. In this case, the tag is used along with the valid metadata to determine if the requested global virtual address replica in memory is the same as the global virtual address referenced (see FIG. 54). The reference to Process EA 3520 may identify individual cache line (CL) referencing a Physical Address 3770 each of which has corresponding metadata or an indication of the home node where the data is located.

Figure 37:
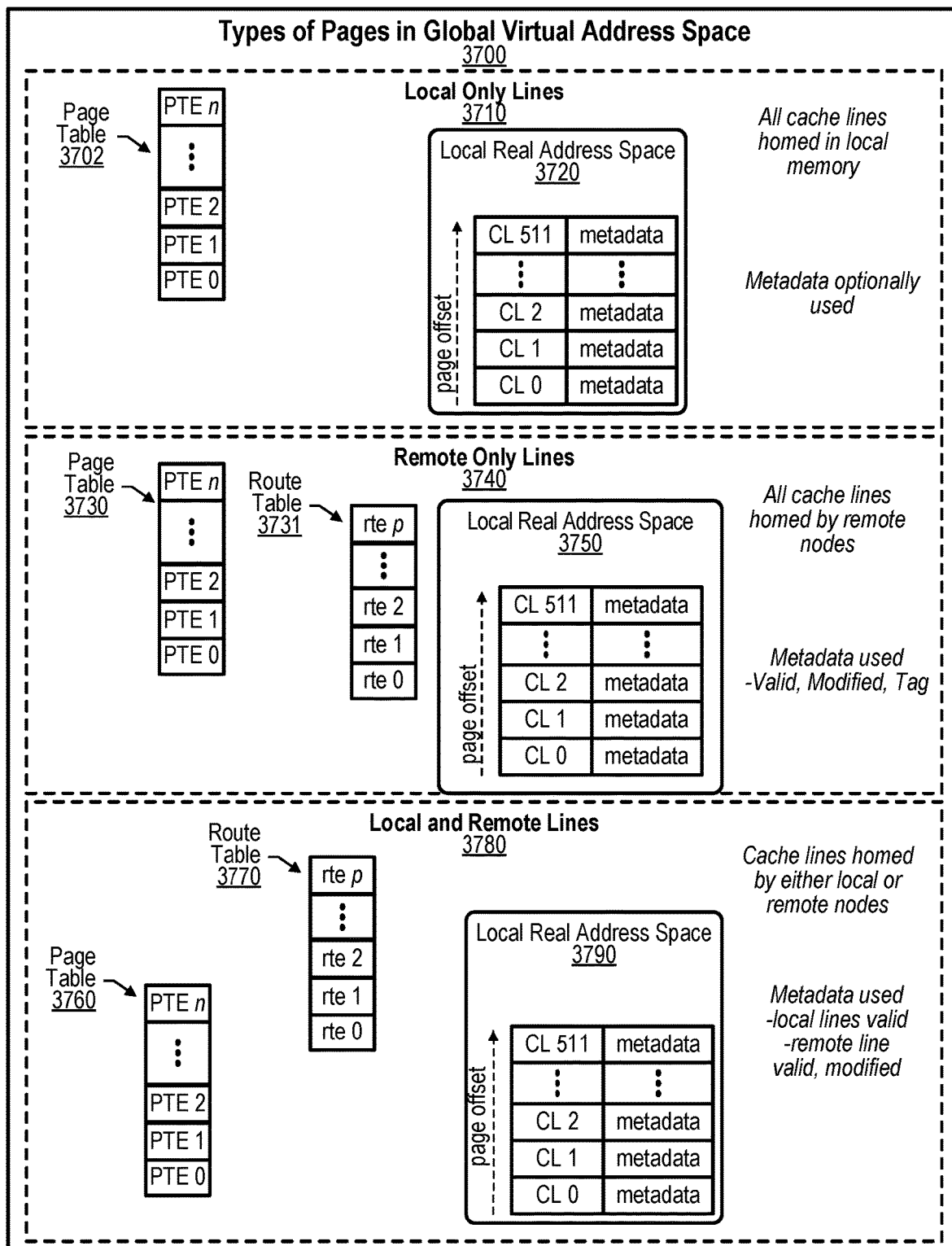
FIG. 37 shows a diagram depicting various types of pages in a Global Virtual Address Space (GVAS)

FIG. 37 depicts examples of types of pages in the Global Virtual Address Space 3700 corresponding to three types of pages described in the text for FIG. 36. Local Only Lines 3710 contains a Page Table 3702 where entry PTE 2 points to a page in the Local Real Address Space 3720 that contains cache lines (CL) homed only by the local node. In the case of Local Only Lines 3710, all cache lines of the page are locally home and considered a normal page. The metadata may optionally be used to identify memory that has not been initialized by setting the metadata to not valid. When a cache line (CL) that is locally homed is not valid, an interrupt may be generated signaling an access to uninitialized memory.

In the case of Remote Only Lines 3740, all the cache lines of the page are homed by remote nodes and considered an extended memory cache page. The metadata for an extended memory cache page is used to indicate if the cache line (CL) is valid or has been modified. When a cache line (CL) that is remotely homed is not valid for the referenced real address, the Route Table 3731 may be used to locate the home node when the Page Table 3730 cannot represent the home nodes for each cache line (CL). Furthermore, a real address tag may be provided that allows a plurality of pages in the Local Real Address Space 3750 to point to the same physical memory. In this case, the real address tag is compared with the real address being referenced to further qualify the validity of the cache line (CL). The real address tag allows data for multiple Virtual Pages that are mapped to multiple pages in the Real Address Space to be stored in a single physical page in memory.

Local and Remote Lines 3780 contains a Page Table 3760 where entry PTE 2 points to a page in the Local Real Address Space 3790 that contains cache lines (CL) homed by both the local and remote nodes. In the case of Local and Remote Lines 3780, the referenced page contains a mixture of lines homed by the local and remote nodes. When a cache line (CL) that is remotely homed is not valid for the referenced real address, the Route Table 3770 may be used to locate the home node when the PTE cannot represent the home nodes for each cache line (CL). The metadata for a mixed page is used to indicate if the cache line (CL) is valid or has been modified. The metadata for Cache lines homed by the local node may be marked not valid if the data are not initialized. Furthermore, the real address tag in the metadata is not used. When a cache line (CL) that is locally homed is not valid, an interrupt may be generated signaling an access to uninitialized memory. When a cache line (CL) that is remotely homed is not valid for the referenced real address, the Route Table 3771 may be used to locate the home node when the PTE cannot represent the home nodes for each cache line (CL).

FIGS. 38 through 42 depict a method for maintaining a consistent view of memory for a set of shared memory regions. The method comprises establishing a version of the memory associated with the set of shared memory regions at a given point in time (or snapshot of memory). Modifications made to a memory snapshot are only visible to the thread or process performing the modifications on a local node. The method may also provide a means for resolving updates to establish a new consistent memory view for all nodes and processes at a given point in time. The method maintains a consistent view of shared memory regions by the local node wherein a first value is written to shared memory. After writing the first value, establishing a consistency state of the shared memory regions, wherein the shared memory regions are shared amongst a plurality of processes including a writing process and one or more other processes. After writing the first value by the writing process, writing a second value by the writing process to the shared memory, wherein, after the writing of the second value, the first value is visible to the one or more other processes. The writing process may run on the local node while the other processes run on one or more of a plurality of nodes with access to the shared memory regions and wherein the plurality of nodes may include a remote node different from the local node. The consistency state may be established after the writing of the first value and before the writing of the second value. In some scenarios, the other processes may be prevented from seeing the second value wherein the first value is returned for a read operation. The shared memory written may be homed by the node running the writing process or by a plurality of remote nodes. Furthermore, the method may support a plurality of writing nodes that may write a third value before establishing a consistency state before writing a fourth value. The method may also support a writing a plurality of values to the shared memory that includes the first, second, third and fourth values. After a second point in time, the plurality of values may be consolidated into a new consistency state using a resolution function. The resolution function may be chosen from a predefined set of functions or a user defined function for resolving updates to a shared memory location made by at least two processes. The set of shared memory regions may be, for example, data referenced variable(s) or an object referenced from a C++ application.

In an embodiment that detects false sharing, updates to remote granules may be maintained in a separate backing memory on the local node. At the consistency point, the updated value is compared with the snapshot value on the home node to develop a write mask. The write mask is then used to update the version of memory that will become the new consistent version. Furthermore, the mask and snapshot version can also be used to determine if multiple updates were made to the same byte (true sharing). In the case of true sharing, the user provides a reduction function (such as max, min, add, subtract, etc.) or a user defined reduction method (set of code) to determine the final value of the memory location. Other variations may include options to determine if the memory updates are visible soon after a store is performed (eventual consistency) or at a consistency point. The disclosed system may protect a given region of the Global Virtual Address Space to prevent (or detect) accesses by remote nodes. The disclosed method is a scalable method for maintaining a consistent view of memory for a set of shared memory regions that may represent an object or a set of variables. The method establishes a version of the shared memory associated with an object at a given point in time (or snapshot of memory). Modifications to a shared memory outside of the snapshot shared memory regions are made visible after the time of the modification (eventual consistency) while modifications to shared memory inside of the snapshot are only locally visible to the thread or process performing the modifications (snapshot consistency) until the updates from all threads or processes performing updates are resolved at a gsUnite( ) consistency point.

In an embodiment, software may create the snapshot using a library call "gsSnap( )." The gsSnap( ) library call creates the snapshot for a list of global virtual address ranges and provides access to this exposed version of the shared memory to a set of processes. Each process or thread is then allowed to create a new version of the shared memory snapshot that are only visible to that process or thread. The new version is created when a process modifies a location within the snapshot region. Furthermore, the version may only include the modified shared memory. Software can then create a new consistent version by consolidating the modification performed by all the exposed processes by calling the "gsUnite( )" library call.

In another embodiment, this approach supports a method for using system metadata for tracking the read and write sets of transactions to determine if the memory accesses for two or more concurrent transactions conflict, meaning the transactions must be serialized for Atomicity, Isolation, and Consistency. With the snapshot consistency model, both the old and new state of memory are maintained. In most transactional systems, a transaction fails if any location in the read set of a transaction hits the write set of a concurrent transaction or any location in the write set of transaction hits the write set of a concurrent transaction. Example 1: Two non-conflicting transactions: Transaction 1—Read set (A0, A1, A2) and write set (A2). Transaction 2—Read set (A0, A1, A3) and write set (A3). Both transactions can complete in example 1 since there were no conflicts between the read and writes sets of both transactions Example 2: Two Conflicting Transactions Transaction 1—Read set (A0, A1, A2) and write set (A2). Transaction 2—Read set (A0, A1, A2) and write set (A1). Both transactions in example 2 will fail or must be serialized since an address in the write-set of transaction 1 hits the read set of transaction 2 and visa-versa. By using the metadata to track state of shared memory, conflicts between concurrent transactions can be detected by the snapshot consistency model. Furthermore, in the second example at least one of the transactions can be allowed to complete since the modifications by the other transaction are not visible. Transaction 1 can complete since the modifications made to A1 by transaction 2 are not visible to Transaction 1 due to the checkpoint. Transaction 1 therefore has a Consistent view of memory allowing the transaction to appear Atomic and Isolated from Transaction 2. Similarly, Transaction 2 can complete since the modifications made to A1 by transaction 1 are not visible to Transaction 2 due to the checkpoint. Transaction 2 therefore has a Consistent view of memory allowing the transaction to appear Atomic and Isolated from Transaction 1.

Figure 38:
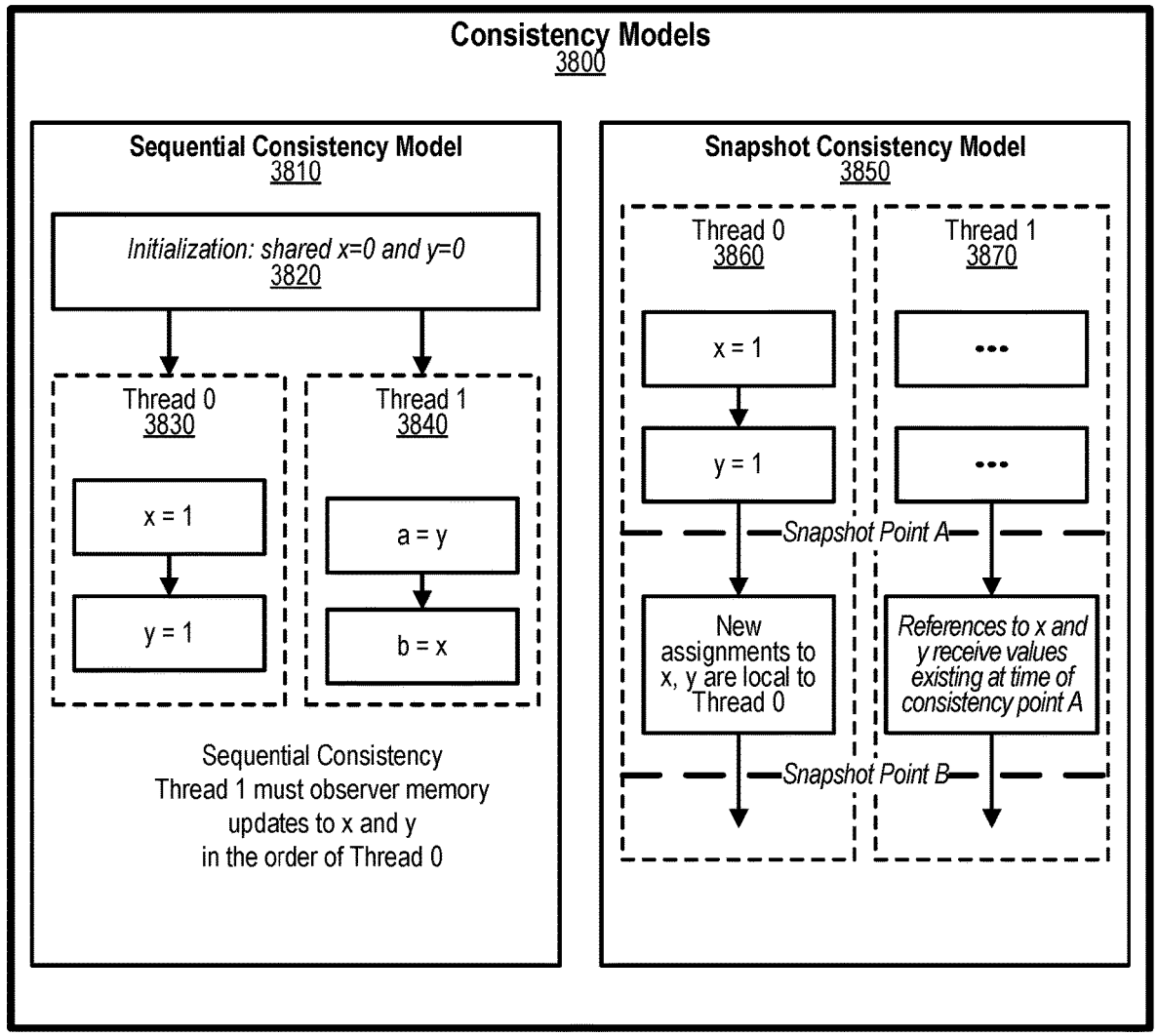
FIG. 38 shows a diagram depicting consistency models.

FIG. 38 illustrates two different consistency models 3800: The Sequential Consistency Model 3810 and the Consistency Model for Extended Memory 3850. The Sequential Consistency Model 3810 shows two threads performing a sequential series of instructions. Under the sequential consistency model, shared variables x and y are set to 0 3820. Thread 1 3840 should never observe the modified value of "y" without also observing the modified value of "x" made by Thread 0 3830. Achieving sequential consistency in a strictly ordered system is trivial. However, modern systems and processors often have a weakly ordered memory system, leading to the programmer having to issue memory synchronization operations when sequential consistency is required.

The Snapshot Consistency Model for Extended Memory 3850 illustrates a relaxed consistency model for extended memory. The snapshot consistency model is not strict sequential consistency but a relaxed form where the programmer or runtime system explicitly provides a consistency point (or snapshot of memory) for a given global virtual memory range. The Sequential Consistency Model 3810 diagram shows two threads performing a sequential set of instructions. In this case, arrows inserted represent the order that instructions are performed. The instruction sequence starts with a single thread initializing memory locations "x" and "y" to zero before spawning Thread 0 3830 and Thread 1 3840. Thread 0 3830 first sets memory location "x" to one then sets memory location "y" to one. Thread 1 3840 read memory location "y" into variable a then read memory location "x" into variable b. Under the sequential consistency model, Thread 1 3840 cannot observe variable a equal to one and variable b equal to zero. Thread 1 3840 must observe the updates to "x" and "y" in the order they are performed by Thread 0 3830.

The Snapshot Consistency Model 3850 shows Thread 0 3860 and Thread 1 3870 also performing a sequential set of instructions in the order represented by the arrows. In this example, thread 0 3860 sets the value of "x" and "y" to one before consistency point "A." At consistency point "A", a snapshot of memory is performed. After consistency point "A", thread 0 performs additional assignments of "x" and "y" and thread 1 begins referencing "x" and "y." Under the snapshot consistency model, thread 1 cannot not observe any modifications of "x" and y" performed by thread 0 after the consistency point "A", thus all references of "x" and "y" performed by thread 1 3870 would return a value of one. The modifications to "x" and "y" performed by thread 0 are only visible to thread 0 before consistency point "B." At consistency point "B", all the modifications performed by thread 0 are made visible to thread 1. The snapshot of memory may be performed by the application or runtime using the API call gsSnap( ) (see FIG. 53). The memory updates performed by thread 0 may be made visible to thread 1 at consistency point "B" by the application or runtime using the API call gsUnite( ) (see FIG. 53).

In FIG. 38, two threads are used to illustrate the sequential consistency model and the snapshot consistency model (or snapshot model). Snapshot points are added to the application to establish a version of memory (or snapshot) to be used by the threads moving forward. Between the coordination points, any updates to the snapshot of memory are only visible to the thread or process making the update. At each coordination point, any updates made to the memory snapshot are resolved into a single consistent version of memory for references by all threads. The consistency model shown in FIG. 38 is an example of a set of consistency models and APIs for extended memory architecture. Various embodiments may be supported. For example, various algorithms could be provided for allowing multiple threads to update the same memory location. Other embodiments could include hierarchies of memory snapshots.

In an embodiment, hardware coherency is not maintained for remote memory accesses and the corresponding data in the extended memory caches in the GVAS. In many scenarios, software can maintain coherency. However, the programming models for GPUs assume coherency between the CPU caches and GPU's memory. In some system designs, GPUs may be located in different nodes from the CPUs. Therefore, there is a need for a method to support hardware coherency for disaggregated systems (e.g. Data Centric Systems (DCS)).

Figure 39:
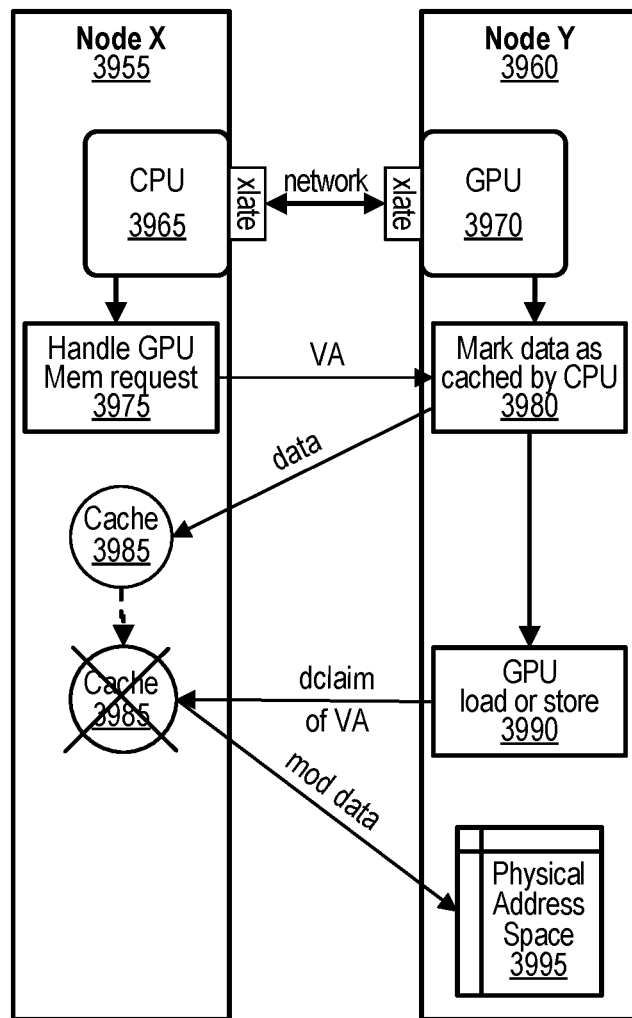
FIG. 39 shows a diagram depicting coherency for backwards compatibility.

FIG. 39 depicts the steps performed to support maintaining coherency in a GVAS 3900. The processing flow for coherency in a GVAS 3900 has Node X 3955 communicating with Node Y 3960 utilizing a network link. Node X 3955 contains a CPU 3965 and Node Y 3960 contains a GPU 3970. When the CPU 3965 performs a load or store to the GPU's Physical Address Space 3995 that is not locally available in the CPU's cache 3985, a cache miss occurs. The GPU memory request is handled 3975 and the corresponding virtual address (VA) is sent to the GPU across the network to the GPU. The GPU marks the memory as being cached by the CPU 3980 and returns the data to the CPU's cache 3985. In addition, the GPUs caches are searched for the most recent data. When the GPU 3970 processes a load or a store 3990, the state of memory is first checked to determine if the data could potentially exist in the CPU caches 3985. If CPU cache could potentially contain the data, the GPU sends a dclaim of the VA using the network to invalidate the CPU's cached entry 3985. If the corresponding data are modified, the data is written back to the GPU's Physical Address Space 3995 and the entry is removed from the CPU's cache. If the entry exists but is not modified, the entry is removed from the CPU's cache 3985 and an acknowledgment is returned with no data. The method for maintaining coherency in a GVAS 3900 can scale across a large-scale system by allowing only one of a plurality of nodes in the system to have any one of the plurality of cache lines in the GPU's physical memory cached at any one point in time. Furthermore, this form of coherency may be applied to any types of nodes in a disaggregated system (e.g. between nodes containing CPUs).

Figure 40:
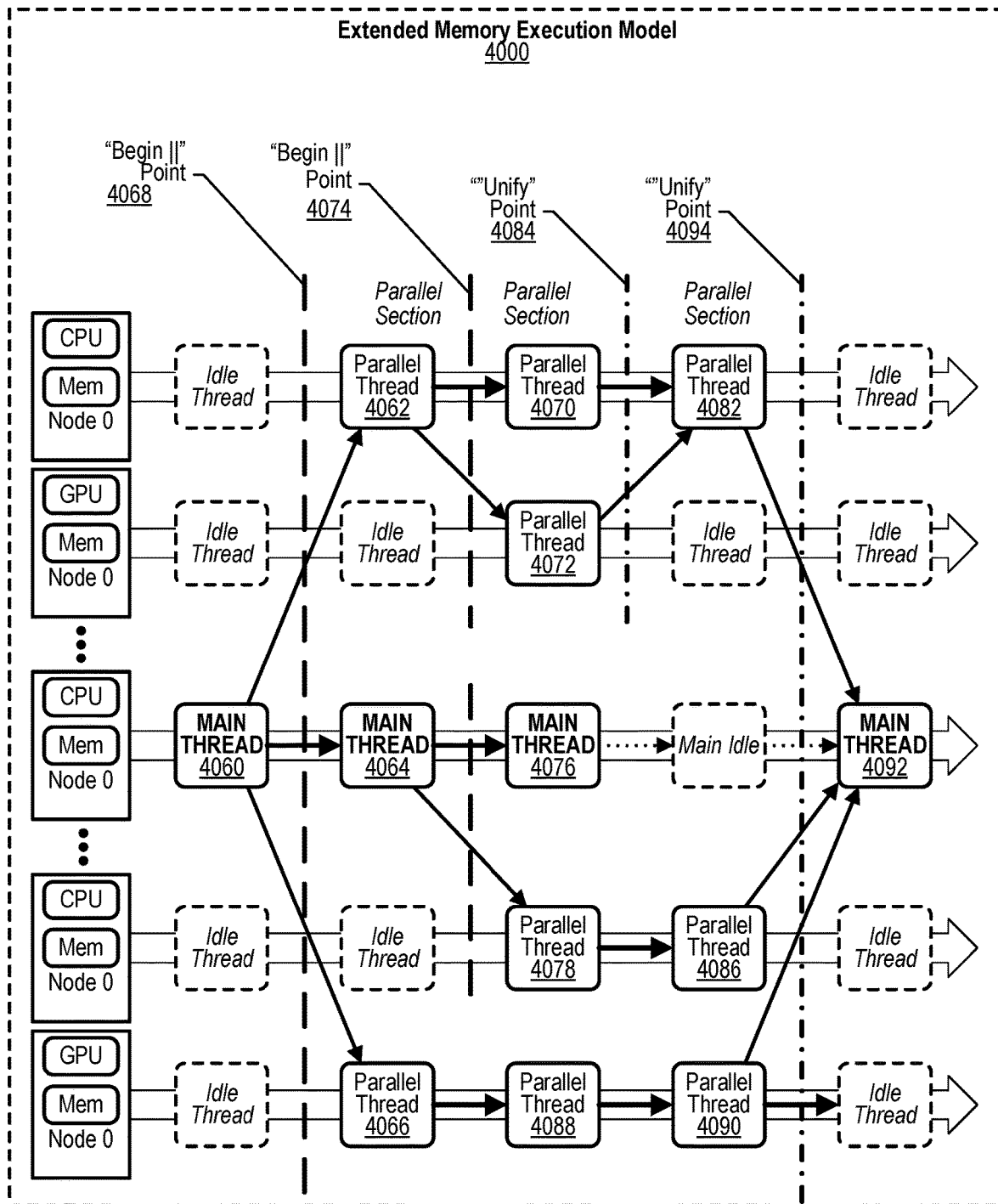
FIG. 40 shows a diagram depicting an extended memory execution model.

FIG. 40 is an example showing the Extended Memory Execution Model. Several execution units (CPUs and GPUs) are each running a separate thread of an application. At various points during the execution of the program, threads either start or stop execution, or issue consistency points. The point at which a thread begins or resumes execution is typically associated with a Begin parallel, "Begin|" consistency point. At the "Begin|" point, the application or runtime may make application programming interface (API) calls to create a consistent mapping of the GVAS (e.g. gsExpose( )) and create a snapshot of memory (e.g. gsSnap( )). In doing so a consistent view of a set of the GVAS is established. The point at which threads are suspended or stopped is typically associated with an "Unify" point. At this point "Unify", the application or runtime may make API calls to resolve the updates made during the parallel thread execution (e.g. gsUnite( )) and remove global virtual address mappings (e.g. gsPrivate( )). The Consistency Point creates a "Consistent" view of memory at a point in time that eliminates the need to maintain coherency throughout the parallel execution of the threads. The "Begin|"/"Unify" consistency points are similar to a "fork/join" process model but differs in how updates to memory shared between the threads is viewed (see "Snapshot Consistency Model" FIG. 38). At Begin|points: Parallel threads get a "snapshot" of specified shared memory at the consistency point. Parallel threads see only "local" updates of specified shared memory and updates by other threads are not visible. Remote memory references may be "cached" locally during the parallel sections, but coherency is not maintained. At the "Unify" points, updates to shared memory by the parallel threads are resolved. If two or more threads update to the same memory location, a shared memory conflict exists. The shared memory conflicts are resolved as part of the gsUnite( ) call using predefined conflict "resolution" functions. In some cases, a user-defined "resolution" function may be required to create the desired consistent memory result.

FIG. 40 depicts an extended memory execution model 4000 where a hierarchy of shared memory snapshots, Begin|4068 and Begin|4074 and their respective "Unify" points, 4094 and 4084 respectively. At Begin|4068, Parallel Thread 4062 and Parallel Thread 4066 are spawned by Main Thread 4060. During the parallel section that starts at Begin|4068, a first snapshot is created for Main Thread 4064 and Parallel Threads 4062 and 4066. At Begin|, Parallel Thread 4062 spawns Parallel Thread 4072 and Main Thread 4064 spawns Parallel Thread 4078. During the parallel section that starts at Begin|4074, a second snapshot is created for Parallel Threads 4070 and 4072, and a third snapshot is created for Main Thread 4076 and Parallel Thread 4078. At Unify|4084, the updates made to the second snapshot by Parallel Threads 4070 and 4072 are resolved. At Unify|4094, the updates made to the third snapshot by Main Thread 4076 and Parallel Thread 4078 and 4086 are resolved and updates to the first snapshot by Main Thread 4064 Main Thread 4092 and Parallel Threads 4066, 4088, 4090, 4062 and 4082 are resolved.

Figure 41:
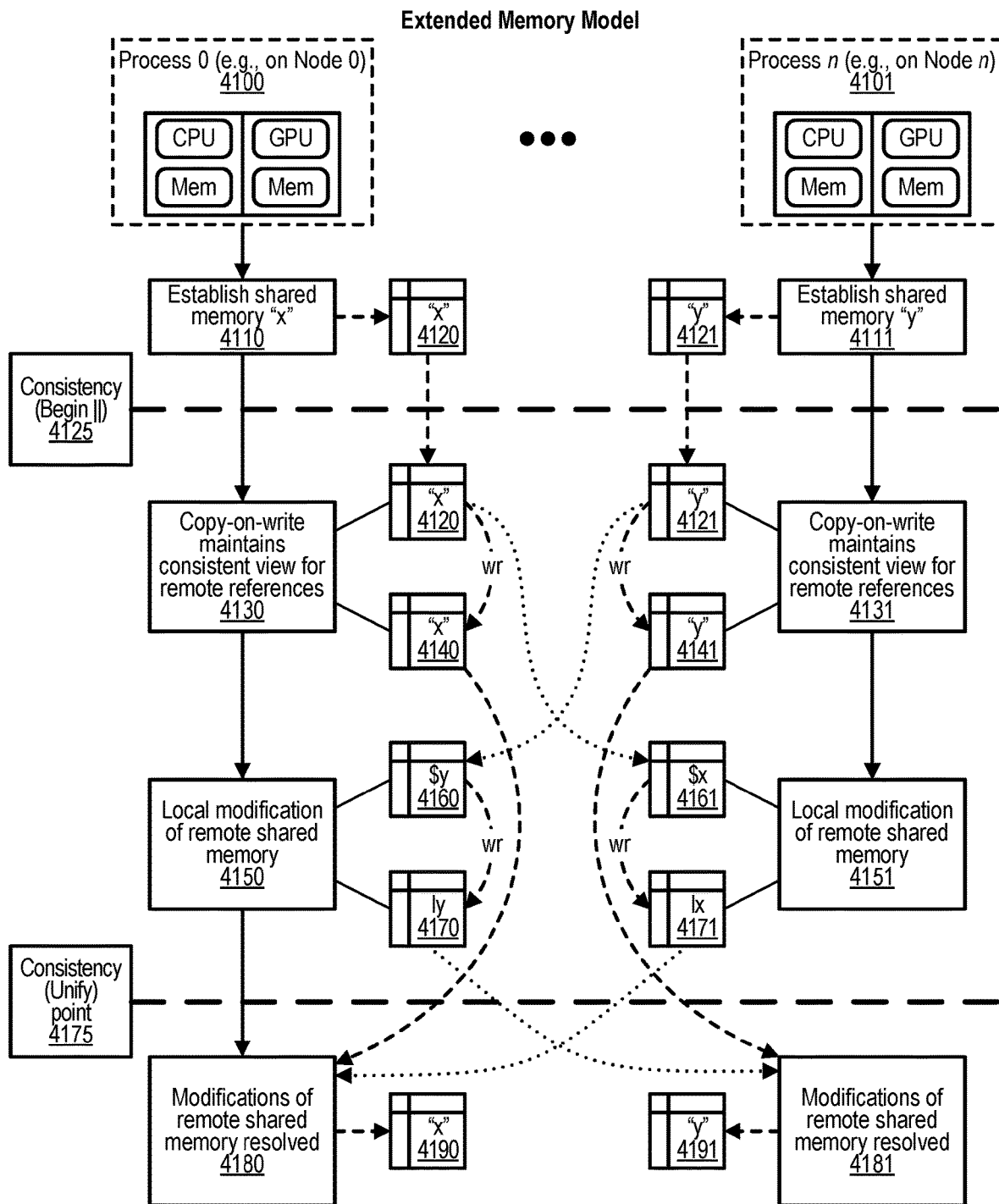
FIG. 41 shows a diagram depicting an extended memory model.

FIG. 41 depicting a view of processing "Begin|" and "Unify" across multiple nodes by the Extended Memory Model. The process 0 (e.g. on Node 0) 4100 establishes shared memory "x" 4110 established as "x" 4120 at Coordination (Begin|) point 4125. Other processes on other nodes, process n (e.g. on Node n) 4101, establishing other shared memory "y" 4111 established as "y" 4121 at Coordination (Begin|) point 4125. Handling the Coordination (Begin|) point sets the state of each shared memory as copy-on-write [steps 4130 and 4131] in preparation for modifications to shared memory [steps 4130, 4131, 4150, and 4151]. At step 4130 and 4131, a local modified copy of shared memory "x" 4140 and "y" 4141 is created allowing process 0 4100 to always access the unmodified "y" 4121 and process n to always access the unmodified "x" 4120. At step 4150, a local copy "ly" 4170 when "$y" 4160 is modified by process 0 4100. At step 4151, a local copy "lx" 4171 when "$x" 4161 is modified by process n 4101. At Consistency (Unify) point 4175 the modifications to shared memory "x" 4120 and "y" 4121 by all processes (e.g. process 0 4100 and process n 4101) are resolved [steps 4180 and 4181] and a new consistent shared memory view for "x" 4190 and "y" 4191 are created.

Figure 42:
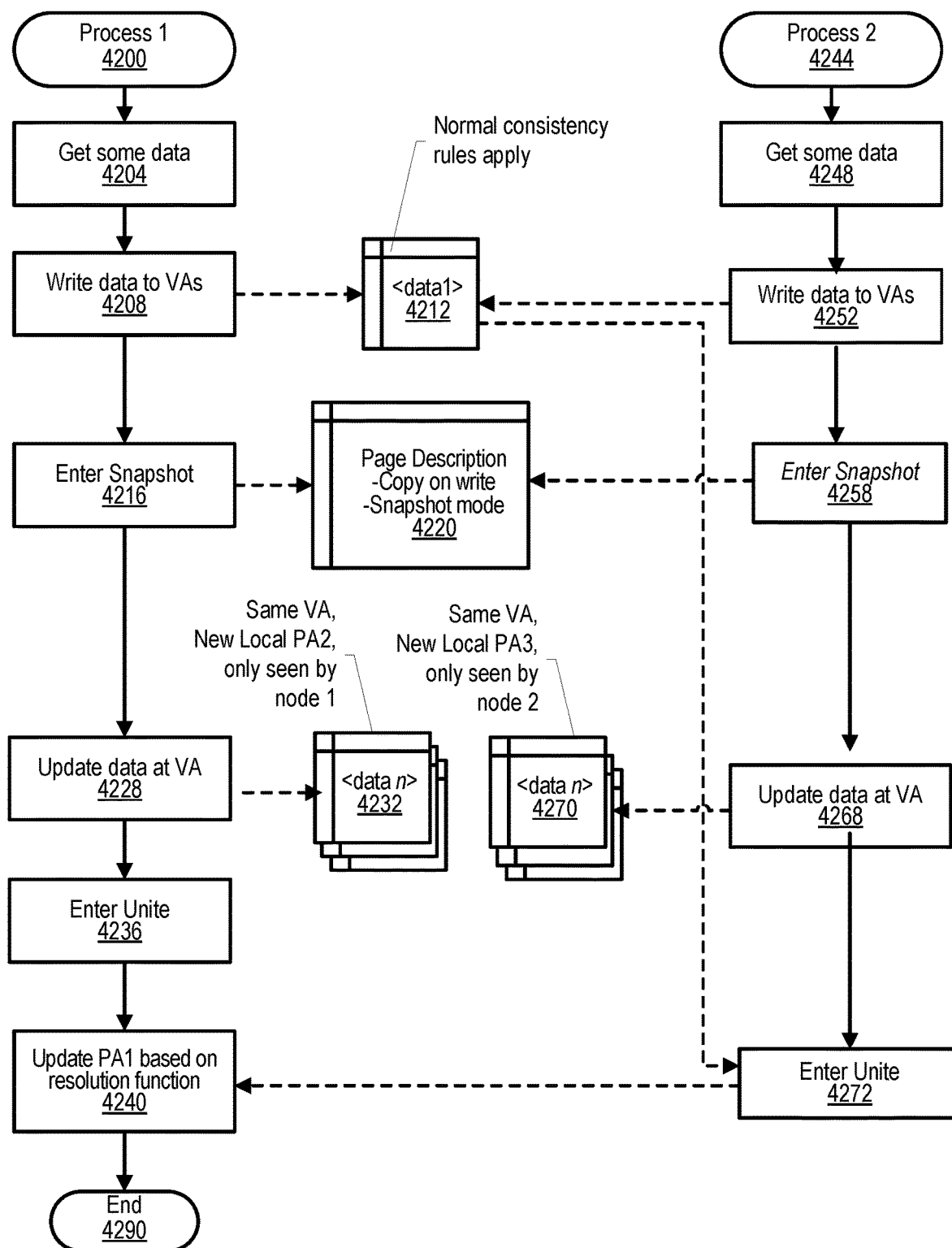
FIG. 42 shows a flowchart that depicts steps taken to perform snapshot consistency between applications within a Global Virtual Address Space (GVAS)

FIG. 42 depicts a method to perform snapshot consistency between a plurality of applications within a Global Virtual Address Space (GVAS) that includes the taking a "snapshot" of the shared memory regions. FIG. 42 depicts a flow for applications running multiple processes utilizing snapshot consistency. Each of the process is assumed to be attached to the same Global Virtual Address Space before accessing any global VAs. The processes may execute on the same node or different nodes. Process 1 4200 gets some data 4204 and writes data to a global VAs 4208 stored as data1 4212 at PA1. Similarly, Process 2 4244 gets some data 4248 and writes data to a global VAs 4252 stored as data1 4212 at PA1. The global VAs 4208 written by Process 1 4200 and Process 2 4244 may be the same set, disjoint sets, or overlapping sets of VAs and corresponding PAs and normal memory consistency rules apply when updating memory. Furthermore, the global VAs may be in memory local to the node or located in memory of a remote node. At step 4216, Process 1 4200 enters Snapshot Consistency for a set of global VAs. At the same time, Process 2 4244 enters Snapshot Consistency at step 4258. The set of global VAs in the snapshot region may be the same set, disjoint sets, or overlapping sets between Process 1 4200 and Process 2 4244. Entering Snapshot Consistency sets the corresponding memory as copy on write and snapshot consistency mode in the associated page description 4220. The first time Process 1 updates the data for the global VA step 4228 after entering the snapshot 4216, a new PA, PA2 4232, is allocated for the global VA for Process 1 4200 that contains the updated data for global VA 4228. All subsequent access to the VA 4228 by Process 1 4200 reference PA2 for that VA use the same data n 4232 until Process 1 4200 enters the Unite at step 4236. Similarly, the first time Process 2 updates the data for the global VA step 4268 after entering the snapshot 4258, a new PA, PA3 4270, is allocated for the global VA for Process 2 4244 that contains the updated data for VA 4268. All subsequent access to the global VA 4268 by Process 2 4244 reference PA3 for that VA use the same data n 4232 until Process 1 4200 enters the Unite at step 4272. Furthermore, any reference by Process 1 4200 to a global VA that is not in the global VA set updated by step 4228 but is included in the global VA set updated by step 4268 access PA1. Likewise, any reference by Process 2 4244 to a global VA that is not in the global VA set updated by step 4268 but is included in the global VA set updated by step 4228 access PA1. Once both Process 1 4200 and Process 2 4244 enter Unite at steps 4236 and 4272 respectively, PA1 4212 is updated based on a resolution function 4240 using the data written to PA2 4232 and PA3 4270 by Process 1 4200 and Process 2 4244 respectively. The process ends at step 4290 with both Processes [4200 and 4244] using the data at PA1 when referencing a global VA.

Figure 43:
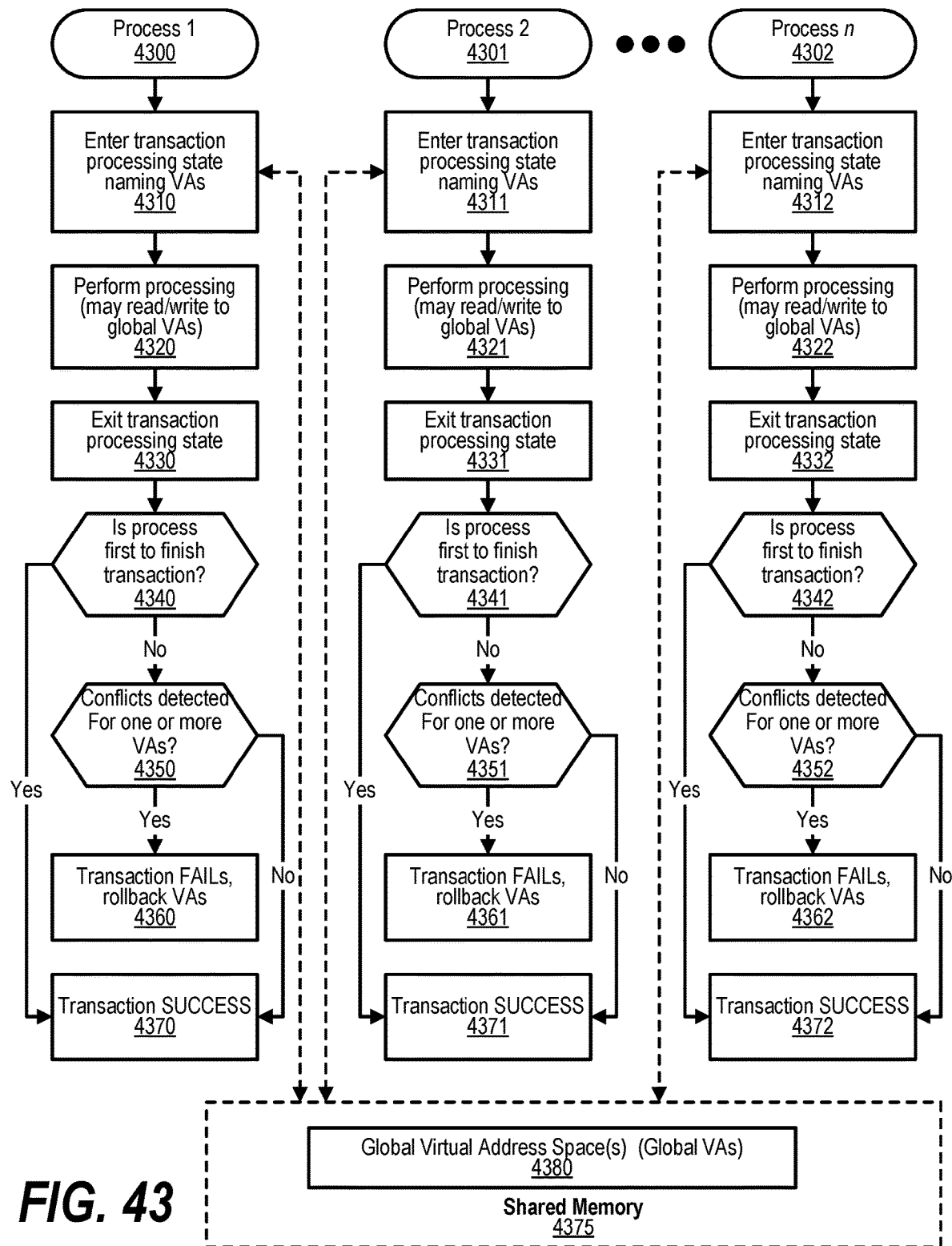
FIG. 43 shows a flowchart that depicts steps taken to track the state of shared memory when entering a transaction processing state.

FIG. 43 depicts a method that tracks the state of shared memory, when entering a transaction processing state, corresponding to one or more global virtual addresses accessed by a plurality of processing threads executing a plurality of transactions. Transactions executed by one of the plurality of threads allows a selected one of the plurality of transactions to complete and in response to detecting a conflict in the transaction processing state, inhibiting the completion of the non-selected transactions that have global virtual address conflicts with the selected transaction. Furthermore, the updates made by the non-selected transactions with conflicts are discarded. The one or more of the common virtual addresses are stored in a shared memory area that may be shared by a plurality of nodes that include the local node and one or more remote nodes. The selected transaction may be based on the selected transaction completing before completion of the non-selected transactions. One of the plurality of transactions may run on the local node and wherein one of the plurality of transactions may run on one of the remote nodes. A first access to one of the common virtual addresses may be identified after establishment of the transaction processing state. When a selected plurality of virtual addresses referenced by the plurality of threads are included in a common cache line, the method may detect a conflict when the byte modified in the common cache line, is not one of the bytes referenced by another transaction. Establishing the transaction processing state may be performed by tracking the accesses to the global virtual addresses using a system memory metadata. The method may also discard one or more memory changes made by one or more of the non-selected transactions. The conflict may be determined when the selected transaction completes.

FIG. 43 depicts a flow for steps taken by multiple processes utilizing shared memory 4375 which may be part of the same Global Virtual Address Space 4380. Each of the processes perform similar actions within the Global Virtual Address Space wherein each global VA is backed by the physical memory distributed across the nodes in the system (not shown). Process 1, Process 2, . . . , Process n [4300, 4301, . . . , 4302] enter a transaction processing state naming VAs [steps 4310, 4311, . . . , 4312], performs processing (may read/write to global VAs) [4320, 4321, . . . , 4322], and exits the transaction processing state [4330, 4331, . . . , 4332]. Each process determines if it is the first transaction to finish (decisions 4340, 4341, . . . , 4342). If process is first to finish a transaction, then (decisions 4340, 4341, . . . , 4342) branches to the 'yes' branch and the transaction succeeds [4370, 4371, . . . , 4372]. On the other hand, if not the first process to finish a transaction, then (decisions 4340, 4341, . . . , 4342) branches to the 'no' branch. A determination is made if any conflicts are detected for one or more global VAs (decisions 4350, 4351, . . . , 4352) with a completed transaction. If a conflict is not detected for one or more VAs then (decisions 4350, 4351, . . . , 4352) branches to the 'no' branch and the transaction succeeds [4370, 4371, . . . , 4372]. If a conflict is detected for one or more global VAs, then (decision 4350, 4351, . . . , 4352) branches to the 'yes' branch. At steps [4360, 4361, . . . , 4362], the processes' transactions fail and any updates made to the global VAs are discarded (rollback updates to global VAs).

Applications often communicate through a file system or a messaging system. In many cases, one application is the producer of data and other applications are consumers of the data. To avoid polling for availability of content meeting criteria, what is needed is a way for all consumers interested in a certain set of parameters to be informed when an updated version of the parameters is available, allowing each of the consumers to determine whether to pull in the currently available update. In situations where the consumer applications are restricted to a single node, the producer can place the parameters in that node, thus facilitating access to them by the consumers. A NDE-based method for subscriber applications within a workflow is to register a subscription to data with a certain name produced by one or more publisher applications.

A common communication model for related applications or processes is a producer/consumer where one or more processes produce information and one or more other processes consume the information. In many cases, the consumers of the information subscribe to the information of interest and the producers publish the information (Pub/Sub model). A typical communication method is for the producer to create a file stored in the global file system and consumers to poll for the existence of the file. This results in potentially many file system accesses. The Coordination Namespace (CNS) provides a convenient way to accomplish a Pub/Sub model using a CNS-based publisher-subscriber (Pub/Sub) mechanism. The CNS-based Pub/Sub mechanism keeps a list of the information requested by each subscriber. When a new version of the requested information is available, the producer creates a NDE with the requested information. The CNS-based Pub/Sub mechanism create a separate NDE for each subscriber with a version identifier and place the NDE in a location near each subscriber or even memory local to the subscriber or a single NDE read by all subscribers. When a subscriber is ready for a new version of the information, it reads or retrieves all the relevant NDEs using a predefined name corresponding the requested information. In addition, the subscriber may also include a version indicator where the version indicator may request a specific version, a version more recent than a specified version, the latest version, etc. A subscription remains valid for the lifetime of the subscriber or until cancelled by the subscriber. Subscriptions can be satisfied by multiple publishers. The end of a publisher application does not cancel any subscriptions, as the previously published NDEs may satisfy the subscribers request or a different publisher may produce the requested information in the future.

FIGS. 44 through 47 depict a method that provides communication between a plurality of processes running on a plurality of nodes that include a local node receiving a first request for information from one or more subscriber processes followed by receiving subscription requests from one or more subscriber processes. The subscription requests reference a NDE-name that corresponds to the subscription and criteria identifying the version required. The NDE is stored in a Coordination Namespace that may be distributed amongst the plurality of nodes. The method may generate several NDEs corresponding to different versions, NDEs V (V1, V2, . . . , Vn) where each version may fulfill one or more subscriptions, S (S1, S2, . . . , Sn). The method may communicate an availability of one or more version NDEs V to the one or more subscribers, S, based on criteria included in the subscription requests corresponding to each of the subscriber processes. Each of the version NDEs may include a reference to a data included in the NDE. A status to a subscriber may include the data reference from the version NDE. A Coordination Namespace server may receive the subscription requests and track the one or more subscriber applications as dummy-NDEs associated with the version NDE. The Coordination Namespace server may compare a dummy-NDE with a published version NDE with the criteria for each of the subscription requests and communicate the availability based upon the comparison. A publisher process may create a first NDE in a first storage for a first version of a NDE and a second NDE in a second storage for a second version. A first subscriber may receive the NDE from the first storage and a second subscriber may receive the NDE from a second storage wherein the first storage is located on a first node running the first subscriber process and the second storage is located on a second node running the second subscriber process.

Figure 44:
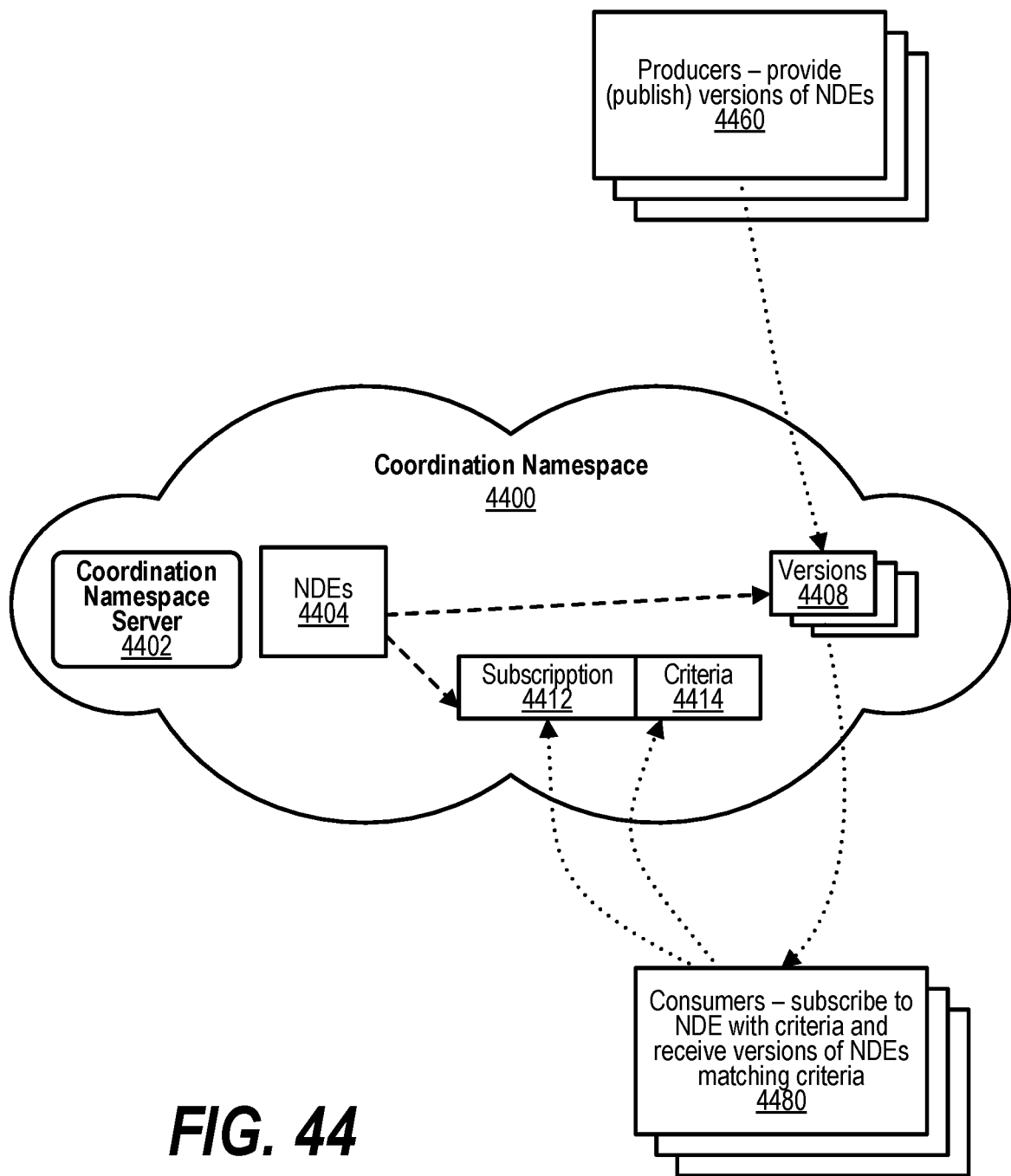
FIG. 44 depicts a diagram of processing subscriptions to content based on a name and criteria provided to producers of the content that utilizes the Coordination Namespace.

FIG. 44 depicts a schematic view of processing subscriptions to content based on a name and criteria provided to producers of the content that utilizes the Coordination Namespace 4400. Consumers 4480 make a request (not shown) for the content to Producers 4460. Producers 4460 then produce NDEs 4404 with Versions 4408 containing the requested content when new versions are available. Consumers 4480 create a Subscription 4412 with criteria 4414 for NDE 4404 containing the requested content by retrieving or reading the NDE from the Coordination Namespace Server 4402. When NDEs matching the Subscription 4412 and criteria 4414 are produced, the Coordination Namespace Server 4402 sends the requested content to the Consumer 4480. The Coordination Namespace Server 4402 supports associating a Subscription 4412 and associated criteria 4414 with NDEs 4404 and versions 4408. If the Consumer creates the Subscription before the Providers publishes a version matching the criteria, the Subscription becomes a dummy NDE (see FIG. 6 and related text).

Figure 45:
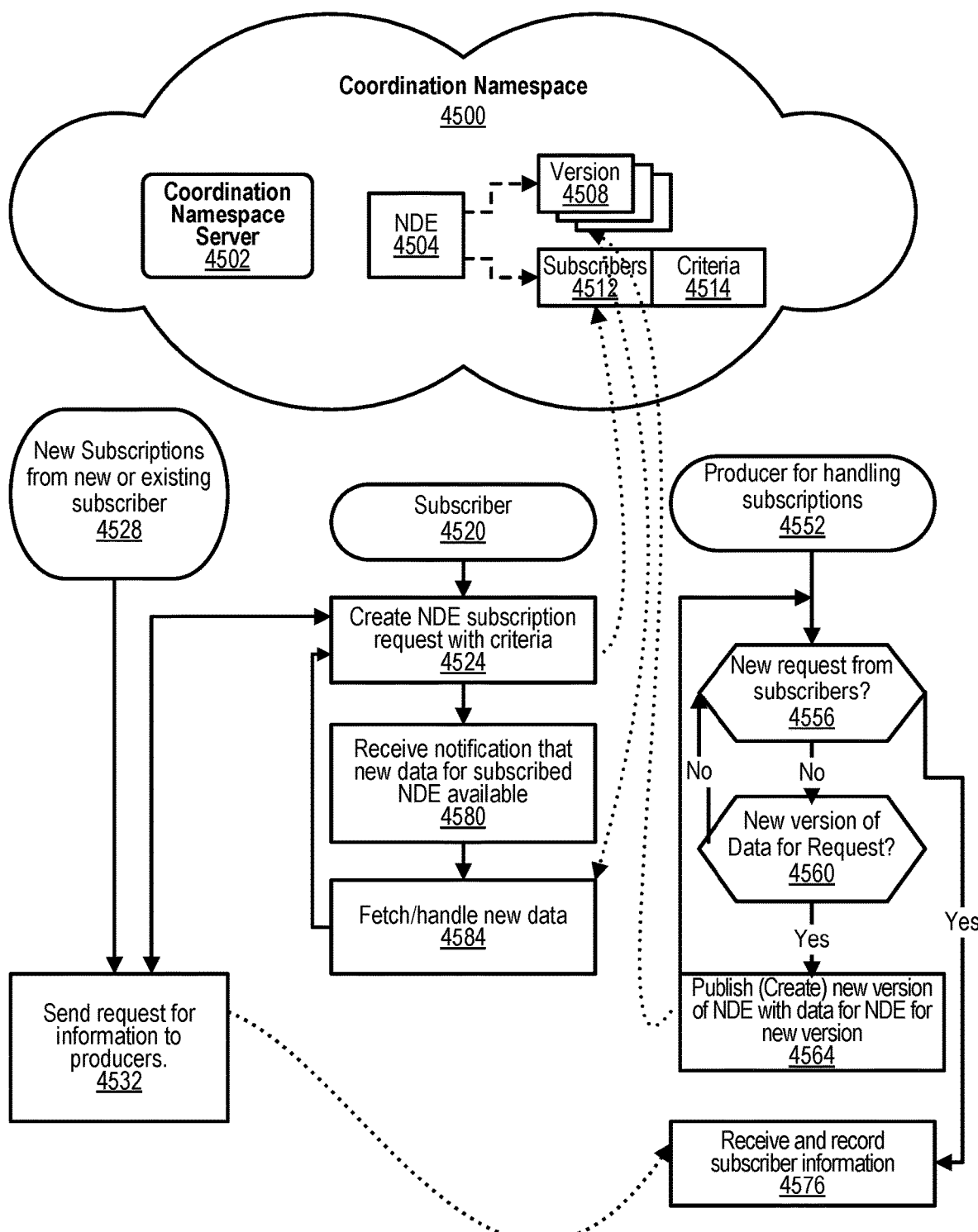
FIG. 45 depicts a flow showing the steps to process subscription, publications, and notifications for content utilizing NDEs in Coordination Namespace.

FIG. 45 depicts of flow of the steps to process subscription, publications, and notifications for content utilizing NDEs in Coordination Namespace. New subscriptions from new or existing subscribers 4528 send request for information to producers 4532. The request may be sent by creating NDEs in the Coordination Namespace 4500 that are received by Coordination Namespace Server 4502 and notifies the Producer for handling Subscription 4522 of a new request for information (not shown in figure) or by other mechanism such as messaging. The request may include the type of information being requested, frequency for receiving new versions, and persistence of older versions. After sending a request for information, Subscriber 4520 creates a NDE 4504 for Subscription 4512 request with criteria 4514 at step 4524. Once a published version 4508 is available in Coordination Namespace 4500, that matches the Subscription 4512 request and criteria 4514, Subscriber 4520 receives a notification that data for the Subscription 4512 is available at step 4580. If a NDE corresponding to the Subscription 4512 and criteria 4514 is not available, a dummy NDE is created to track the subscription request (See FIG. 6 and related text). At step 4584, Subscriber 4520 fetches and handles the new data and continues back to step 4524 to create a new subscription 4512 with new criteria 4514. While the process described is sequential, the process of creating a subscription and handling a version may be via asynchronous operations. Producers for handling subscriptions 4552, makes a first determination if a new request from subscriber (decision 4556). If a new request from subscriber (decision 4556), the process branches to the 'Yes' branch to receive and record the subscriber and the information at step

4576. The request may be from an existing or new subscriber. The process continues with step 4560. On the other hand, if the first determination is not new request from subscriber (decision 4556), the process branches to the 'No' branch to step 4560. If a new request from subscriber (decision 4556), the process branches to the 'Yes' branch to receive and record the subscriber and the information at step 4576. At step 4560, a second determination is made if a new version of data is available for any of the recorded requests (step 4560). If a new version is available, the process branches to the 'Yes' branch to create a new version of the NDE with the data for the new version 4564. The process at step 4564 may delete NDEs corresponding to prior versions if no longer required by the Subscribers. Coordination Namespace Server 4502 notifies Subscriber 4520 when the Producer publishes a version in step 4564 that matches the Subscription 4512 and meets the criteria 4514 created in step 4524.

A workflow is comprised from a plurality of applications that communicate and coordinate the processing of data. Typically, applications within a workflow perform this communication and coordination through a global filesystem. Accessing a global filesystem by two disjoint applications may cause the data to be transferred across the network multiple times. What is needed is a means for sending the data directly to the consumer. The Coordination Namespace provided by the Extended Memory architecture provides such control. Like a file system, the producers and consumers access data using a "Name." In the case of the file system, this "Name" is a file name, whereas in the Coordination Namespace the "Name" is the name of a NDE. Furthermore, the data resides on disk or flash storage in the file system case, whereas the data can exist in the DRAM of any system in the Coordination Namespace.

By using the Coordination Namespace, the producer of the data can either place the data directly in the memory associated with the producer or directly into the memory associated with the consumer of the data avoiding multiple trips across the network as in the case of a global filesystem. This is accomplished by controlling the placement in response to location suggestions (in the form of NDEs) provided by the consumers of the data, a system manager, or system management software. Even if the data is placed in a different location than indicated by the location suggestion by the producer, the consumer can still access the data using the "Name."

Another advantage of the Coordination Namespace is that multiple NDEs of the same "Name" can exist. Therefore, the producer can send the same information to multiple consumers or even tailor the data for each consumer. Furthermore, the applications within the workflows do not have to all be written in the same programming language for direct communication of data using the NDE space.

An example workflow that might use NDEs and location suggestions for communication and coordination may include an application simulating some real-world problem, an application monitoring the simulation, and a third application performing a visualization the simulation results. Data communicated between these applications might be in the form of graphs containing pointers to other data. When these objects are sent through a file system, the validity of the pointer is lost. What is needed is a method to keep the validity of the pointer information when moving the data between the coordinated applications in a workflow. The best way is for every application to agree on a preferred global virtual address for the data, for the data to remain in the GVAS, and the NDE to contain global virtual address pointers. The next best way is for the NDE to contain the data and for every application to agree on a preferred global virtual address for the data and to provide a method for relocating the data if the preferred global virtual address is not available. This can be achieved by the coordinated applications, a system manager or system management software creating NDEs containing such information. These NDEs are similar in many was to the NDEs created for tracking virtual memory areas in the GVAS as depicted in FIG. 24 and the associated text. In many cases, this is possible if the applications are co-designed or well-coordinated to leave the data in the GVAS. If the applications are not, a method is provided to re-locate the NDE-data from the preferred virtual address to a new virtual address Furthermore, the applications within the workflows do not have to all be written in the same programming language for the direct communication of data using the NDE space.

Figure 46:
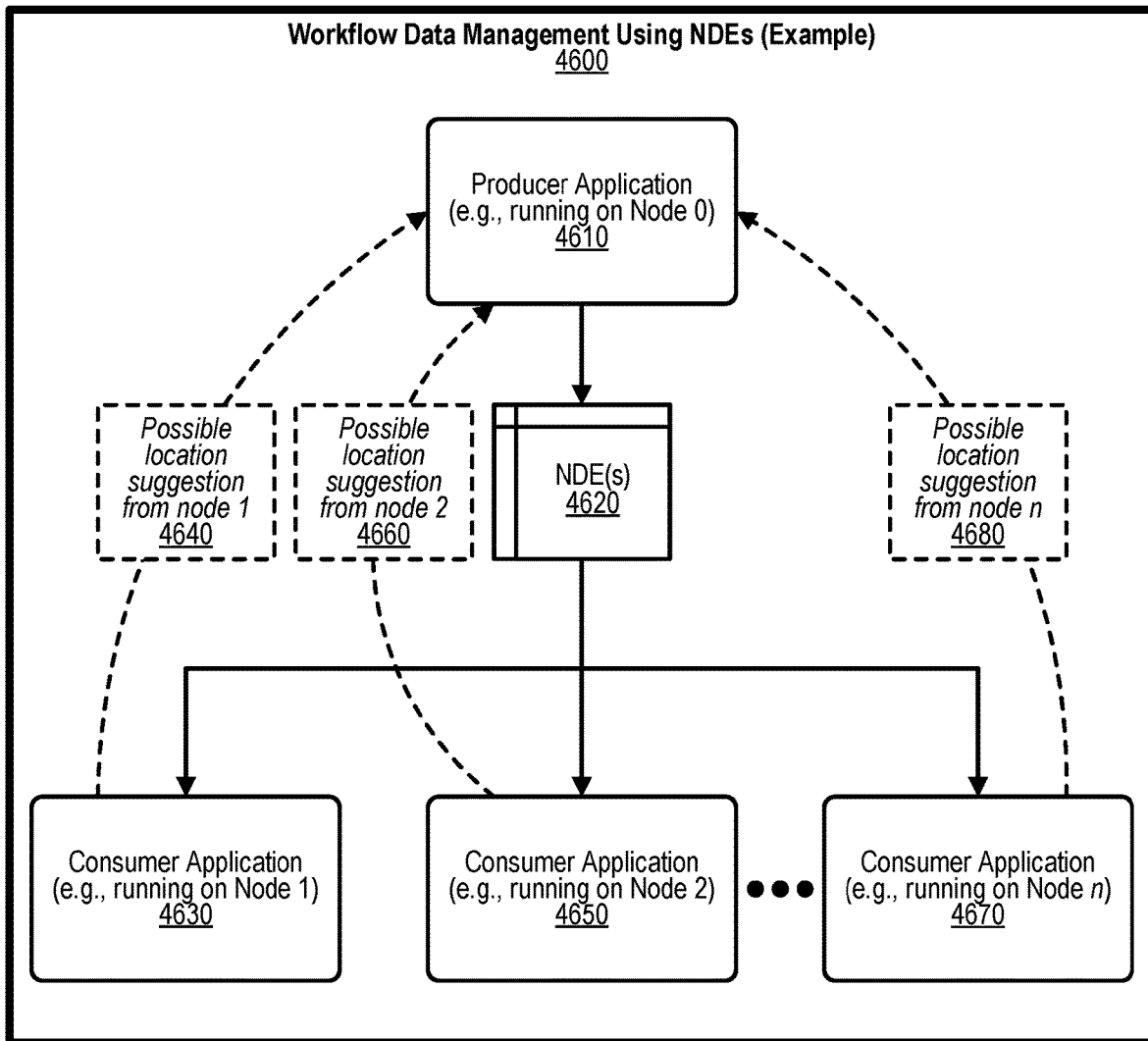
FIG. 46 shows a diagram depicting coordination of applications within a workflow utilizing NDEs for sending data between producer and consumer applications.

FIG. 46 depicts a method for coordination of applications within a workflow comprising of a set of NDEs for sending data between producer and consumer applications. The method includes a set of NDEs for identifying the data placement for the data. FIG. 46 shows a possible usage of the Coordination Namespace for managing data placement within a workflow 4600. The method depicted by FIG. 46 achieves an efficient memory-to-memory coupling of applications within a workflow by locating data in storage local to the consumer. To achieve this data locality, FIG. 46 shows a producer Application (e.g. running on Node 0) 4610 generating "NDEs" for consumer Applications running on various nodes [entries 4630, 4650, . . . 4670]. The consumers provide location suggestions [entries 4640, 4660, . . . 4680] in the form of "NDEs", directing the placement of the data created by the producer. The producer then creates a set of NDEs, such as NDE(s) 4620 either containing the data or containing information where the data is in the Global Virtual Address Space.

Figure 47:
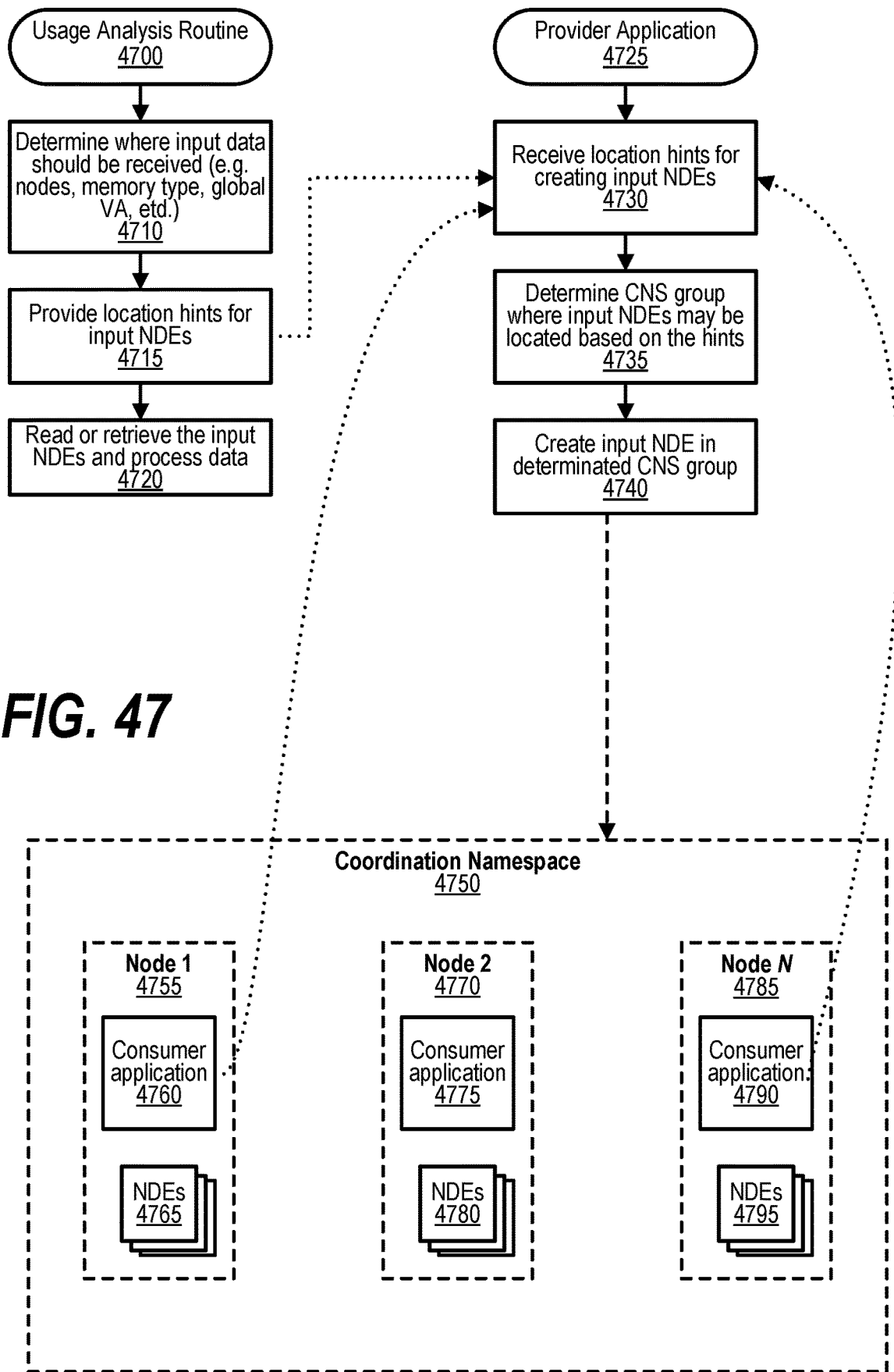
FIG. 47 shows a flowchart that depicts steps taken to identify placement of data used to coordinate between applications in a workflow.

FIG. 47 depicts a method that identifies a placement of data used to coordinate between a plurality of applications in a workflow running on a plurality of nodes that include a local node and may include one or more remote nodes. A provider application may receive a location suggestion corresponding to a preferred CNS group where an input NDE should be created in a Coordination Namespace that is distributed amongst a plurality of nodes. The plurality of nodes does not have to be the same nodes running the application. Data corresponding to the input NDE may be created by the provider application wherein the data is stored at a system memory connected to a node based on a selected group in the Coordination Namespace based on the location suggestions. The method transmits the data to one or more consumer application. The transmitting may be performed by a Coordination Namespace Server that manages the Coordination Namespace. A usage analysis may be performed by one or more receiving applications to determined where the input data should be received. The location suggestion may identify a suggested CNS group wherein the CNS group identifies a node from the plurality of nodes where the input data should be created. The location suggestion may also include the memory type (DRAM, SCM, etc.) where the input data should be created and if the data should be in the NDE-data or in the Global Virtual Address Space. The method may attempt to read or retrieve the data from the Coordination Namespace group corresponding to the location suggestion. In response to receiving an error responsive to the attempted read or retrieve request from the CNS group, the method may receive an actual node location for the corresponding NDE and read or retrieve the data from the actual node. The method may identify one or more usage locations of the data, wherein the location suggestion corresponds to one of the usage locations.

FIG. 47 depicts the flow of a process that identifies a placement of data used to efficiently coordinate between a plurality of applications in a workflow running on a plurality of nodes that include a local node and may include one or more remote nodes. The plurality of nodes is shown as Node 1, Node 2, . . . , Node n [4755, 4770, . . . , 4785] with consumer application [4760, 4775, . . . , 4790] requesting NDEs [4765, 4780, . . . , 4795]. At step 4700, the process executes a usage analysis routine. At step 4710, the process determines where input data should be received (e.g. node, memory type, global VA etc.). At step 4715, the process provides location suggestions for input NDEs. At step 4720, the receiving application reads or retrieves the input NDEs from the provider application and processes the data. The provider application 4725 receives location suggestions for creating input NDEs 4730 and determines the CNS group where the input NDEs should be created based on location suggestions 4735. At step 4740, the process creates the input NDEs in the determined CNS group. The Coordination Namespace 4750 provides the coordination for notifying and transferring the NDEs between the producing and receiving applications in the workflow. The process of creating location suggestions allow the input data to be created in a memory near the receiving application improving the efficiency of coupling applications in a workflow. The input NDEs may contain the input data or pointers to where the data is in the Global Virtual Address Space. Furthermore, the location suggestions may provide the suggested global virtual address and node containing the backing memory in the case the NDE data is pointers.

Figure 48:
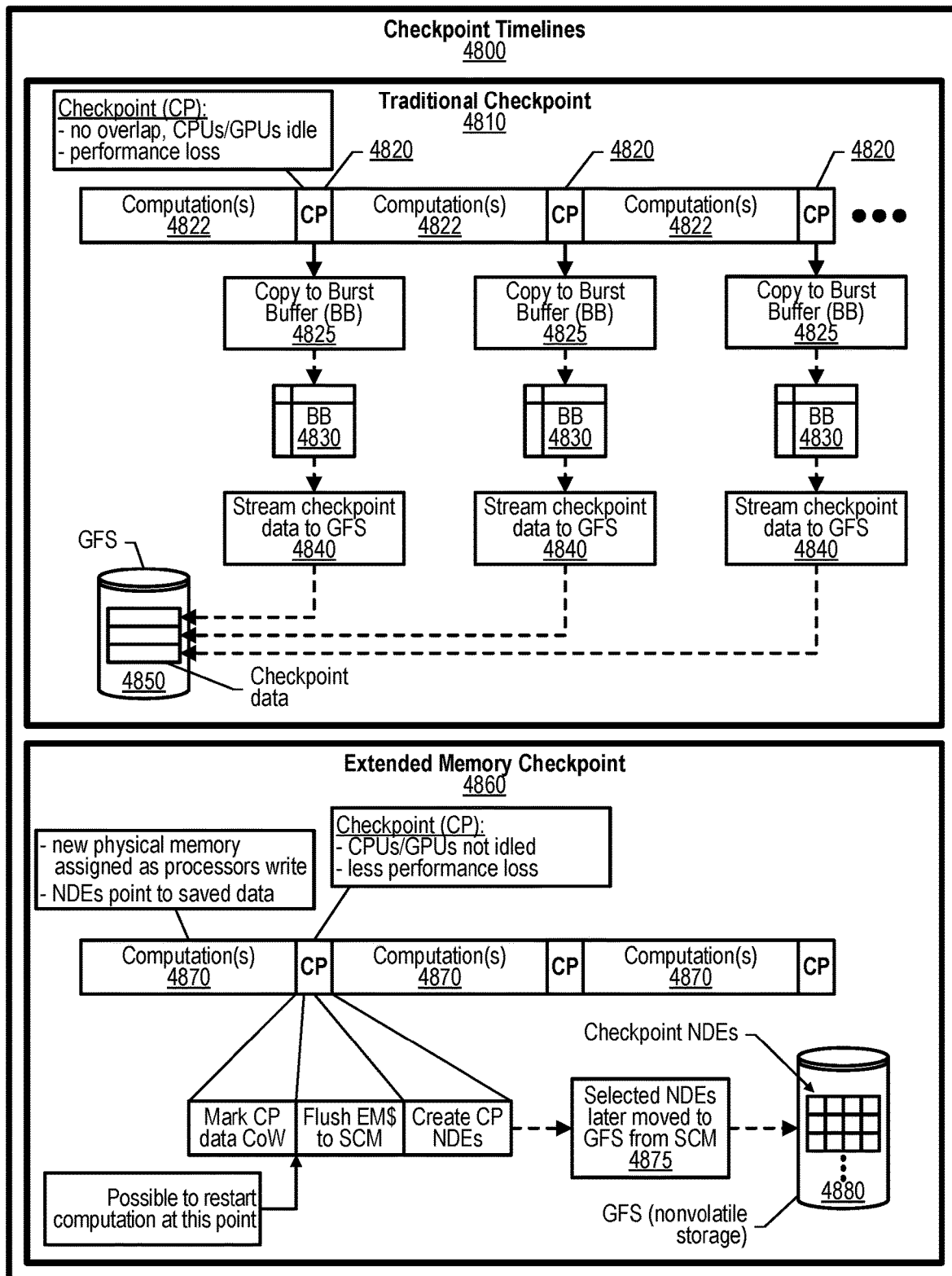
FIG. 48 shows a diagram depicting checkpoint timelines.

FIG. 48 depicts examples of Check Point Timelines 4800. The extended memory architecture provides several opportunities for reducing the check point performance penalty by enabling more computation overlap with the process of saving of the memory state. FIG. 48 illustrates the extended memory opportunities for improving check point/restart.

For reference, the Traditional Check point 4810 represents the prior art for a check point timeline. The Check Point (CP) 4820 entries represent the check point time periods. That is, the point in time that a copy of the memory state is written to the burst buffer (BB) 4825. The CPUs and GPUs are mostly idle during this time where computation(s) 4822 may be made resulting in a performance loss. The figure shows the creation of multiple check points. In one embodiment of a prior art system, the burst buffer (BB) 4830 holds the most recent three check points. In the background, a selected check point is streamed to the global file system (GFS) 4840 using an NVM over fabrics enabled NIC. Applications may restart from one of the three local check point if all nodes are functional. If any node is not recoverable, the application may restart using a different node configuration from one of the selected check points written to the GFS 4850.

The Extended Memory Check point 4860 shows the check point timeline for a system design compliant with the extended memory architecture. The first step in creating a check point creating a snapshot of the memory to be written as the check point. Creating the snapshot marks the associated memory as copy-on-write (CoW). This step utilizes the same facilities as those required for the snapshot consistency model, where new physical memory location is assigned as processors perform a write to a memory location. At this point, the computation 4870 can restart and run in parallel with flushing of the EM cache and creating NDEs containing the memory state. Once the NDEs are created, the unmodified version for any memory locations written during the flushing of the EM cache and creating NDEs containing the memory state can be freed. Using a similar mechanism as the prior art system, selected check point NDEs 4875 are then moved to a more persistent form of memory, such as Global File System (GFS) 4880. In another embodiment, the check point NDEs may point to locations in SCM containing the checkpoint data in lieu of being copied to the NDE-data.

The extended memory check point process shown in FIG. 48 may significantly reduce the overhead for performing a check point as seen by an application. The reduction is the difference in time to flush only the modified data to the backing SCM and creating the checkpoint NDEs verse the time to perform a copy of all data to the burst buffer. The overhead may be further reduced if the checkpoint NDEs contain pointers to the checkpoint data in SCM and not the checkpoint data itself. As shown in the FIG. 48, it may be possible to restart the computation after marking the memory as CoW, overlapping the flush and creation of the checkpoint NDEs with the next computational phase, which further reduces the check point overhead. There are additional memory requirements created by this CoW check point strategy. System implementation where SCM is treated as system memory with a system memory based extended memory cache (EM$) can mitigate the effects of the additional memory requirements and allows for the checkpoints NDEs to contain just pointers to the checkpoint data in SCM.

The CoW check point strategy has the additional attribute of recording the areas of memory modified from the last check point. The check point process could potentially use this information to perform partial check points, where the check point NDEs contain deltas from previous check points. Partial check points have the potential to reduce the check point storage requirements. Since SCM is persistent, restarting on the same nodes from local check points requires only an initialization of the virtual to physical address translation tables.

Figure 49:
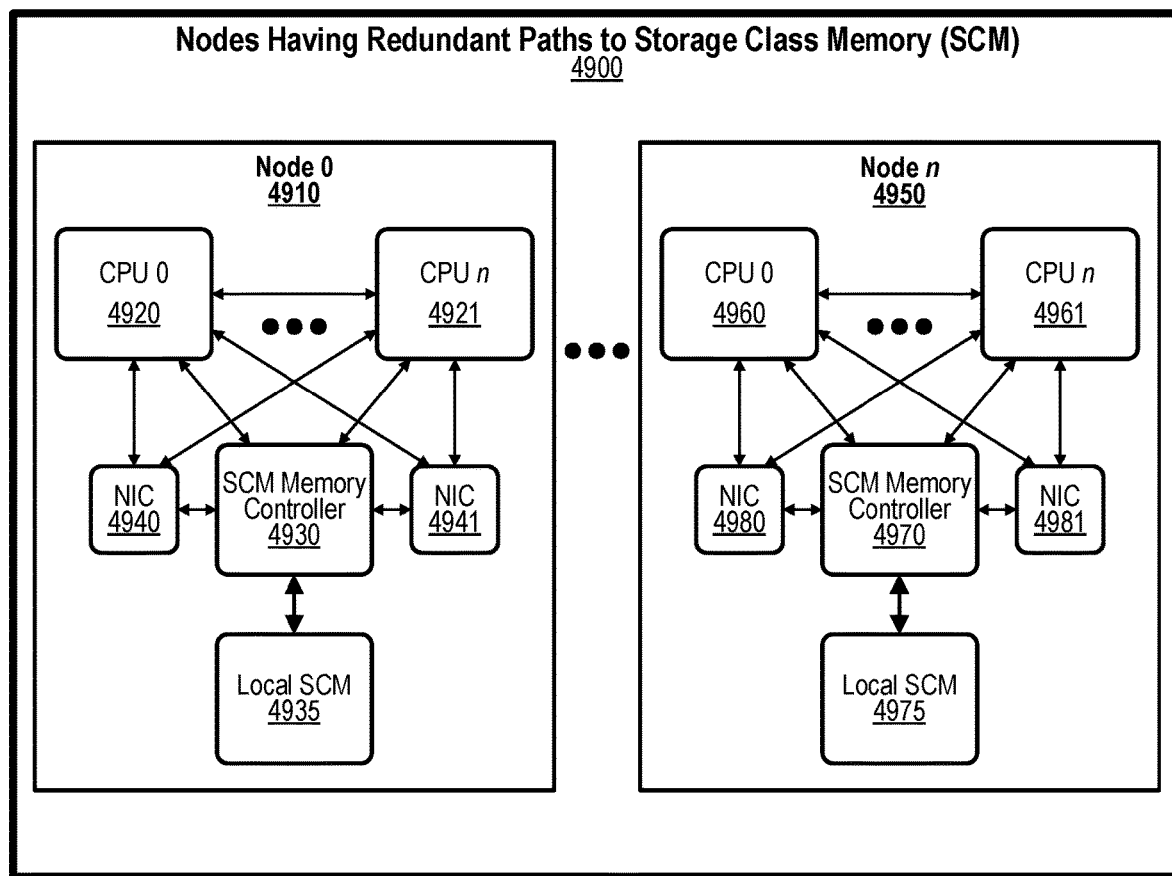
FIG. 49 shows a diagram depicting nodes having redundant paths to Storage Class Memory (SCM)

FIG. 49 is an example node design showing multiple redundant paths identified as Nodes Having Redundant Paths to Storage Class Memory (SCM) 4900. Each node, such as Node 0 4910 has CPU(s) such as CPU 0 4920, . . . , CPU n 4921. Each CPU has a NIC such as NIC 4940, . . . , NIC 4941 utilizing an SCM Memory Controller 4930 to access Local SCM 4935. Other nodes may have similar structures such as Node n 4950 has CPU(s) such as CPU 0 4960, . . . , CPU n 4961. Each CPU has a NIC such as NIC 4980, . . . , NIC 4981 utilizing an SCM Memory Controller 4970 to access Local SCM 4975. These redundant paths may allow accessing the SCM objects in certain failure scenarios. Furthermore, these redundant paths may improve the overall reliability and availability of the system and might reduce the required check point frequency and performance impact of creating a check point for an application or workflow.

Figure 50:
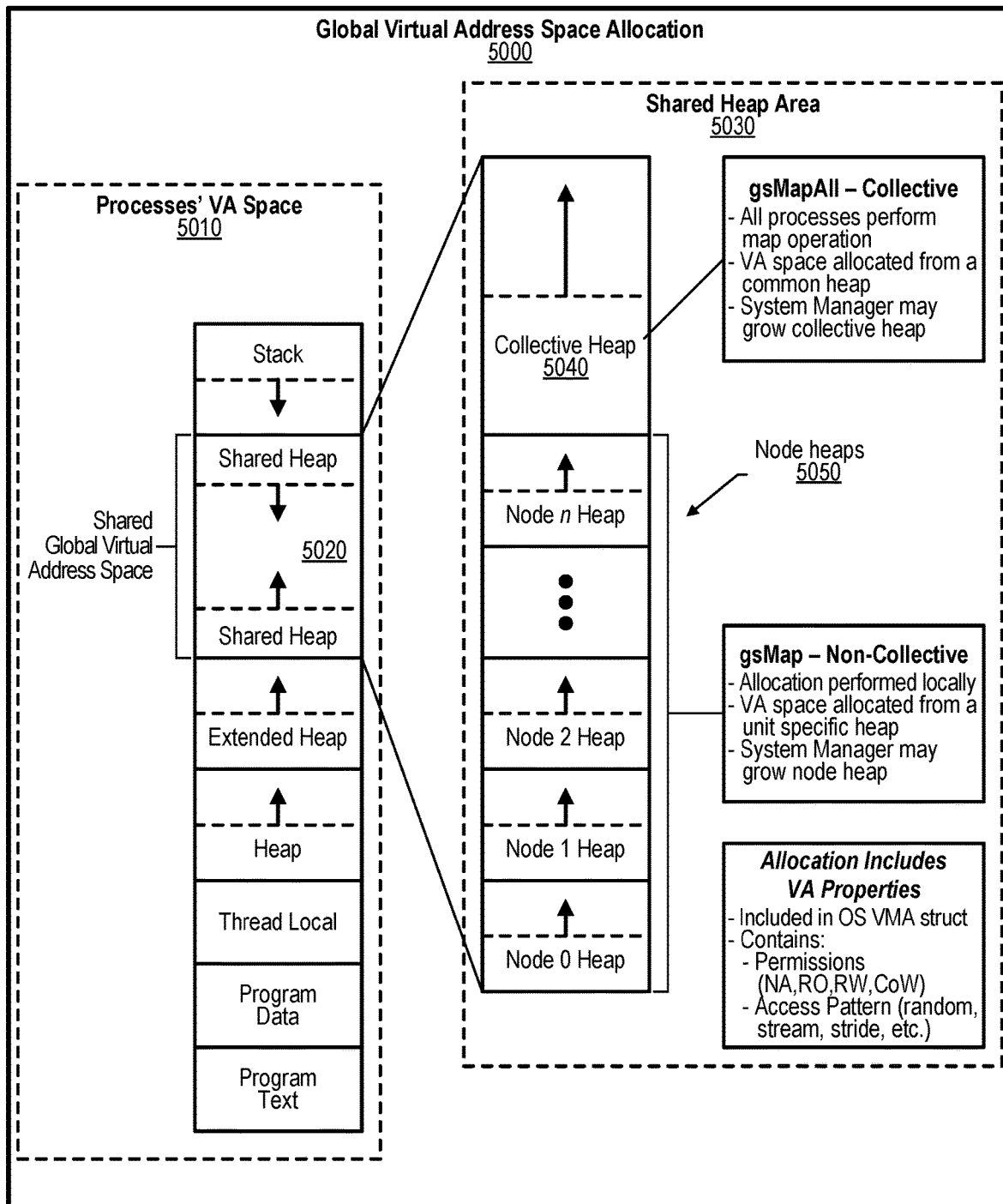
FIG. 50 shows a diagram depicting global virtual address space allocation.

FIG. 50 depicts a schematic diagram of Global Virtual Address Space Allocation 5000. In an embodiment, a common virtual address range in each processes' VA space 5010 is reserved for the Global Virtual Address Space 5020 and shown in more detail in shared heap area 5030. Blocks within the GVAS range are assigned to nodes as shown by Node heaps 5050. Assigning unique blocks to individual nodes allow the operating system running on a node to perform memory allocations in response to the gsMap( ) API call independently and be guaranteed the global virtual address assigned will not conflict with any allocations performed by other nodes. In addition, one block is assigned as a Collective Heap 5040. This heap is used when every node is running the same application and the same allocations are performed on each node using a gsMapAll( ) API call. If additional global virtual memory is needed, a System Manager may grow the heap regions. Applications may also set properties for the allocated global virtual addresses when calling gsMap( ) or gsMapAll( ), or at a later time by calling gsChngVA( ). These properties may include, but are not limited to, Permissions (no access, read-only, read-write, copy-on-write, etc.), and Access Pattern (random, streaming, striding, etc.). The properties may be included in the operating systems virtual memory area structure (VMA struct). After allocating a virtual address range, backing memory may be assigned to units or nodes by calling the gsSetHome( ) API routine for the allocated Global Virtual Address Space. The gsSetHome( ) API establishes the mapping and initializes the global virtual address directory. Calling gsSetHome( ) for regions already assigned a home migrates the associated backing memory to the new home and changes the associated mappings in the NICs. The gsMapAll( ) API supports collective processing where all processes perform map operation—VA space allocated from a common heap. Central service managers growing collective heap. The gsMap( ) API supports non-collective allocation performed locally where VA space is allocated from a unit specific heap. A central service manager supports a growing collective heap, where allocation includes VA Properties that may be included in OS VMA struct including permissions (NA, RO, RW, CoW) and Access Pattern (random, stream, stride, etc.)

Figure 51:
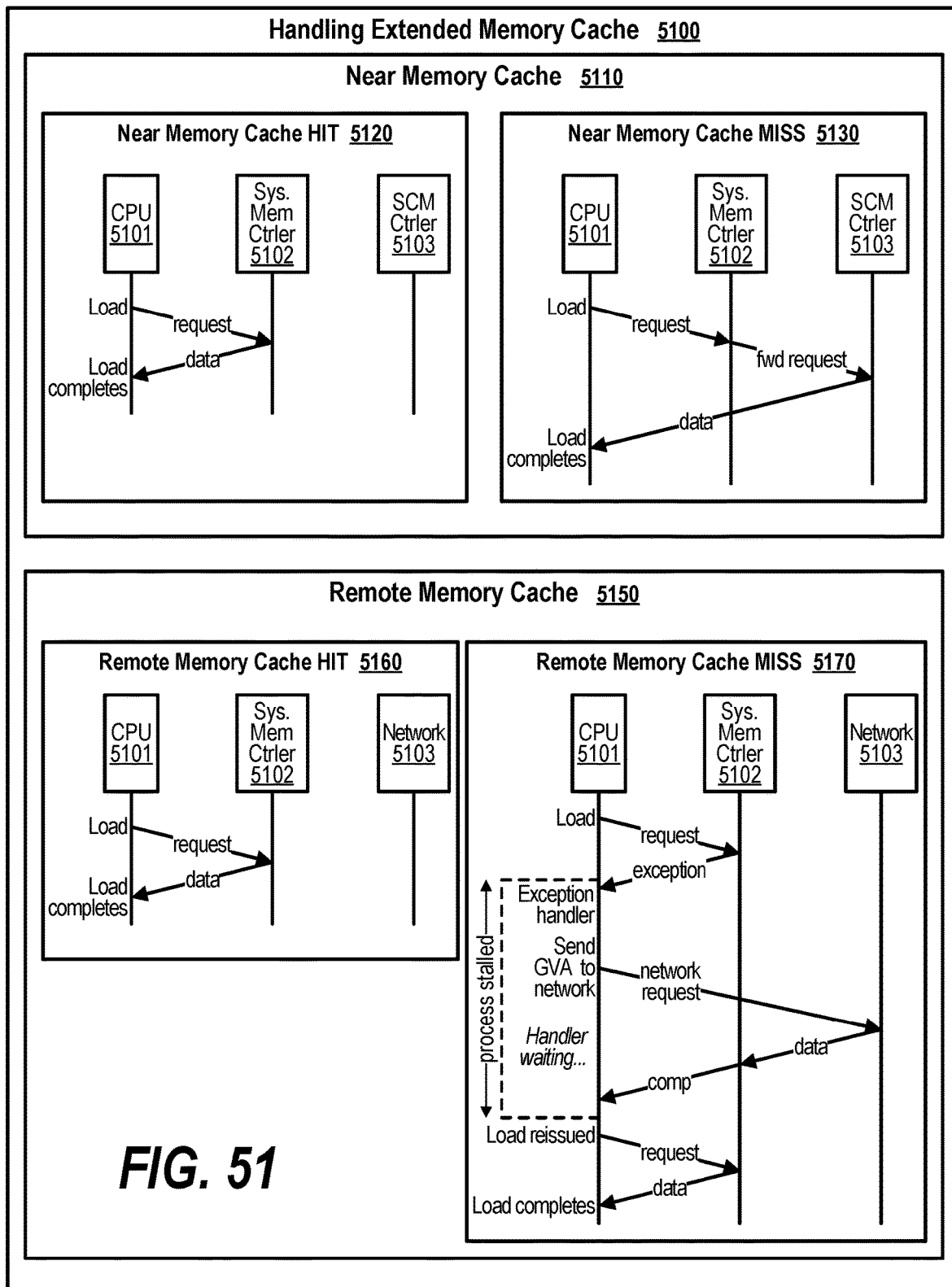
FIG. 51 shows a diagram depicting the handling of extended memory cache.

FIG. 51 shows a process for Handling of An Extended Memory Cache 5100. Entry 5110 depict the handling of near memory cache. A modified CPU 5101 and system memory controller (Sys Mem Ctrler) 5102 enables regions of local memory (DRAM or potentially High Bandwidth Memory) to function as a cache for remote memory or locally attached SCM (near memory). Processing of a Near Memory cache HIT is shown in 5120. Processing of a Near Memory cache MISS is shown in 5130. Entry 5150 depict the handling of remote memory cache. Processing of a Remote Memory Cache HIT is shown in 5160. Processing of a Remote Memory Cache MISS is shown in 5170. As shown, in both HIT cases, the Load request is fulfilled by the system memory controller 5102 by returning data. In the Near Memory Cache MISS case 5130, the system memory controller 5102 forwards the Load MISS to the SCM Controller which fulfills the Load request by returning data. In the Remote Memory Cache MISS case 5170, the system memory controller returns an exception to the CPU 5101. The CPU enters an exception handler and sends the global virtual address to the Network 5103. The Network 5103 forwards the Load request to the node that contains the backing memory associated with the global virtual address (not shown). When the requested Load data is returned, the Network 5103 writes the data to the corresponding system memory cache region and sends a completion notice to the waiting exception handler. When the completion is received, the original Load is reissued by the CPU 5101. Since the Load data was just written to the system memory cache, the Load should HIT and the data is returned by the system memory controller. The network controller may be modified to allow the firmware exception handler to fetch remote memory without needing a full-fledged device driver. A first modification may be an architected, low latency interface for performing small remote direct memory accesses (RDMAs). A second modification may provide routing the RDMA request to the correct unit or node based on the global virtual address utilizing a Home Node Directory.

The operating system is an element in supporting a Global Virtual Address Space. The main functions provided by the operating system are as follows: Coordination of the Global Virtual Address Space (GVAS) with other units in the system. Performing allocation of global virtual address for processes running within the associated node. Maintaining the Global Address Space Directory for tracking the virtual memory areas allocated in the GVAS. Maintaining the Home Node Directory for locating the backing memory for any given virtual address block. Assigning a node and physical address (backing memory) for a global virtual address. Mapping of global virtual addresses that are not backed by local memory to the physical memory regions associated with the extended memory caches, handling the mapping fault when a virtual address is not contained in the processor's translation tables, and handling the exception when the data associated with the global virtual address is not the extended memory cache. In most cases, excluding the exception handler, kernel extensions may perform the functions listed above as they are not in the performance critical path when accessing the Global Virtual Address Space. Since the exception handler is in the performance critical path, a firmware exception handler is executed to send request to an architected interface in a modified NIC for handling extended memory cache misses (See FIG. 51). FIGS. 52 and 53 depict example APIs that may be used to support efficient processing of Extended Memory Architecture functionalities. A list of example Virtual Address Space APIs 5200 are identified in FIG. 52. Entries in 5210 depict GVAS Management APIs. Entries in 5220 depict GVAS Snapshot Consistency APIs. Entries in 5230 depict GVAS Access APIs.

The APIs may be simply be externalized entry points accessed via direct calls and be referenced herein as routines. The first step performed by software is to attach to a particular global address space by calling the gsOpen( ) routine. This routine returns a handle for the global virtual address space used by future API calls. A process can only attach to one global virtual address space at a time. The API provides a corresponding gsClose( ) for detaching from the address space. The next step is to allocate virtual address space and assign which units or nodes contain the backing memory. The extended memory API provides two routines for allocating virtual address space (gsMap( ) and gsMapAll( )) and corresponding routines for freeing the virtual address space (gsFree( ) and gsFreeAll( )), FIG. 50 shows the shared global virtual address space and the heaps corresponding to the allocation calls. These allocation routines have a parameter for providing properties of the allocated region that indicating the access permissions and expected access characteristics. Applications can change the properties of an allocated region using the gsChngVA( ) API call. The following are examples of a set of VA range properties that may be supported by an embodiment. For remote access permissions: No Access, Read-Only, Read/Write, and Copy-on-Write. For extended memory caching: Disabled, Write-thru, and Store-In. For access pattern hints: Random, Streaming, and Block Stride. The gsQuery( ) routine provides software with visibility into the properties and state of the associated Global Address Space. An application can call gsPrivate( ) to remove remote access to local data, thus making the data private to the local calling process. The gsPrivate( ) removes access to a set of virtual address ranges for threads in a specified thread group.

In addition to load/store operations, the GVAS Access APIs provide routines for copying data between local and remote memory pools, routines, for performing atomic updates, invoking remote active messaging engines on remote units, and routines for managing and pre-fetching data into the local extended memory cache. The gsGet( ) and gsPut( ) routines copy data between local and remote memory pools. The APIs may provide a function pointer parameter to specify a transformation function applied during the copy. The API may also provide two routines for performing atomic updates within the Global Virtual Address Space and for performing complex remote memory transactions. The gsAtomic( ) supports performing a pre-defined set of atomic updates on global virtual addresses such as fetch-and-add. The function argument of this command defines the function to perform. Each unit must have the function available specified by the function argument. In addition, routines are identified to open, close, query, map, free, set backing memory, and change properties of VAs. As depicted in FIG. 20, the global virtual address request may be the result of a processor load or store instruction. In addition to the access methods provided by the APIs, the Global Virtual Address Space can be directly accessed using processor load and store instructions as depicted by FIG. 20. Direct load/store access allows applications to dereference any standard pointer transparently with little or no compiler support. The architecture supports using system memory as an extended memory cache to improve the efficiency of global virtual address accesses. Like many other processor architectures, the API provides a set of routines (gsTouch( ), gsTouchForStore( ), gsFlush( )) for managing data in the cache and a routine to maintain ordering (gsSync( )). Applications may not be required to use these routines for proper operation. Application developers can insert these routines during the tuning phase of development to improve the performance and efficiency of Global Virtual Address Space request.

A list of example Coordination Namespace APIs 5300 are included in FIG. 53. Entry 5300 depicts Coordination Namespace Access APIs. The extended memory API provides the csAddGroups( ) and csRemoveGroups( ) routines for modifying the list of units contributing to the specified Coordination Namespace. The csRemoveGroups( ) routine moves the NDEs associated with the groups being removed to other hash buckets and adjusts the hashing algorithm to reflect the new list of units providing the namespace. Entry 5320 depict example Coordination Access APIs. The csOut( ) or csEval( ) routines create a NDE on the unit specified by the group ID if possible. If not possible, these routines use the "Natural Home" calculated by the hash function used during the NDE creation. When referencing a NDE, the variants of csIn{x}( ) and csRd{x}( ), csRetrieve{a}( ). and the csRemove( ) routines first search for the requested NDE on the local node. If not found, these routines look for the NDE on the unit specified by the group ID, if supplied. If still not found or the group ID is not supplied, these routines search the "natural home." The "Natural Home" may return the NDE or a unit ID for where the NDE is located. The "Natural Home" knows if the "NDE" exists and the location of the associated data. Since the "Natural Home" only knows if the "NDE" exist, searching for a NDE using a template to match on the data requires a special request to return all possible locations where NDEs of the same "NDE" exist, which has scalability issues. Generating NDEs with the same "NDE" but different group IDs may cause this scalability issue. For many reasons, the physical units making up a Coordination Namespace may change. In addition, the API provides a csMove( ) routine for moving NDEs between groups and between Coordination Namespaces. The group ID and the routine to move NDEs between groups provide application developers with the ability to control NDE locality. With the csEval( ) API, a function may be specified which will be executed on a node specified by the "Name" and at the completion of the function, a NDE corresponding to the "name" is created. The csCreate( ) API may include a minimum persistence level of the namespace being created. Example persistence levels may include: Level 0—Lowest level of persistence. Any error resulting in a restart of a unit may result in loss of the named data elements stored within the unit's hash bucket. Level 1—Named data elements within a unit's hash bucket are stored in persistent memory. Named data elements are available as long as the node is recoverable. For performance, an implementation can cache named data elements in higher performance memory as long as the persistence is preserved. Level 2—Named data elements within the coordination namespace are available even if units fail. There are several ways to achieve this type of persistence, such as a RAID scheme or placing data in a protected global filesystem. The extended memory architecture does not require any specific implementation. Level 3—Highest level of persistence. This level is similar to archival storage. The csAttach( ) API supports attaching to an existing coordination namespace. The csDetach( ) API is used to detach from a specified coordination namespace. The csQuery( ) API provides software with visibility into the properties and state of the coordination namespaces. The csDelete( ) API is used to remove a coordination namespace. Deleting a coordination namespace also deletes all the named data elements within the Coordination Namespace. The csTest( ) API is used to retrieve the status of a prior csIna( ), csRda( ) or csEval( ) call. The csCancel( ) API is used to cancel a prior csIna( ) or csRda( ) call.

Figure 54:
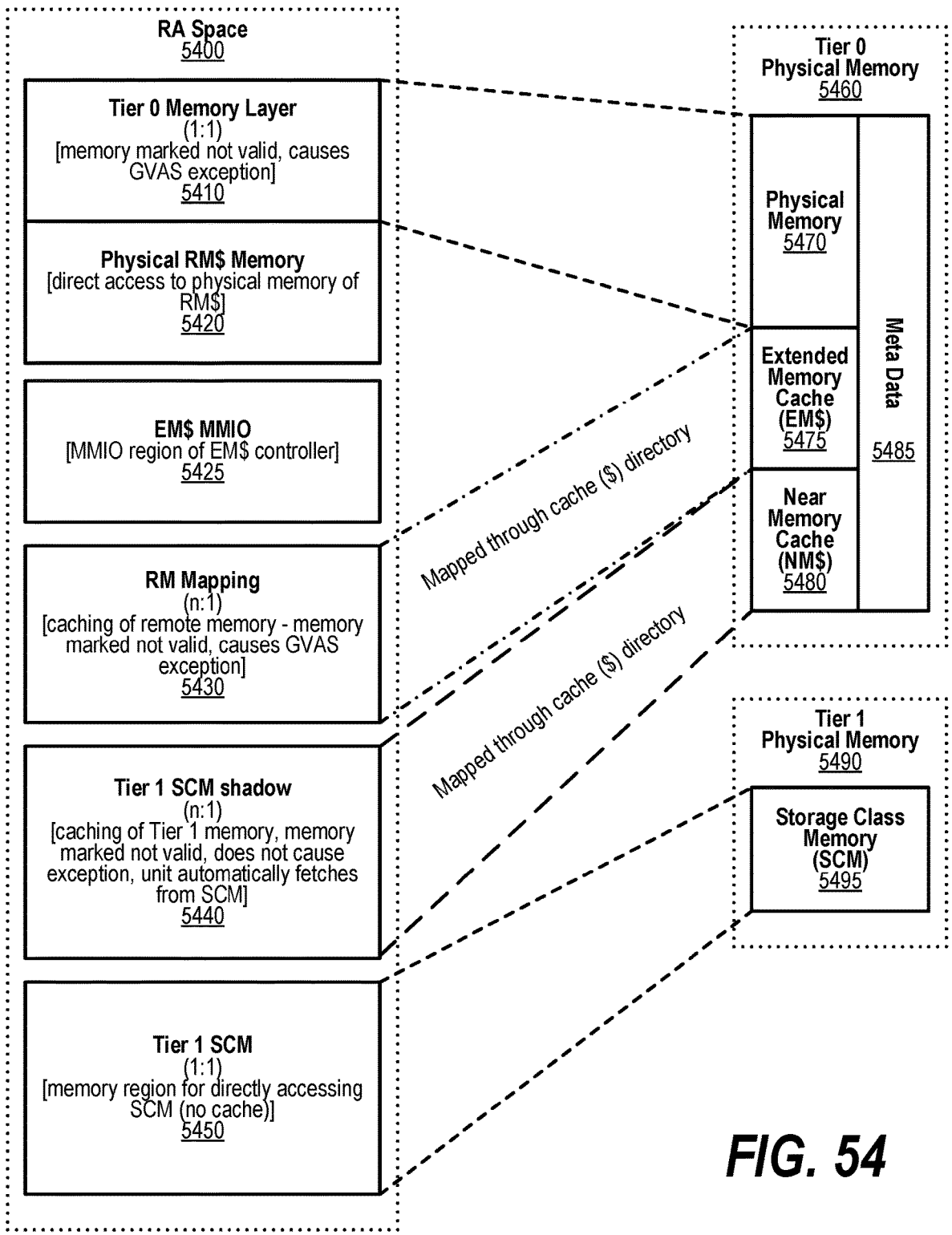
FIG. 54 shows an embodiment of an Extended Memory cache.

FIG. 54 depicts examples of exemplary embodiment of an Extended Memory cache. Real Address (RA) Space 5400 represents the memory space of a node. Real Address are generated using a virtual address translation mechanism in the CPUs. Physical Memory [5460 and 5490] represent the physical memory local to the node. In most node designs, the Real Address (RA) space 5440 is directly mapped, in a 1:1 manner, to the Physical Memory [5460 and 5490] as shown by the Tier 0 Memory Layer (1:1) mapping to Physical memory 5470. In most node designs, if a virtual address translation exists, then there is associated physical memory. In a node design that supports extended memory, the associated physical memory mapped in the Tier 0 memory layer 5410 may be marked as not valid, using the associated Meta Data 5485, causing a GVAS exception when accessed. In addition, the Meta Data 5485 may also track if the associated memory has been modified. Generating an exception may help programs detect when an access to uninitialized memory is performed. The physical RM$ Memory [direct access to physical memory of RM$] 5420 is similar to Tier 0 memory layer 5410 and provides direct access to the physical cache lines in the EM$ 5475 (mapping not shown). The EM$s MMIO [MMIO region of EM$ controller] 5425 are mapped to the system memory controller modified to support extended memory caching (also not shown). The RM mapping (n:1) 5430 maps to the Extended Memory Cache (EM$) 5475 in physical memory through a cache directory maintained by the system memory controller (not shown). There are "n" cache lines in the RM Mapping (n:1) 5430 mapped to a single cache line in the Extended Memory Cache (EM$) 5475. The associated Meta Data 5485 contains information that tracks if the associated cache line is valid, has been modified, and a real address tag indicating which real address of the plurality of real address cache lines ("n") the extended memory cache line contains. Access to a Real Address that is either not valid or the real address tag does not match the real address, causes GVAS exceptions and a firmware exception handler is invoked to reload the extended memory cache. The Tier 1 SCM shadow (m:1) 5440 is similar to the maps to the Near Memory Cache (NM$) 5480 in physical memory through a cache directory maintained by the system memory controller (not shown). There are "m" cache lines in the Tier 1 SCM shadow (m:1) 5440 mapped to a single cache line in the Near Memory Cache (NM$) 5480. The associated Meta Data 5485 contains information that tracks if the associated cache line is valid, has been modified, and a real address tag indicating which real address of the plurality of real address cache lines ("m") the near memory cache line contains. Unlike the extended memory cache, an exception is not generated if an access is performed to a cache line marked as invalid or the real address tag does not match. Instead, the access is redirected to the Tier 1 SCM (1:1) 5450 area where a SCM controller (not shown) directly access the Storage Class Memory (SCM) 5495 in the Tier 1 Physical Memory 5490. The SCM controller in cooperation with the node, reloads the Near Memory Cache (NM$) 5480 and completes the access. The Tiers 1 SCM (1:1) 5450 is like the Physical RM$ memory 5420 area but provides a 1 to 1 mapping of a real address to the Storage Class Memory (SCM) 5495 in Tier 1 physical memory 5490.

Figure 55:
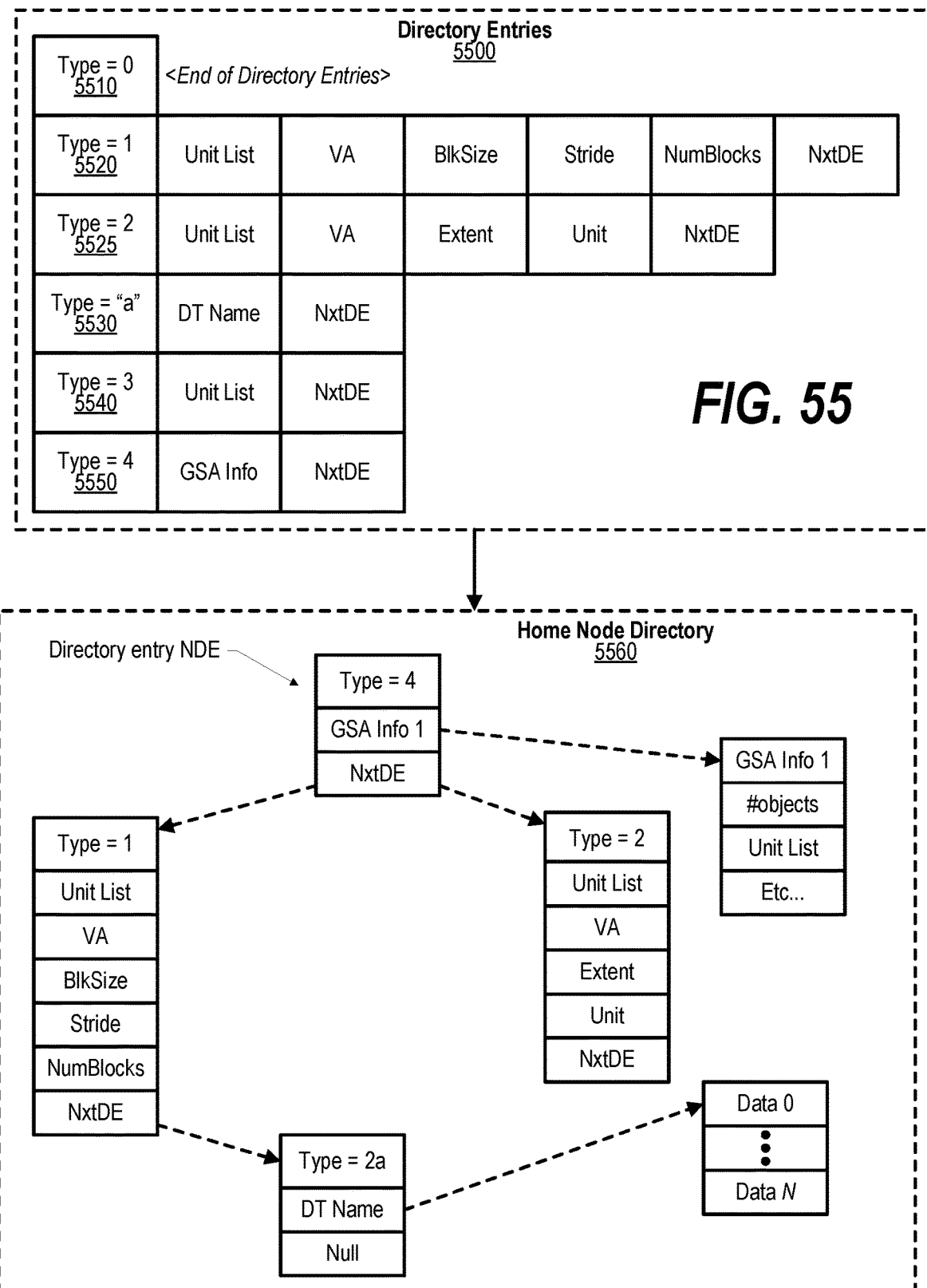
FIG. 55 shows a diagram of directory entries as record entries in a home node directory.

FIG. 55 depicts an example of using a Named data Element (NDE) as a Directory for Persistent Virtual Address Space with a schematic view of Directory Entries 5500 as record entries in the Home Node Directory 5560. Each Directory Entry (one for each Virtual Memory Area or range of Virtual Addresses) has a type field that identifies the type of directory entry. In an embodiment, Type=0 5510 indicates the end of directory entries. Type=1 5520 indicates a fixed stride of blocks across participating units. Type 1 includes fields such as a preferred VA/striding of data across participating units. Type=2 5525 indicates a defined location for each VA granule. Type=1a 5530 indicates the Named Data Element data is not in physical memory of any process space. Type=2 5525 identifies units and preferred VA locations for data across the participating units. Type=3 5540 identifies participating units. Type=4 5550 identifies a head of Global Address Space Directory. Depending on the type different field are included. Fields may include entries, such as, but not limited to a pointer to list of participating units (Types 1, 2, and 3), a plurality of Named Data Element names containing global virtual address information or archive information. More details of the individual filed are described in FIG. 56.

Figure 56:
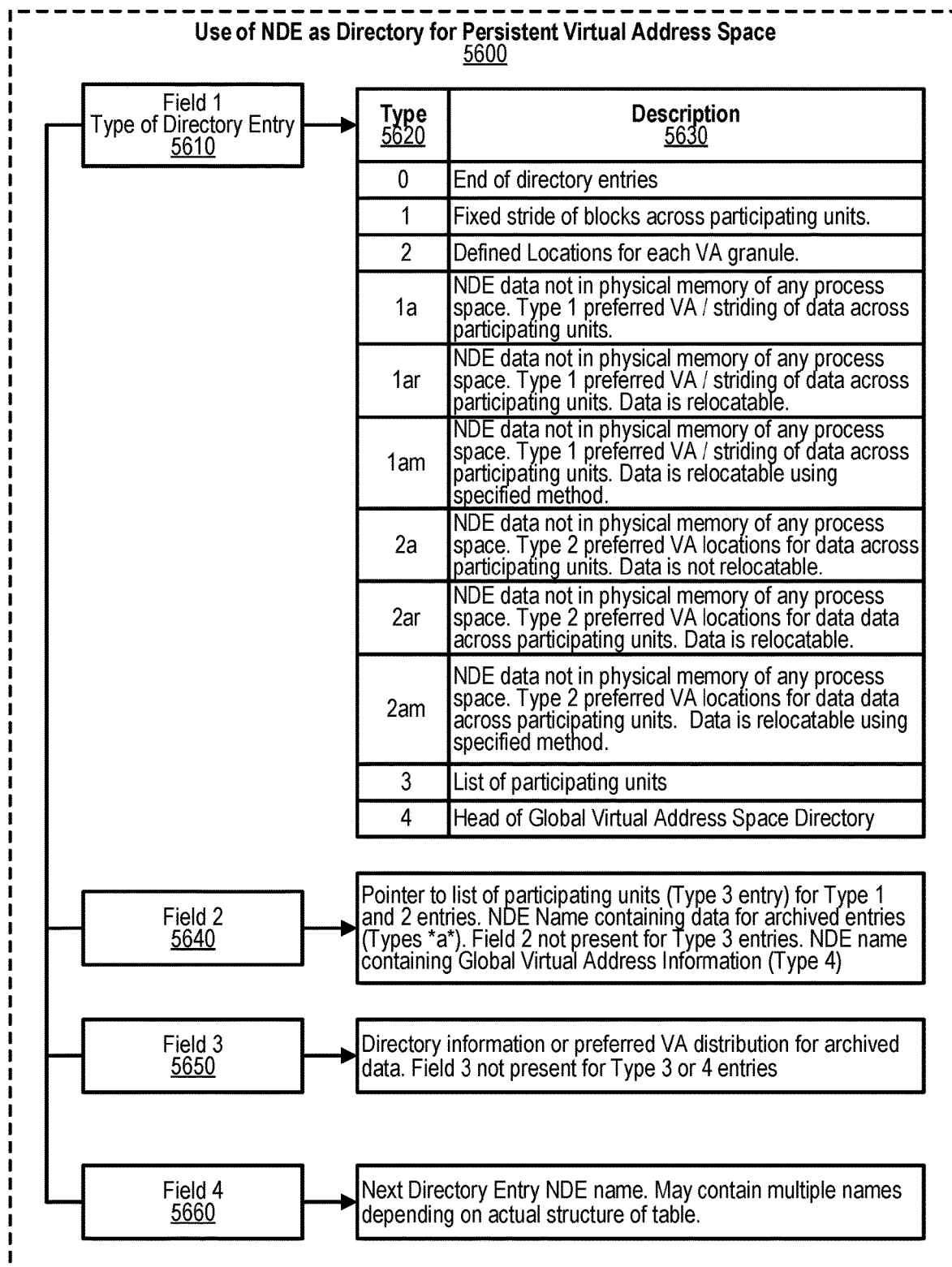
FIG. 56 shows a diagram depicting data fields and data to use a NDE as a directory for persistent virtual address space.

FIG. 56 depicts more details of an embodiment using Named Data Element (NDE) as Directory for Persistent Virtual Address Space 5600. Field 1 depicts the type of directory entry wherein the Type 5620 includes the individual type entries in FIG. 55 and some additional entries as follows: Type=1ar indicates Named Data Element data not in physical memory of any process space. Type=1am indicates Named Data Element data not in physical memory of any process space. Type=2a indicates Named Data Element data not in physical memory of any process space. Type=2ar indicates Named Data Element data not in physical memory of any process space. Type=2am indicates Named Data Element data not in physical memory of any process space. Named Data Element Name containing data for archived entries (Types *a*). Field 2 5640 points to list of participating units for type 1, 2, and 3. A Named Data Element name containing data for archived entries (Types *a*). Field 2 is not present for Type 3 entries. Named Data Element name containing Global Virtual Address Information (Type 4). Field 3 5650 contains directory information or a preferred VA distribution for archived data. Field 3 is not present for Type 3 or 4 entries. Field 4 5660 contain next Directory Entry Named Data Element name and may contain multiple names depending on the actual structure of Directory.

FIG. 57 depicts an example usage of a real address tag in the metadata. In an embodiment, a virtual page in a virtual address (VA) space 5700 of a process is mapped to a real address page using the processor's memory management unit (MMU) translation (xlate 5710) logic. Virtual pages P0, P1, . . . P5 are mapped via the translation logic to groups of real address pages in the real address space 5720. Each group of real address pages are mapped to a single page (PPGx; where x is the group number) in physical memory 5730. The tag metadata associated with each granule in the physical page identifies the real address of the data stored in the granule. If there are 2 real address pages in a group, then one metadata bit is needed to identify which real address the data is associated with. If there are 32 real address pages in a group, then 5 bits are needed, etc. This allows for many sparsely accessed remote memory locations to be stored in less physical memory when compared to a system without real address tags in the metadata. Furthermore, there can be multiple physical pages associated with each physical page group. In this case, a granule in a real address page can be stored in multiple physical memory granules. If there are 2 physical pages, then the caching scheme would be considered a 2-way set associative cache. That is, there are two locations that data for a given real address can reside. Four physical pages is a 4-way, etc. A direct mapped cache would have only one physical page.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method that maintains a consistent view of a plurality of virtual addresses by a local node that is an information handling system that includes a processor and a memory accessible by the processor, the method comprising:
   while maintaining the consistent view, responding to all writes of the information handling system by:
       writing a first value to a selected virtual address in the plurality of virtual addresses;

after writing the first value, establishing a snapshot consistency state of the plurality of virtual addresses, wherein the plurality of virtual addresses is shared amongst a plurality of processes, wherein the plurality of processes includes a writing process and one or more other processes; and after writing the first value, writing, by the writing process, a second value to the selected virtual address, wherein, subsequent to the writing of the second value, the first value is visible to the one or more other processes.

2. The method of claim 1 wherein the writing process runs on the local node, and wherein the one or more other processes run on one or more of a plurality of nodes, wherein the local node and a remote node are included in the plurality of nodes that access the selected virtual address.

3. The method of claim 2 wherein the snapshot consistency state is established after the writing of the first value and before the writing of the second value.

4. The method of claim 3 further comprising:
preventing the one or more other processes from reading the second value.

5. The method of claim 4 further comprising:
exiting the snapshot consistency state; and
after the exiting, allowing the other nodes to read the second value from the selected virtual address.

6. The method of claim 2 wherein a second writing node, selected from the plurality of nodes, writes the first value to the virtual address.

7. The method of claim 2 wherein, subsequent to the writing of the second value, the second value is visible to the writing node.

8. The method of claim 2 further comprising:
writing a plurality of values to the selected virtual address, wherein the plurality of values include the second value; and
consolidating the plurality of values using a resolution function.

9. The method of claim 8 wherein the resolution function is a user defined function and resolves updates to a memory location made by at least two processes.

10. The method of claim 2 wherein the virtual address is a global data object.

11. An information handling system (a local node) that maintains a consistent view of a plurality of virtual addresses comprising:
one or more processors;
a memory coupled to at least one of the processors;
a network interface that connects the local node to one or more remote nodes; and
a set of computer program instructions stored in the memory and executed by at least one of the processors in order to perform actions comprising:
while maintaining the consistent view, responding to all writes of the information handling system by:
writing a first value to a selected virtual address in the plurality of virtual addresses;
after writing the first value, establishing a snapshot consistency state of the plurality of virtual addresses, wherein the plurality of virtual addresses is shared amongst a plurality of processes, wherein the plurality of processes includes a writing process and one or more other processes; and
after writing the first value, writing, by the writing process, a second value to the selected virtual address, wherein, subsequent to the writing of the second value, the first value is visible to the one or more other processes.

12. The information handling system of claim 11 wherein the writing process runs on the local node, and wherein the one or more other processes run on one or more of a plurality of nodes, wherein the local node and a remote node are included in the plurality of nodes that access the selected virtual address.

13. The information handling system of claim 12 wherein the snapshot consistency state is established after the writing of the first value and before the writing of the second value.

14. The information handling system of claim 13 wherein the actions further comprise:
preventing the one or more other processes from reading the second value.

15. The information handling system of claim 14 wherein the actions further comprise:
exiting the snapshot consistency state; and
after the exiting, allowing the other nodes to read the second value from the selected virtual address.

16. The information handling system of claim 12 wherein a second writing node, selected from the plurality of nodes, writes the first value to the virtual address.

17. The information handling system of claim 12 wherein, subsequent to the writing of the second value, the second value is visible to the writing node.

18. The information handling system of claim 12 wherein the actions further comprise:
writing a plurality of values to the selected virtual address, wherein the plurality of values include the second value; and
consolidating the plurality of values using a resolution function.

19. The information handling system of claim 18 wherein the resolution function is a user defined function and resolves updates to a memory location made by at least two processes.

20. The information handling system of claim 12 wherein the virtual address is a global data object.

21. A computer program product that maintains a consistent view of a plurality of virtual addresses stored in a computer readable storage medium, comprising computer program code that, when executed by an information handling system (a local node), performs actions comprising:
while maintaining the consistent view, responding to all writes of the information handling system by:
writing a first value to a selected virtual address in a plurality of virtual addresses;
after writing the first value, establishing a snapshot consistency state of the plurality of virtual addresses, wherein the plurality of virtual addresses is shared amongst a plurality of processes, wherein the plurality of processes includes a writing process and one or more other processes; and
after writing the first value, writing, by the writing process, a second value to the selected virtual address, wherein, subsequent to the writing of the second value, the first value is visible to the one or more other processes.

22. A method that maintains a consistent view of a virtual address by a local node that is an information handling system that includes a processor and a memory accessible by the processor, the method comprising:
while maintaining the consistent view, responding to all writes of the information handling system by:

establishing a snapshot consistency state of the virtual address, wherein the virtual address is shared amongst a plurality of processes, wherein the plurality of processes includes a writing process and one or more other processes, wherein the writing process runs on the local node, and wherein the other processes run on one or more remote nodes, wherein the local node and the remote nodes are included in a plurality of nodes that share a memory area where the virtual address is stored;

writing a first value to the virtual address; and after writing the first value, writing, by the writing process, a second value to the virtual address, wherein, subsequent to the writing of the second value, the first value is visible to the other processes and the second value is hidden from the other processes.

23. The method of claim 22 further comprising:

writing a plurality of subsequent values to the virtual address by one or more of the processes, wherein the plurality of subsequent values include the second value;

maintaining the consistent view of the virtual address by hiding the subsequent values each of the processes that did not write the respective subsequent value; and consolidating the plurality of subsequent values using a resolution function, wherein the resolution function is a user defined function and resolves updates to the virtual address.

24. An information handling system (a local node) that maintains a consistent view of a virtual address comprising:

one or more processors;

a memory coupled to at least one of the processors;

a network interface that connects the local node to one or more remote nodes; and a set of computer program instructions stored in the memory and executed by at least one of the processors in order to perform actions comprising:

while maintaining the consistent view, responding to all writes of the information handling system by:

establishing a snapshot consistency state of the virtual address, wherein the virtual address is shared amongst a plurality of processes, wherein the plurality of processes includes a writing process and one or more other processes, wherein the writing process runs on the local node, and wherein the other processes run on one or more remote nodes, wherein the local node and the remote nodes are included in a plurality of nodes that share a memory area where the virtual address is stored;

writing a first value to the virtual address; and after writing the first value, writing, by the writing process, a second value to the virtual address, wherein, subsequent to the writing of the second value, the first value is visible to the other processes and the second value is hidden from the other processes.

25. The information handling system of claim 24 wherein the actions further comprise:

writing a plurality of subsequent values to the virtual address by one or more of the processes, wherein the plurality of subsequent values include the second value;

maintaining the consistent view of the virtual address by hiding the subsequent values each of the processes that did not write the respective subsequent value; and consolidating the plurality of subsequent values using a resolution function, wherein the resolution function is a user defined function and resolves updates to the virtual address.

\* \* \* \* \*